(12) United States Patent
Furukawa et al.

(10) Patent No.: US 8,390,615 B2
(45) Date of Patent: Mar. 5, 2013

(54) IMAGE DISPLAY APPARATUS, IMAGE DATA PROVIDING APPARATUS, AND IMAGE DISPLAY SYSTEM PROVIDING A CONTROL SCRIPT FOR EXECUTING BASIC FUNCTIONS

(75) Inventors: Hirofumi Furukawa, Chiba (JP); Masafumi Hirata, Tokyo (JP); Soichi Nitta, Narashino (JP); Tatsuo Sudo, Chiba (JP); Azusa Umemoto, Kizugawa (JP); Aya Enatsu, Chiba (JP); Masafumi Takahashi, Sakura (JP); Takuya Kinoshita, Chiba (JP); Kiyotaka Kashito, Kobe (JP); Katsuo Doi, Sakurai (JP); Satoshi Eguchi, Yamatotakada (JP); Hideyuki Otokawa, Nara (JP); Kentaro Sakakura, Yamatokoriyama (JP); Masaki Hasiura, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 1498 days.

(21) Appl. No.: 11/889,354

(22) Filed: Aug. 10, 2007

(65) Prior Publication Data

US 2008/0036757 A1    Feb. 14, 2008

Related U.S. Application Data

(60) Provisional application No. 60/836,931, filed on Aug. 11, 2006.

(30) Foreign Application Priority Data

Jun. 26, 2007 (JP) ................................. 2007-168253
Jun. 26, 2007 (JP) ................................. 2007-168254
Jun. 26, 2007 (JP) ................................. 2007-168255

(51) Int. Cl.
*G06F 17/00* (2006.01)
*G09G 5/00* (2006.01)
*H04N 5/44* (2011.01)

(52) U.S. Cl. .......................... 345/418; 345/581; 348/553
(58) Field of Classification Search .................. None
See application file for complete search history.

(56) References Cited

U.S. PATENT DOCUMENTS 7,594,175 B2 *  9/2009  Tomita et al. ................. 715/700
2002/0057286 A1  5/2002  Markel et al.
(Continued)

FOREIGN PATENT DOCUMENTS

EP  1 571 842 A1  9/2005
JP  6-149533 A  5/1994
(Continued)

OTHER PUBLICATIONS

European Search Report for corresponding European patent application No. 07792190.6 dated Nov. 25, 2010.

(Continued)

*Primary Examiner* — Kee M Tung
*Assistant Examiner* — Zhengxi Liu
(74) *Attorney, Agent, or Firm* — Birch, Stewart, Kolasch & Birch, LLP

(57) ABSTRACT

A television 1 of the present invention is a television 1 for processing display data and displaying an image based on the processed display data, the display data containing the image and a control script that defines at least a function of displaying the image, wherein the television 1 includes a basic function executing section 42 for executing a basic function program called from the control script, the basic function program being stored in a basic function program storage section 29; and a control script executing section 41 for controlling basic function executing section 42 according to the control script so as to perform a first function for displaying the image, the first function being defined by the control script, the control script further defines a second function which the television 1 performs while the image is being displayed by the first function, and the control script executing section 41 controls the basic function executing section 42 according to the control script so as to execute the second function.

22 Claims, 55 Drawing Sheets

U.S. PATENT DOCUMENTS

| | | |
|---|---|---|
| 2003/0115598 A1 | 6/2003 | Pantoja |
| 2003/0214529 A1 | 11/2003 | Martin, Jr. et al. |
| 2004/0091234 A1 | 5/2004 | Delorme et al. |
| 2006/0053468 A1 | 3/2006 | Sudoh et al. |
| 2006/0065492 A1* | 3/2006 | Trifu ............................. 187/396 |
| 2006/0129933 A1* | 6/2006 | Land et al. .................... 715/723 |
| 2006/0265669 A1 | 11/2006 | Lee |
| 2007/0088784 A1 | 4/2007 | Chiba et al. |

FOREIGN PATENT DOCUMENTS

| | | |
|---|---|---|
| JP | 11-65813 A | 3/1999 |
| JP | 2004-166268 A | 6/2004 |
| JP | 2004-343683 A | 12/2004 |
| JP | 2005-51563 A | 2/2005 |
| JP | 2005-210371 A | 8/2005 |
| JP | 2006-011358 A | 1/2006 |

OTHER PUBLICATIONS

"Overview of i-appli Content:" /Services/NTT DoCoMo, pp. 1-2.
"I-mode Java Content Developer's Guide—Functional Descriptions—" Release 1.1, NTT DoCoMo, Inc. May 14, 2000 pp. 1-pp. 103.

* cited by examiner

FIG. 7

| ALBUM ID | 5874  5426  6984  3214 | ← R1 |
|---|---|---|
| PICTURE ID | NO. 1 | ← R2 |
| DISPLAY SCREEN ID | Scr_C | ← R3 |
| TERMINAL ID | 192.168.10.*** | ← R4 |
| SPECIFICATION INFO. | 1366*768 | ← R5 |
| MACHINE TYPE | LD-375P1 | ← R6 |
| SOFTWARE VERSION INFORMATION | NETWORK ALBUM Ver. 3.0.1 | ← R7 |

RELEVANT INFORMATION TABLE

| MACHINE TYPE | TERMINAL ID | SCREEN SIZE | PIXEL NUMBER | SOFTWARE VERSION INFORMATION | COMMENT DISPLAY | OPERATION GUIDE DISPLAY | REPEAT REPRODUCTION | FRAME RATE | NUMBER OF PREVIOUSLY-VIEWED ALBUMS LISTED | VIEWER'S AGE | VIEWER'S DOMICILE | POST CODE |
|---|---|---|---|---|---|---|---|---|---|---|---|---|
| LD-375P1 | 192.168.10.*** | 37V | 1366*768 | NETWORK ALBUM Ver. 3.0.1 | ON | ON | OFF | 10 sec. | 2 | 33 | TOKYO | 133-0052 |

C11 — (MACHINE TYPE ... SOFTWARE VERSION INFORMATION)
C12 — (COMMENT DISPLAY ... NUMBER OF PREVIOUSLY-VIEWED ALBUMS LISTED)
C13 — (VIEWER'S AGE ... POST CODE)

FIG. 12

```
<svg id="svg">
  <ev:listener ev:event="load" ev:handler="#script" ev:observer="#svg"/>
  <handler id="script" type="application/ecmascript">
  <![CDATA[
    ~Omitted (definition of a variable for use in SVG script)~
    document.getElementById('slide_rotate' + rotateno).setTrait("visibility", 'visible');
    document.getElementById('menu').menuback.setTrait("visibility", 'hidden');
    document.getElementById('playicon').setTrait("visibility", 'visible');
    document.getElementById('pauseicon').setTrait("visibility", 'hidden');     ---261 function menuFunction(){
       if (submenu == "submenu2") {
          slideimg = document.getElementById('slide_rotate' + rotateno);
          slideimg.setTrait("visibility", 'hidden');

~ Omitted Calculating Rotation Position, store variable rotateno. ~ slideimg = document.getElementById('slide_rotate' + rotateno);
          slideimg.setTrait("visibility", 'visible');
       }
       else if (submenu == "submenu3") {
          /*Definition of operation for next menu*/
       }
       hiddenMenu();
    }                                                                          ---132d function keyEvent(){
       if (evt.data == 'y'){
          if (menu == close) {
             document.getElementById('menu').menuback.setTrait("visibility", 'visible');
          }
          else if (menu == open) {
             document.getElementById('menu').menuback.setTrait("visibility", 'hidden');
          }
       }                                                                       ---132a
       else if (evt.data == 'k') {
          if (menu == close) {
             if (playmode=play) {
                document.getElementById('playicon').setTrait("visibility", 'hidden');
                document.getElementById('pauseicon').setTrait("visibility", 'visible');
                playmode = stop;
             }
             else if (playmode=stop) {
                document.getElementById('playicon').setTrait("visibility", 'visible');
                document.getElementById('pauseicon').setTrait("visibility", 'hidden');
                playmode = play;
             }
          }                                                                    ---132c
          else if (menu == open) {
             if (submenu == close) {
                submenu = "submenu2";
                document.getElementById('submenu2').setTrait("visibility", 'visible');
             }
             else {
                submenu = close;
                menuFunction()
             }
          }
       }                                                                       ---132b
       else if (evtData == 'z') {
          activeNode = document.getElementById('return');
          rootNode.setFocus(activeNode);
       }
       evt.currentTarget.addEventListener('textinput', keyEvent, false);
    ]]>
  </handler>
  <a id="return" xlink:href="link://template"></a>
</svg>
```

FIG. 15

```
                                                                    132b'
┌─────────────────────────────────────────────────────────────────────┐
│    else if (menu == open) {                                         │
│       if (submenu == close) {                                       │
│          ┌─────────────────────┐                                    │
│          │ if (rotate == true) {│ ┌── 1230                          │
│          └─────────────────────┘                                    │
│             submenu = "submenu2";                                   │
│             document.getElementById('submenu2').setTrait("visibility", 'visible'); │
│          }                                                          │
│       }                                                             │
│       else {                                                        │
│          submenu = close;                                           │
│          menuFunction()                                             │
│       }                                                             │
│    }                                                                │
└─────────────────────────────────────────────────────────────────────┘
```

FIG. 16

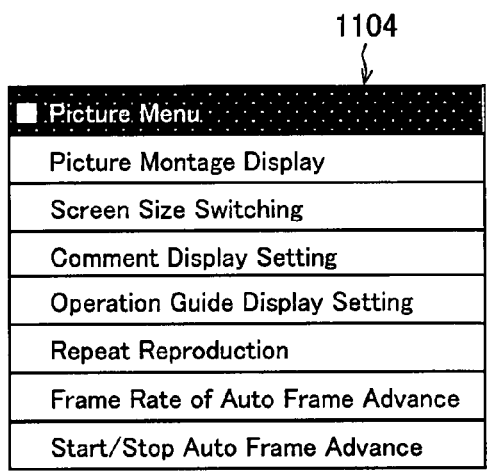

FIG. 17 (a)

```
<g id="m1" xml:space="preserve" visibility="hidden">
    <rect x="4" y="646" width="390" height="378" fill="#505050" fill-opacity="0.5" />
    <rect x="0" y="642" width="390" height="42" fill="#4949A7" />
    <rect x="0" y="684" width="390" height="42" fill="#FFB400" />
    <text x="30" y="678" font-size="28" fill="#FFFFFF">Picture Menu</text>
    <text x="30" y="720" font-size="28" fill="#000000">Picture Montage Display</text>
    <text x="30" y="762" font-size="28" fill="#000000">Screen Size Switching</text>
    <text x="30" y="804" font-size="28" fill="#000000">Comment Display Setting</text>
    <text x="30" y="846" font-size="28" fill="#000000">Operation Guide Display Setting</text>
    <text x="30" y="888" font-size="28" fill="#000000">Repeat Reproduction</text>
    <text x="30" y="930" font-size="28" fill="#000000">Frame Rate of Auto Frame Advance</text>
    <text x="30" y="972" font-size="28" fill="#000000">Start/Stop Auto Frame Advance</text>
    <text x="30" y="1014" font-size="28" fill="#000000">Other</text>
</g>
<g id="submenu3" xml:space="preserve" visibility="hidden">
    <rect x="400" y="730" width="390" height="84" fill="#4949A7" />
    <text x="426" y="762" font-size="28" fill="#000000">Picture Rotation</text>
</g>
```

FIG. 17 (b)

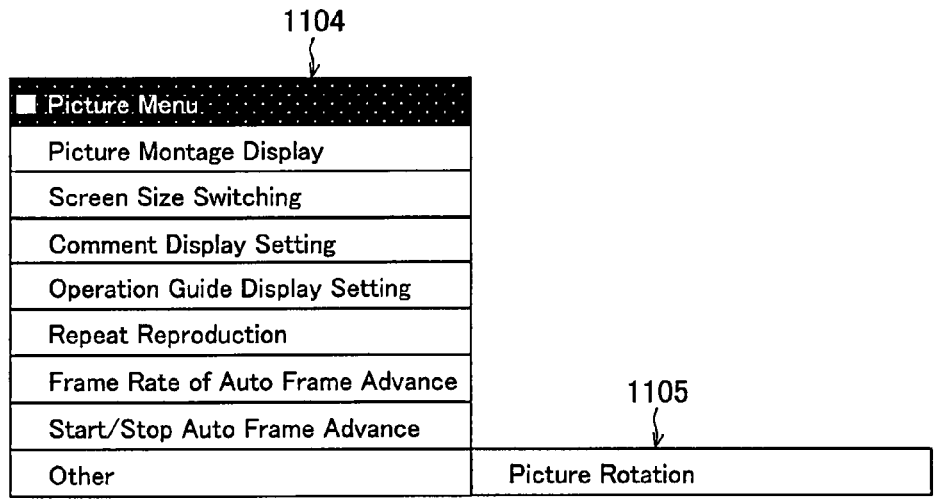

FIG. 19

| PATTEN DATA TABLE ||| 
|---|---|---|
| DISPLAY SCREEN ID | PATTERN DATA NAME | PATTERN DATA |
| Scr_A | Display Screen A (Screen of List of Previously-viewed Albums) | (Data) |
| Scr_B | Display Screen B (Album ID Input Screen) | (Data) |
| Scr_C | Display Screen C (Slide Show Display Screen) | (Data) |
| Scr_C1 | Display Screen C1 (Thumbnail Display Screen) | (Data) |
| Scr_D | Display Screen D (Single Picture Display Screen) | (Data) |
| Scr_E | Display Screen E (Error Dialogue Display Screen) | (Data) |
| : | : | : |

FIG. 20

ALBUM INFORMATION TABLE

| ALBUM ID | NAME OF ALBUM CREATOR | TITLE OF ALBUM | COMMENT ON ALBUM | DATE OF CREATION | THE NUMBER OF PICTURES | SOUND FILE NAME | PICTURE ID | FILE NAME OF PICTURE | EFFECT ID |
|---|---|---|---|---|---|---|---|---|---|
| 01254782 25142584 | ONONO IMOKO | DISNEY | TAKEN AT DISNEYLAND | 2006/01/22 | 10 | bgm1.midi | NO.1 | 00123.jpg | effect00 |
| | | | | | | | NO.2 | 00124.jpg | effect01 |
| | | | | | | | NO.3 | 00125.jpg | effect01 |
| | | | | | | | NO.4 | 00126.jpg | effect01 |
| | | | | | | | NO.5 | 00127.jpg | effect00 |
| | | | | | | | NO.6 | 00128.jpg | effect01 |
| | | | | | | | NO.7 | 00129.jpg | effect02 |
| | | | | | | | NO.8 | 00130.jpg | effect02 |
| | | | | | | | NO.9 | 00131.jpg | effect02 |
| | | | | | | | NO.10 | 00132.jpg | effect02 |
| 34345345 45345345 | | | | | | | | | |
| 37983487 23492342 | SHARP TARO | FROM 18TH FLOOR | VIEW FROM 18TH FLOOR IN MAKUHARI | 2006/06/15 | 4 | bgm2.midi | NO.1 | 00345.jpg | effect00 |
| | | | | | | | NO.2 | 00346.jpg | effect01 |
| | | | | | | | NO.3 | 00347.jpg | effect02 |
| | | | | | | | NO.4 | 00348.jpg | effect00 |
| 65498565 46465466 | A STUDENT | BLACKBOARD | NOTES FROM LECTURE ON THE OTHER DAY | 2006/05/04 | 1 | NONE | NO.1 | 00259.jpg | effect00 |

FIG. 21

PICTURE INFORMATION TABLE OF ALBUM ID (01254782251142584)

| PICTURE ID (DISPLAY ORDER) | FILE NAME OF PICTURE | HORIZONTAL PIXEL NUMBER | VERTICAL PIXEL NUMBER | DATA SIZE | TITLE OF PICTURE | COMMENT ON PICTURE | ROTATION FUNCTION | COPYRIGHT | PICTURE |
|---|---|---|---|---|---|---|---|---|---|
| NO.1 | 00123.jpg | 640 | 480 | 86KB | ENTRANCE | MANY PEOPLE ARE ON THE LINE | NEED | YES | (DATA) |
| NO.2 | 00124.jpg | 640 | 480 | 110KB | VEHICLE 1 | THERE ARE MICE | NEED | NO | (DATA) |
| NO.3 | 00125.jpg | 640 | 480 | 91KB | VEHICLE 2 | THERE ARE BEARS | NO NEED | NO | (DATA) |
| NO.4 | 00126.jpg | 800 | 600 | 250KB | VEHICLE 3 | THERE ARE DUCKS | NEED | NO | (DATA) |
| NO.5 | 00127.jpg | 1024 | 768 | 420KB | RESTAURANT | IT'S DELICIOUS | NEED | NO | (DATA) |
| NO.6 | 00128.jpg | 1920 | 1080 | 640KB | VEHICLE 4 | THERE ARE DOGS | NO NEED | NO | (DATA) |
| .. | .. | .. | .. | .. | .. | .. | .. | .. | .. |

FIG. 22

| RULE TABLE | | | | |
|---|---|---|---|---|
| FUNCTION ID | FUNCTION | DETERMINATION METHOD | SELECTION RULE | |
| | | | DETERMINATION RESULT (if) | SELECTED OPERATION (then) |
| FUNCTION 1 | ROTATION FUNCTION | DETERMINE WHETHER UPSIDE OF PICTURE IS UP OR DOWN. | UPSIDE IS UP | NOT ADD FUNCTION 1 TO OPERATION MENU. |
| | | | UPSIDE IS DOWN | ADD FUNCTION 1 TO OPERATION MENU, ADD FUNCTION 1-1 AND FUNCTION 1-2 TO SUB OPERATION MENU. |
| FUNCTION 2 | SCREEN SIZE SWITCHING FUNCTION | COMPARE TERMINAL PIXEL NUMBER AND PHOTO PIXEL NUMBER. | TERMINAL PIXEL NUMBER ≦ PHOTO PIXEL NUMBER | NOT ADD FUNCTION 2 TO OPERATION MENU. |
| | | | TERMINAL PIXEL NUMBER > PHOTO PIXEL NUMBER | ADD FUNCTION 2 TO OPERATION MENU. |
| FUNCTION 3 | COMMENT DISPLAY FUNCTION | DETERMINE WHETHER WITH OR WITHOUT PICTURE COMMENT. | WITHOUT PICTURE COMMENT | NOT ADD FUNCTION 3 TO OPERATION MENU. |
| | | | WITH PICTURE COMMENT | ADD FUNCTION 3 TO OPERATION MENU. |
| FUNCTION 4 | OPERATION GUIDE DISPLAY FUNCTION | DETERMINE SETTING INFO. "OPERATION GUIDE DISPLAY". | "OFF" IS SET AS SETTING INFO. "OPERATION GUIDE DISPLAY". | ADD "OTHER" TO OPERATION MENU. AND ADD FUNCTION 4 TO SUB OPERATION MENU. |
| | | | "NO" IS SET AS SETTING INFO. "OPERATION GUIDE DISPLAY". | ADD FUNCTION 4 TO OPERATION MENU. |
| FUNCTION 5 | REPEAT REPRODUCTION FUNCTION | — | — | OPERATION MENU ALWAYS HAS FUNCTION 5. |
| FUNCTION 6 | FRAME RATE OF FRAME ADVANCE SETTING FUNCTION | — | — | OPERATION MENU AND SUB OPERATION MENU ALWAYS HAVE FUNCTION 6. |
| FUNCTION 7 | FRAME ADVANCE CONTROL FUNCTION | — | — | OPERATION MENU ALWAYS HAS FUNCTION 7. |
| FUNCTION 8 | PRINTING FUNCTION | DETERMINE "COPYRIGHT INFO" OF PICTURE | WITH COPYRIGHT LOCK | NOT ADD FUNCTION 8 TO OPERATION MENU. |
| | | | WITHOUT COPYRIGHT LOCK | ADD FUNCTION 8 TO OPERATION MENU. |
| ⋮ | ⋮ | ⋮ | ⋮ | ⋮ |
| C1 | C2 | C3 | C41 | C42 |

FUNCTION TABLE

| FUNCTION ID | FUNCTION | NAME OF OPERATION ITEM | SCRIPT |
|---|---|---|---|
| FUNCTION 1 | Rotation Function | "Picture Rotation" | •If enter button is pressed while the operation item is being focused then open corresponding sub operation menu. |
| FUNCTION 1-1 | 90° Leftward Rotation Function | "90° Leftward Rotation" | •If enter button is pressed while the operation item is being focused, then rotate displaying picture by 90° leftward. |
| FUNCTION 1-2 | 90° Rightward Rotation | "90° Rightward Rotation" | •If enter button is pressed while the operation item is being focused, then rotate displaying picture by 90° rightward. |
| FUNCTION 2 | Screen Size Switching Function | "Screen Size Switching" | •If enter button is pressed while the operation item is being focused then enlarge displaying picture to screen-full size. |
| FUNCTION 3 | Comment Display Function | "Comment Display Setting" | •If enter button is pressed while the operation item is being focused and comment is not displayed then display comment of displaying picture.<br>•If enter button is pressed while the operation item is being focused and comment is displayed, then stop displaying comment. |
| FUNCTION 4 | Operation Guide Display Function | "Operation Guide Display Setting" | •If enter button is pressed while the operation item is being focused and operation guide is not displayed, then display operation guide screen.<br>•If enter button is pressed while the operation item is being focused and operation guide is displayed, then stop displaying operation guide. |
| FUNCTION 5 | Repeat Reproduction Function | "Repeat Reproduction" | •If enter button is pressed while the operation item is being focused and it is set not to perform repeat reproduction, then set it to perform repeat reproduction.<br>•If enter button is pressed while the operation item is being focused and it is set to perform repeat reproduction, then set it not to perform repeat reproduction. |
| FUNCTION 6 | Frame Rate Setting Function | "Frame Rate of Auto Frame Advance" | •If enter button is pressed while the operation item is being focused then open corresponding sub operation menu. |
| FUNCTION 6-1 | Frame Advance at 5 sec Frame Rate | "5 sec Frame Rate" | •If enter button is pressed while the operation item is being focused then auto reproduce slide at 5 sec frame rate. |
| FUNCTION 6-2 | Frame Advance at 10 sec Frame Rate | "10 sec Frame Rate" | •If enter button is pressed while the operation item is being focused then auto reproduce slide at 10 sec frame rate. |
| FUNCTION 6-3 | Frame Advance at 30 sec Frame Rate | "30 sec Frame Rate" | •If enter button is pressed while the operation item is being focused then auto reproduce slide at 30 sec frame rate. |
| FUNCTION 6-4 | Frame Advance at 60 sec Frame Rate | "60 sec Frame Rate" | •If enter button is pressed while the operation item is being focused then auto reproduce slide at 60 sec frame rate. |
| FUNCTION 7 | Frame Advance Control Function | "Start/Stop Auto Frame Advance" | •If enter button is pressed while the operation item is being focused and auto frame advance is being performed then stop auto frame advance and display auto frame advance stop icon.<br>•If enter button is pressed while the operation item is being focused and auto frame advance is not performed then start auto frame advance and display auto frame advance execution icon. |
| FUNCTION 8 | Printing Function | "Picture Printing" | •If enter button is pressed while the operation item is being focused then print displaying picture. |

FIG. 24

```
<g id="menu" xml:space="preserve" visibility="hidden">
  <rect x="@@_menubackX_@@" y="@@_menubackY_@@" width="@@_menubackWidth_@@" height="@@_menubackHeight_@@" fill="#505050" fill-opacity="0.5" />
  <rect x="@@_menutitlebackX_@@" y="@@_menutitlebackY_@@" width="390" height="42" fill="#4949A7" />
  <text x="@@_menutitleX_@@" y="@@_menutitleY_@@" font-size="28" fill="#FFFFFF">Picture Menu</text>
  <text x="@@_menu1X_@@" y="@@_menu1Y_@@" font-size="28" fill="#000000">@@_menu1_name_@@</text>
  <text x="@@_menu2X_@@" y="@@_menu2Y_@@" font-size="28" fill="#000000">@@_menu2_name_@@</text>
  <text x="@@_menu3X_@@" y="@@_menu3Y_@@" font-size="28" fill="#000000">@@_menu3_name_@@</text>
  <text x="@@_menu4X_@@" y="@@_menu4Y_@@" font-size="28" fill="#000000">@@_menu4_name_@@</text>
  <text x="@@_menu5X_@@" y="@@_menu5Y_@@" font-size="28" fill="#000000">@@_menu5_name_@@</text>
  <text x="@@_menu6X_@@" y="@@_menu6Y_@@" font-size="28" fill="#000000">@@_menu6_name_@@</text>
  <text x="@@_menu7X_@@" y="@@_menu7Y_@@" font-size="28" fill="#000000">@@_menu7_name_@@</text>
  <text x="@@_menu8X_@@" y="@@_menu8Y_@@" font-size="28" fill="#000000">@@_menu8_name_@@</text>
</g>
<g id="submenu2" xml:space="preserve" visibility="hidden">
  <rect x="@@_submenu2backX_@@" y="@@_submenu2backY_@@" width="@@_submenu2backWidth_@@" height="@@_submenu2backHeight_@@" fill="#4949A7" />
  <text x="@@_submenu2_1X_@@" y="@@_submenu2_1Y_@@" font-size="28" fill="#000000">@@_submenu2_name1_@@</text>
  <text x="@@_submenu2_2X_@@" y="@@_submenu2_2Y_@@" font-size="28" fill="#000000">@@_submenu2_name2_@@</text>
  <text x="@@_submenu2_3X_@@" y="@@_submenu2_3Y_@@" font-size="28" fill="#000000">@@_submenu2_name3_@@</text>
  <text x="@@_submenu2_4X_@@" y="@@_submenu2_4Y_@@" font-size="28" fill="#000000">@@_submenu2_name4_@@</text>
</g>
```

FIG. 25

```
<g id="slide_rotate0" xml:space="preserve" visibility="hidden">
    <image x="0" y="0" width="1920" height="1080" xlink:href="slide.jpg"/>
</g>                                                                       251
<g id="slide_rotate1" xml:space="preserve" visibility="hidden" transform="rotate(90, 960, 540)">
    <image x="0" y="0" width="1920" height="1080" xlink:href="slide.jpg"/>
</g>
<g id="slide_rotate2" xml:space="preserve" visibility="hidden" transform="rotate(180, 960, 540)">
    <image x="0" y="0" width="1920" height="1080" xlink:href="slide.jpg"/>
</g>
<g id="slide_rotate3" xml:space="preserve" visibility="hidden" transform="rotate(270, 960, 540)">
    <image x="0" y="0" width="1920" height="1080" xlink:href="slide.jpg"/>
</g>
```

FIG. 26

```
                                                            252
<text x="98 " y="98" id="text01" font-size="64" fill="rgb(0, 0, 0)">Various Weathers</text>
<text x="98" y="918" id="text02" font-size="64" fill="rgb(0, 0, 0)">2006/06/30</text>
```

FIG. 30

```
function setMenuCursor(){
    ~read setting info~
    ~read operation of slide show execution control section~
    ~move cursor to (sub) operation item~
} else if (evtData == 'y'){
    if(submenu == open) {
    setMenuCursor();
        ~operation menu display process (color of operation item with cursor thereon to be changed)~
    }
}
```

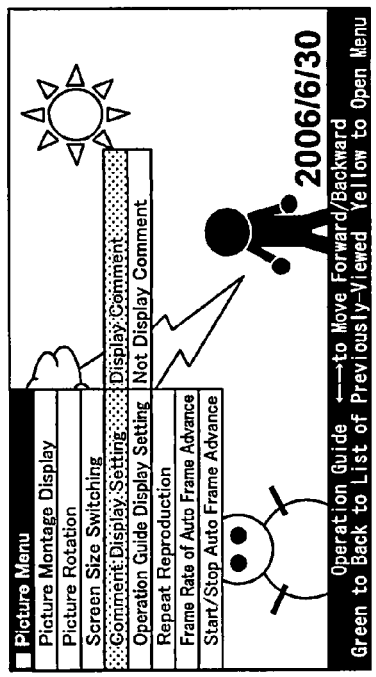
FIG. 31 (a)
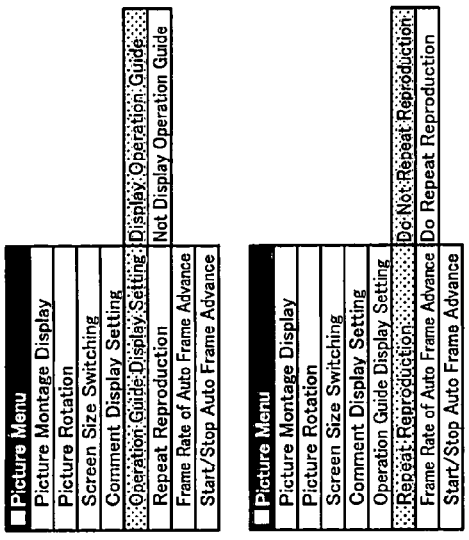
FIG. 31 (b)
FIG. 31 (c)
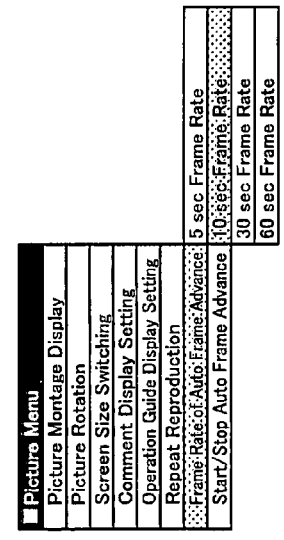
FIG. 31 (d)
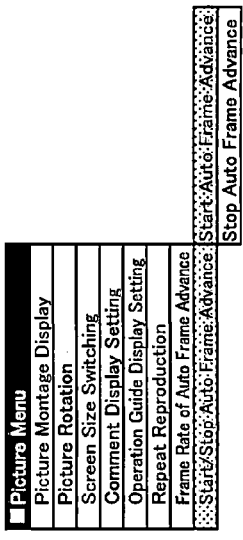
FIG. 31 (e)

FIG. 32

```
<svg id="svg">
<ev:listener ev:event="load" ev:handler="#script" ev:observer="#svg"/>
<handler id="script" type="application/ecmascript">
<![CDATA[
var document = evt.currentTarget.ownerDocument;
function big(){
  if(evt.data == 'a'){
    document.getElementById('curcle').setFloatTrait("r", '100');
    document.getElementById('updatearea').setTrait("visibility", 'visible');
  }
  ~
  evt.currentTarget.addEventListener('textinput', big, false);
]]>
</handler>
<rect id="updatearea" fill="none" stroke="none" x="100" y="100"
    width="350" height="250"/>
<circle id="circle" x="200" y="200" r="50" fill="none"/>~circle object
<path1 .../>~cloud object (path of the cloud, display position of the cloud, designated color of the cloud, etc.)~
<path2 .../>~balloon object (path of the balloon, display position of the balloon, designated color of the balloon, etc.)~
</svg>
```

- 113b: `document.getElementById('curcle').setFloatTrait("r", '100');` (262)
- 112b: `<rect id="updatearea" ... width="350" height="250"/>`
- 112a: balloon/cloud objects
- 113: handler section
- 112: element section

FIG. 36 (a)

| IMAGE DATA REFORMATION REGION LIST | | | | | |
|---|---|---|---|---|---|
| CONTROL SCRIPT ID | OBJECT ID | X COORDINATE | Y COORDINATE | WIDTH | HEIGHT |
| svg1 | updatearea | 100 | 100 | 350 | 250 |
| | circle | 100 | 100 | 200 | 200 |
| : | : | : | : | : | : |

FIG. 36 (b)

| SETTLED IMAGE DATA REFORMATION REGION INFORMATION | | | | | |
|---|---|---|---|---|---|
| CONTROL SCRIPT ID | IMAGE DATA REFORMATION REGION ID | X COORDINATE | Y COORDINATE | WIDTH | HEIGHT |
| svg1 | svg1_001 | 100 | 100 | 450 | 300 |
| : | : | : | : | : | : |

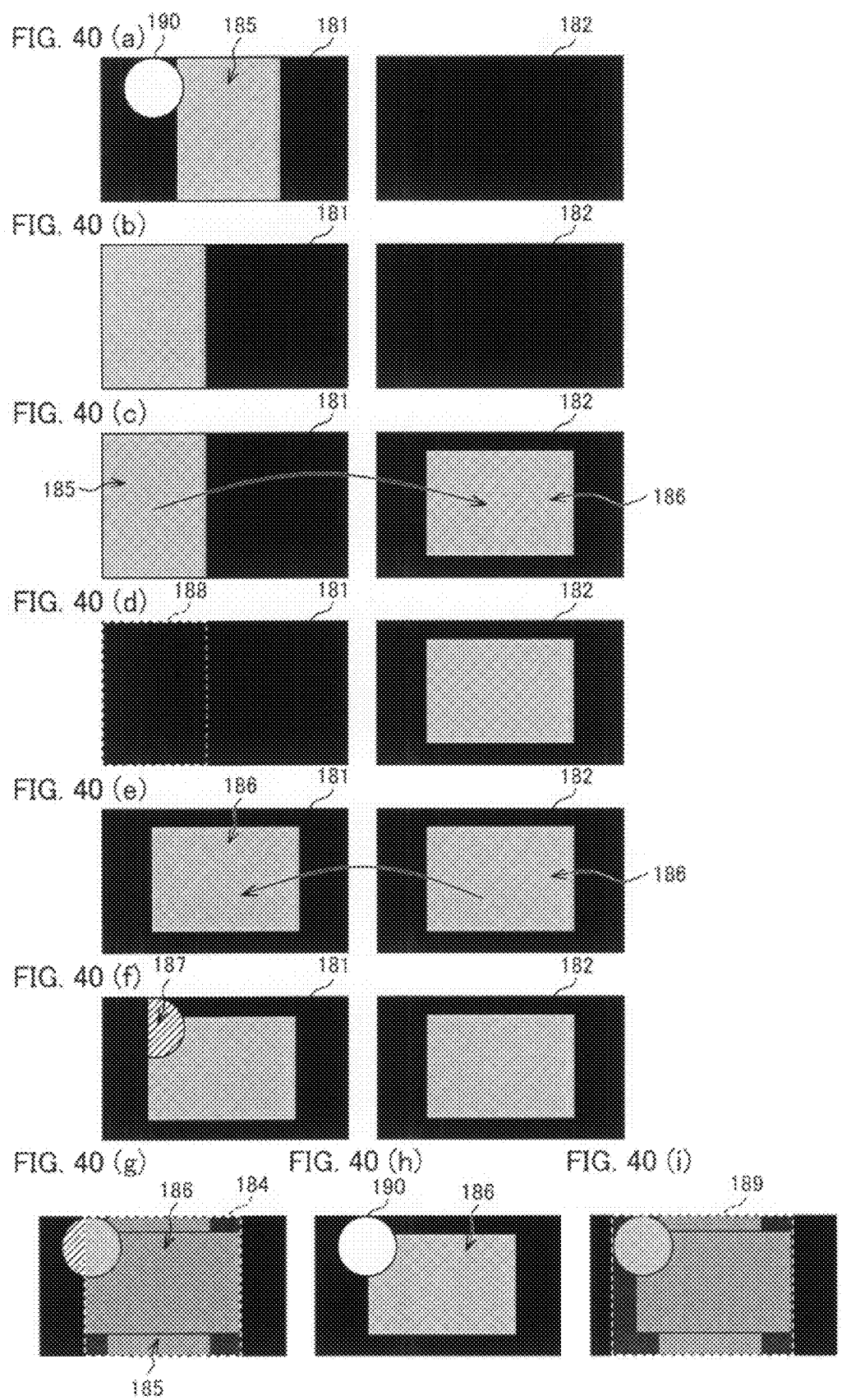

FIG. 41

```
<svg id="svg" width="1920" height="1080">
  <ev:listener ev:event="load" ev:handler="#script" ev:observer="#svg"/>
  <handler id="script" type="application/ecmascript">
  <![CDATA[
    var document = evt.currentTarget.ownerDocument;
    function rotate(){
      if (evt.data == 'r'){
        document.getElementById('slide1').setTrait("visibility", 'hidden');
        document.getElementById('slide2').setTrait("visibility", 'visible');
        document.getElementById('dirtyRect').setTrait("visibility", 'visible');    ---113c
      }
    }
    evt.currentTarget.addEventListener('textinput', rotate, false);
  ]]>                                                                               112c
  </handler>
  <rect id="dirtyRect" x="0" y="0" width="900" height="1080" fill="none" stroke="none"/>
  <g id="slide1" visibility="hidden" xml:space="preserve">
    <image height="1080" width="900" x="0" y="0" xlink:href="photo.jpg" />
  </g>
  <g id="slide2" transform="rotate(90 960, 540)" visibility="hidden" xml:space="preserve">
    <image height="1080" width="900" x="0" y="0" xlink:href="photo.jpg"/>
  </g>
</svg>
```

FIG. 43

```
                          431
~Omitted~
    else if (evt.data == 'k') {
        if (menu == close) {
~Omitted~
        else if (menu == open) {
            if (submenu == close) {
                if (rotate == true) {
                    submenu = "submenu"+cursor;
                    document.getElementById(submenu).setTrait("visibility", 'hidden');
                }
            }
        }
~Omitted~
<g id="submenu2" xml:space="preserve" visibility="hidden">
    <rect x="400" y="730" width="390" height="84" fill="#4949A7" />
    <text x="426" y="762" font-size="28" fill="#000000">90° Leftward Rotation</text>
    <text x="426" y="804" font-size="28" fill="#000000">90° Rightward Rotation</text>
</g>
```

FIG. 44 (a)
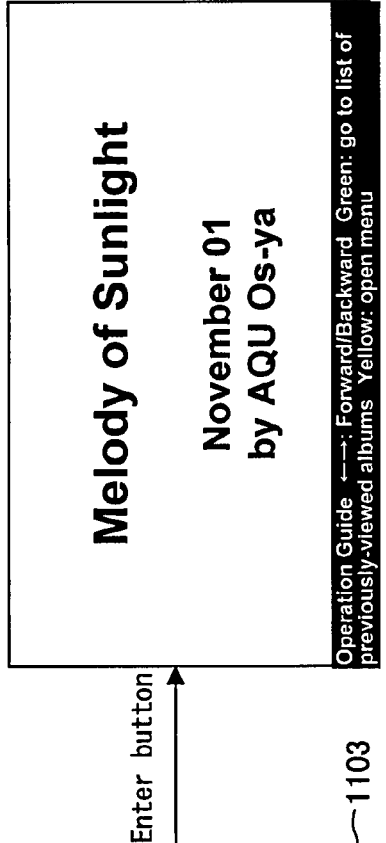
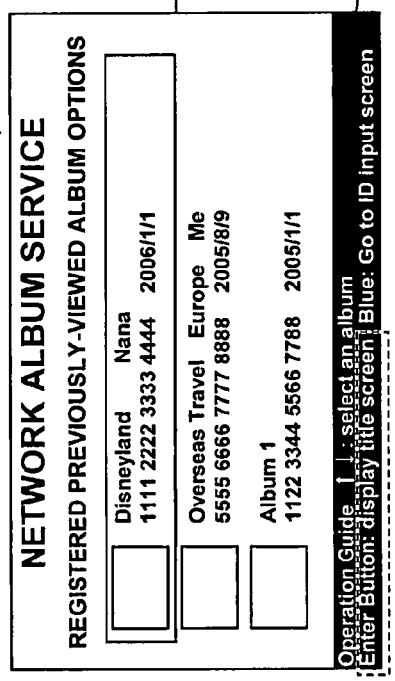
FIG. 44 (b)
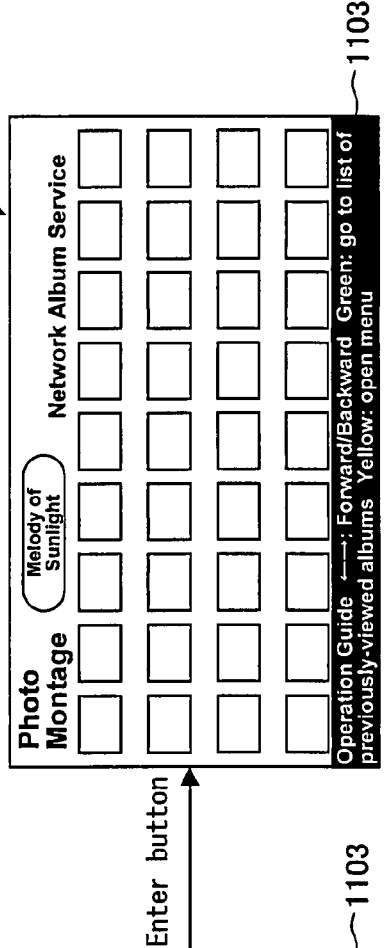
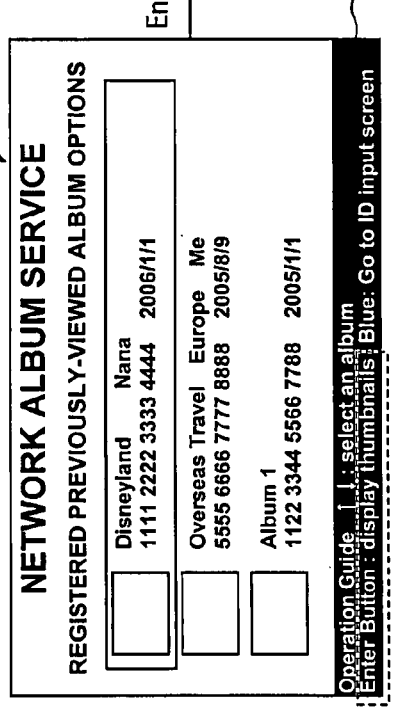

FIG. 45

```
<body>
<wizard>
<step id="top" app="svg-viewer" param="file=top.svg target-name="albumid imagenum" target-type="text/plain"/>
                                                                                    ─── 451

<switch id="judge_imagenum" xlink:href="imagenum">
      <nextstep xlink:href="cpm_title" when="10"/>         ─── 452
      <nextstep xlink:href="cpm_thumbnail" when="11"/>     ─── 453
   </switch>

<step id="cpm_title"
   connector="CpmConnector"
   param="uri=@uri.txt,method=getTitle,albumId=albumid"
   target-name="cpmerror" target-type="text/plain" xlink:href=title.mtd/>

<step id="cpm_thumbnail"
   connector="CpmConnector"
   param="uri=@uri.txt,method=getThumbnail,albumId=albumid"
   target-name="cpmerror" target-type="text/plain" xlink:href=thumbnail.mtd/>
                                                                                    ─── 454
</wizard>
</body>
```

FIG. 47

| EFFECT DEFINITION SCRIPT TABLE | | | | | |
|---|---|---|---|---|---|
| effectID | attributeName | dur | from | to | end |
| effect00 | Fill-opacity | 3 | 0.8 | 0 | Accesskey(y) |
| effect01 | Fill-opacity | 3 | 0.6 | 0 | Accesskey(y) |
| effect02 | Fill-opacity | 2 | 0.8 | 0.1 | Accesskey(y) |
| ↑ | ↑ | ↑ | ↑ | ↑ | ↑ |
| C21 | C22 | C23 | C24 | C25 | C26 |

FIG. 51

```
<?xml version="1.0" encoding="UTF-8"?>
<svg id="svg" width="1920" height="1080" viewBox="0 0 1920 1080" display="inline" version="1.1" baseProfile="tiny">

<ev:listener ev:event="load" ev:observer="#svg" ev:handler="#myHandler" />
<handler id="myHandler" type="application/ecmascript">
<![CDATA[
    Description of declaration or initialization of variable is written here.
function animationControl() {
    evtData = evt.data;
    if (evtData == 'l') {                                                        ~~132e
        if (effectFlag == 1) {
            document.getElementById('effect').setTrait("visibility", "visible");
        } else {
            document.getElementById('effect').setTrait("visibility", "hidden");
        }
    }
    if (evtData == 'b') {                                                        ~~132f
        if (effectFlag == 0) {
            effectFlag = 1;
        } else {
            effectFlag = 0;
        }
    }
}
evt.currentTarget.addEventListener('textinput', animationControl, false);
]]>
</handler>

<g id="effect" xml:space="preserve" visibility="hidden">
    <rect width="1920" height="1080" fill="#000000" fill-opacity="0"/>
    <animate id="fadeIn" attributeName="fill-opacity" dur="3" from="0.8" to="0" end="accessKey(y)"/>   ~~284b
</rect>
</g>
</svg>
```

```
<?xml version="1.0" encoding="UTF-8"?>
<svg id="svg" width="1920" height="1080" viewBox="0 0 1920 1080" display="inline" version="1.1"
     baseProfile="tiny">

<ev:listener ev:event="load" ev:observer="#svg" ev:handler="#myHandler" />
<handler id="myHandler" type="application/ecmascript">
<![CDATA[
    Description of declaration or initialization of variable and description of menu operation are written here.

function effectEnd()
    {
        document.getElementById('string').setTrait('display', 'inline');
    } document.getElementById('fadeIn ').addEventListener('endEvent', effectEnd, false);
]]>
</handler>

<rect width="1920" height="1080" fill="#000000" fill-opacity="0">
    <animate id="fadeIn" attributeName="fill-opacity" dur="3" from="0.8" to="0" end="accessKey(y)"/>
</rect>

<g id="string" xml:space="preserve" display="none">
    <text x="100" y="100" font-size="64" fill="white">LETTER STRING OF TITLE</text>
    <text x="100" y="1000" font-size="64" fill="white">LETTER STRING OF COMMENT</text>
</g>
</svg>
```

```
......
/*From a variable indicating terminal information, acquire how many previously-viewed
albums are to be listed on the display screen in response to the user's request*/
 h_max = ClientLocalData.HistoryCount;    ~160 if( histry > h_max ){  /*if the number of the previously-viewed albums to be listed on the
display screen > h_max*/
 ~then the display attributes of the previously-viewed albums of the number minus h_max
are changed to hidden~
} if( directkey > h_max ){
 ~then direct keys of the previously-viewed albums of the number minus h_max are
invalidated~
}
......
```

FIG. 55

```
<g id="history1" xml:space="preserve" visibility="visible">
data of the first previously-viewed album (thumbnails, title, album ID, date)
</g>
<g id="history2" xml:space="preserve" visibility="visible">
data of the second previously-viewed album (thumbnails, title, album ID, date)
</g>
<g id="history3" xml:space="preserve" visibility="hidden">     ~161
data of the third previously-viewed album (thumbnails, title, album ID, date)
</g>
```

FIG. 57

```
function getHistoryData(vname){}          ~162
~ acquire a value of a previously-viewed album, which value is stored in the terminal and
corresponds to vname. ~
~ return the acquired value of the previously-viewed album.~
}
.....
h_id = getHistoryData(albumID);
If( h_id != NULL ){  /* if the terminal stores the album ID*/
~ then replace the previously-viewed album being listed on the display screen with the
album stored in the terminal.~
}
.....
```

FIG. 58

```
<g id="history1" xml:space="preserve" visibility="visible">
data of the first previously-viewed album (thumbnails, title, album ID, date)
</g>
<g id="history2" xml:space="preserve" visibility="visible">
data of the second previously-viewed album (thumbnails, title, album ID, date)
</g>
<g id="history3" xml:space="preserve" visibility="visible">
data of the third previously-viewed album (thumbnails, title, album ID, date)
</g>
```
~~163a

```
<g id="history1" xml:space="preserve" visibility="visible">
data of the first previously-viewed album (thumbnails, title, album ID, date)
</g>
<g id="history2" xml:space="preserve" visibility="visible">
data of the second previously-viewed album (thumbnails, title, album ID, date)
</g>
<g id="history3" xml:space="preserve" visibility="visible">
data of the previously-viewed album stored in the terminal (thumbnails, title, album ID, date)
</g>
```
~~163b

IMAGE DISPLAY APPARATUS, IMAGE DATA PROVIDING APPARATUS, AND IMAGE DISPLAY SYSTEM PROVIDING A CONTROL SCRIPT FOR EXECUTING BASIC FUNCTIONS

This nonprovisional application claims the benefit under 35 U.S.C. §119(e) of U.S. Provisional Application No. 60/836,931 filed on Aug. 11, 2006, and claims priority under 35 U.S.C. §119(a) of Patent Applications No. 168253/2007 filed in Japan on Jun. 26, 2007, No. 168254/2007 filed in Japan on Jun. 26, 2007, and No. 168255/2007 filed in Japan on Jun. 26, 2007, the entire contents of which are hereby incorporated by reference.

FIELD OF THE INVENTION

The present invention relates to a method of controlling a computer-embedded apparatus, especially to an image display apparatus, image data providing apparatus, image display system, a method of controlling image display system, a control program, and recording medium, each of which is for controlling an image display apparatus for displaying an image.

BACKGROUND OF THE INVENTION

Use of digital household appliances has been increased recently. It has developed such that Digital household appliances, such as digital television, HDD recorder, etc. have a communication function and connected to a network, via which varies services can be enjoyed and various function can be executed.

Meanwhile, this requires such digital household appliances to have many functions therein, thereby adding more demands in developing digital household appliances with more variety. More specifically, what are demanded are: avoiding an increase in steps necessary for developing or testing the digital household appliances; reducing loss due to reworking, quickly changing functions of the apparatus in response to the fast-changing market; etc.

Under these circumstances, a system to develop digital household appliances effectively has been sought for. Moreover, it is desirable to provide a system by which a digital household appliance after shipment to the market can be updated easily with a program therefor by a user who has purchased the apparatus.

Changing the function of the digital household appliance can be done by downloading a program as in the use of Java (Registered Trademark) for portable phones, or automatically updating the program in the digital household apparatus (for example, HDD recorder) (e.g., see Known Art 1/Known Art 2).

[Known Art 1]
  Overview on I-Appli (Registered Trademark)
  [Searched on Jul. 31, 2006] on the Internet <URL: http://www.nttdocomo.co.jp/service/imode/make/content/iappli/about/index.html>

[Known Art 2]
  V apuli
  [Searched on Jul. 31, 2006] on the Internet <URL: http://developers.vodafone.jp/dp/tech_svc/java/>

However, it is a problem that it is not easy to change the function of a digital household apparatus by changing a program thereof.

This problem is explained below more specifically. In the methods described in Known Art 1 and 2, a digital household apparatus is provided with an Internet browser, which is software for viewing data obtained from an external apparatus. The digital household apparatus uses the function of the Internet browser so as to acquire and display data distributed through the Internet. By changing the distributed data, it is possible to change contents of display displayed by the digital household apparatus.

However, to change the function that the digital household apparatus carries out is not as easy as changing the contents of the display. This is because the function of the Internet browser is prescribed by the program stored in a storage of the digital household apparatus. So, the changing the function of the Internet browser of the digital household apparatus requires that a distributor of the data update the program and distribute the updated program to the digital household apparatus.

The distributors face a problem of a large development cost due to the need of frequent updating a program in order to change the function. Moreover, the user of the digital household apparatus should acquire a program of a new version from the distributor every time the function is updated. This is not user friendly.

To make the matter worse, the system for updating the function of the digital household apparatus has not been well established compared with the system for updating the function of personal computes (PC), as described above. Most of the digital household apparatus such as television or portable telephone are computer-embedded apparatuses whose functions are realized by a program that is written in a non-volatile storage device such as ROM (read only memory) etc. in a non-rewritable manner.

Therefore, to exchange the ROM is only way to update the function of the digital household apparatus that has been shipped to the market. However, this method is not realistic because it is not easy for everybody to exchange the ROM and it is too costly to do so.

Note that this problem is not only incidental to the digital household apparatus, but also to any computer-embedded apparatus, like the digital household, whose functions are realized by a program having been written in a ROM at its production.

SUMMARY OF THE INVENTION

An object of the present invention is to provide an image display apparatus, an image data providing apparatus, an image display system, a method of controlling an image display system, a control program, and a recording medium, in each of which a function of the apparatus can be easily changed.

In order to attain the object, an image display apparatus according to the present invention is an image display apparatus for processing externally acquired display data and displaying an image based on the processed display data, wherein: the display data contains the image and a control script that defines at least a first function of displaying the image; the image display apparatus includes: a basic function executing section (basic function executing section 42) for executing a basic function program called from the control script, the basic function program being stored in a basic function program storage section; and a control script executing section (control script executing section 41) for controlling the basic function executing section according to the control script so as to perform the first function being defined by the control script, the control script further defines a second function which the image display apparatus performs while the image is being displayed by the first function, and the control script executing section controls the basic function executing section according to the control script so as to execute the second function.

With this configuration, the image display apparatus acquires the display data containing the image and the control script that defines at least the function of displaying the image. By processing the display data, the image display apparatus displays the image. More specifically, by the control script executing section 41 controlling, according to the control script, the basic function executing section 42 for executing the basic function program called by the control script, the image display apparatus displays the image by executing the function (first function for displaying the image) defined in the control script. That is, one or more basic functions are combined according to the control script thereby to realize one function (such as the first function).

Furthermore, in addition to the first function for displaying the image, the control script defines, as the second function, an operation of the image display apparatus which is performed while the image is being displayed by the first function. The second function is a function of the image display apparatus and is realized by combining the basic functions.

The control script executing section 41 controls the basic function executing section 42 according to the control script, thereby to perform the second function.

By this, it is possible to realize various second functions in an image display apparatus by using the control script, in addition to the function for displaying the image.

As described above, the control script is externally provided to the image display apparatus by being included in the display data.

Therefore, even after the image display apparatus is shipped to the market, it is possible to flexibly add or change the second function that is executed by the image display apparatus. Thus, it is possible to change the function of the image display apparatus without updating the basic function program stored in the basic function program storage section.

Even if the basic function program storage section is realized by using a non-volatile storage device such as a ROM, so that the basic function program stored therein is not easy to rewrite, this configuration makes it possible to easily change the function of the image display apparatus. Thus, the image display apparatus of the present invention is effectively applicable especially to a computer-embedded apparatus.

Moreover, the ability of changing the function so easily makes it possible to avoid implementing such an unnecessary large number of functions in the apparatus intrinsically before shipping that will cover all possible needs. As a result, this reduces a work load of the development of the image display apparatus.

Furthermore, the control script defining the first function and the second function is included in the display data together with the image to be displayed on the image display apparatus, and is provided to the image display apparatus. This makes it possible to manage the control script in association with the image to be displayed. This makes it easy to manage the control script and the display object for both the sender for generating and sending the display data, and the receiver (image display apparatus) for receiving and processing the display data.

The control script is generated per display data (and the image included therein). Thus, the image display apparatus can efficiently and timely acquire only the second function necessary for the display data (image) to be processed.

Consequently, it is possible to efficiently develop the image display apparatus and change the function of the image display apparatus that has been shipped to the market.

The specific example of the second function encompass a function of rotating the image, a function of changing the display size of the image, a function of displaying the image with attribute information (comment of an image creator, a title of the image, or the like) associated with the image being displayed, a function of printing the image, a function of automatically displaying plural images sequentially (slide show function), a function of changing a frame rate of the slide show, a function of setting whether the frame advance of the slide show is performed manually or automatically, a function of displaying operation items of such functions thereby to allow the user to select a function from them, and the other functions. It should be noted that the second functions executable by the image display apparatus of the present invention is not limited to these.

In order to attain the object, an image data providing apparatus according to the present invention is an image data providing apparatus for generating display data for displaying an image by an image display apparatus, wherein: the display data contains an image and a control script that defines at least a first function of displaying the image; the display data providing apparatus including: an identification information acquiring section (display object ID acquiring section 71) for acquiring, from a display data request message, identification information for identifying a requested image, the display data request message requesting the display data and having been transmitted thereto by the image display apparatus; a control script generating section (control script generating section 80) for generating, according to the display data request message, a control script that defines a first function for displaying the requested image designated by the identification information acquired by the identification information acquiring means, and further defines a second function which the image display apparatus performs while the requested image is being displayed by the first function; and a display data generating section (display data generating section 62) for generating display data containing the requested image and the control script generated by the control script generating means.

With this configuration, the image data providing apparatus generates the display data for displaying the requested image, according to the display data request message that is generated by the image display apparatus and requests the display data. The display data includes the requested image and the control script that defines at least the function of displaying the requested image.

More specifically, the display object ID acquiring section 71 acquires the identification information of the requested image from the display data request message. The identification information specifies the requested image to be included in the display data.

Consequently, the control script generating section 80 generates the control script that defines the first function for displaying the requested image. Further, the control script generating means adds the following definition in the control script. That is, the control script contains the definition of the operation as the second function of the image display apparatus, which is carried out while the requested image is being displayed by the first function. The control script generating section 80 generates the control script that defines the second function so as to be suitable for what is requested by the display data request message.

Finally, the display data generating section 62 generates the display data that includes the requested image and the control script generated by the control script generating section 80.

By this, the control script that defines the first and second functions can be generated to be suitable for the display data (image) requested by the image display apparatus. It is possible to provide the display data including such a control script, in response to the request from the image display apparatus.

The control script generating section 80 generates the control script that defines the second function in addition to the first function, where the first function is for displaying the requested image on the image display apparatus, and the second function is an operation of the image display apparatus, which is carried out while the requested image is being displayed. The second function is a function of the image display apparatus and is realized by combining basic functions of the image display apparatus.

By this, the control script generated according to the contents of the display data can be provided to the image display apparatus, whereby it is possible to provide the image display apparatus with various second functions in addition to the function of displaying the requested image.

Accordingly, it is possible to add or change the second function flexibly and let the image display apparatus perform the second function thus added or changed. This makes it easy to change the function of the image display apparatus without updating the basic function program stored in the basic function program storage section of the image display apparatus.

Even if the basic function program storage section of the image display apparatus is realized by using a non-volatile storage device such as a ROM, so that the basic function program stored therein is not easy to rewrite, this configuration makes it possible to easily change the function of the image display apparatus. Thus, to provide the control script generated by the control script generating section 80 is effectively applicable especially to a computer-embedded apparatus having the basic function program executing section 42 of the image display apparatus.

Moreover, because it is easy to change the function of the image display apparatus, it is possible to avoid implementing such an unnecessary large number of functions in the image display apparatus intrinsically before shipping that will cover all possible needs. As a result, this reduces a load on the development of the image display apparatus.

Furthermore, the control script defining the first function and the second function is included in the display data together with the image to be displayed on the image display apparatus, and is provided to the image display apparatus. This makes it possible to manage the control script in association with the image to be displayed. This makes it easy to manage the control script and the display object for both the sender (image data providing apparatus) for generating and sending the display data, and the receiver (image display apparatus) for receiving and processing the display data.

The control script is generated per display data (and the image included therein) by the control script generating section 80. Thus, the image display apparatus can be efficiently and timely provided with only the second function necessary for the display data (image) to be processed.

Consequently, it is possible to efficiently develop the image display apparatus and change the function of the image display apparatus that has been shipped to the market.

In order to attain the object, an image display system according to the present invention includes: the image display apparatus; and the image data providing apparatus, the image data generating apparatus generating the control script based on the display data request message from the image display apparatus, and transmitting, to the image display apparatus, display data containing the requested image and the control script, and the image display apparatus performing the first function and the second function according to the control script received from the image data providing apparatus, the first function displaying the requested image.

These configurations make it easy to change the function of the image display apparatus.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is a view illustrating a data structure of display data request message generated by the display data request processing section of the television.

FIG. 8 is a view illustrating one example of a relevant information table stored in a relevant information storage section of the television.

FIG. 12 is a view illustrating a specific example of the control script, which a control script executing section of the television refers to in order to perform the display data execution process.

FIG. 15 is a view illustrating a specific example of the control script, which the control script executing section of the television refers to in order to perform the display data execution process.

FIG. 16 is a view illustrating an example of an operation menu that the television displays on the display section according to the control script.

FIG. 17(a) is a view illustrating a specific example of an operation menu specifying script.

FIG. 17(b) is a view illustrating an example of display of an operation menu displayed by the television according to the operation menu specifying script illustrated in FIG. 17(a).

FIG. 19 is a view illustrating an example of a pattern data table stored in the pattern data storage section of the display data generating apparatus.

FIG. 20 is a view illustrating an album information table stored in the network album DB in the network album system.

FIG. 21 is a view illustrating an example of a picture information table stored in the network album DB.

FIG. 22 is a view illustrating a rule table stored in an item selecting rule storage section of the display data generating apparatus. The rule table is looked up by an operation item selecting section in selecting an operation item.

FIG. 23 is a view illustrating an example of a function table stored in an operation function storage section of the display data generating apparatus.

FIG. 24 is a view illustrating a specific example of pattern data.

FIG. 25 is a view illustrating a specific example of an operation function definition script generated by an operation function definition generating section of the display data generating apparatus.

FIG. 26 is a view illustrating a specific example of the operation function definition script generated by the operation function definition generating section of the display data generating apparatus.

FIG. 30 is a view illustrating a specific example of a control script for causing the television to perform a focus display process.

FIGS. 31(a) to 31(e) are views illustrating display examples of the sub operation menus displayed on the television with focusing, according to the control script.

FIG. 32 is a view illustrating a specific example of the control script included in the display data according to an embodiment of the present invention.

FIG. 33(b) is a view illustrating a specific example of a display screen including an object after the change.

FIG. 33(c) is a view illustrating an image data reformation region designated by the control script as a result of the change from the display screen of FIG. 33 (a) to the display screen of FIG. 33 (b).

FIG. 36(a) is a view illustrating an example of an image data reformation region list stored in an image data reformation region information storage section of the television.

FIG. 36(b) is a view illustrating an example of a settled image data reformation region information stored in the image data reformation region information storage section of the television.

FIGS. 38(a) to 38(d) are views illustrating specific examples of display screens displayed on the display section of the television, the display screens including complicate-shaped objects.

FIGS. 38(e) to 38 (i) are views illustrating examples of the image data reformation regions specified according to changes in the displayed screens.

FIGS. 40(a) to 40(i) are views illustrating an ARGB region and spare region of the temporal storage section when a picture rotation control section of the television rotates a picture.

FIG. 41 is a view illustrating a specific example of a control script that designates an image data reformation region in consideration of a circle object and a region used during the picture rotation process.

FIG. 43 is a view illustrating an example of an operation function definition script.

FIGS. 44(a) and 44(b) are views illustrating an example of display screen shift performed in response to pressing of an enter button.

FIG. 45 is a view illustrating a specific example of a state shift definition script in which a condition is described.

FIG. 47 is a view illustrating an example of the effect definition script stored in an effect information storage section.

FIG. 51 is a view illustrating a specific example of the operation function definition script that defines the operation of the television for switching whether to add an effect or not in accordance with user's key operation.

FIG. 53 is a view illustrating a specific example of the control script that defines the operation of the television such that the television starts a text display process after an effect process is finished.

FIG. 54 is a view illustrating a specific example of the control script in which a reference script is included.

FIG. 55 is a view illustrating a specific example of the control script, which is received from the display data generating apparatus and part of which is changed.

FIG. 57 is a view illustrating another specific example of the control script, which contains the reference script.

FIG. 58 is a view illustrating a specific example of the control script in which replacement has not been carried out by the television and a specific example of the control script in which replacement has been carried out by the television.

DESCRIPTION OF THE EMBODIMENTS

Figure 2:
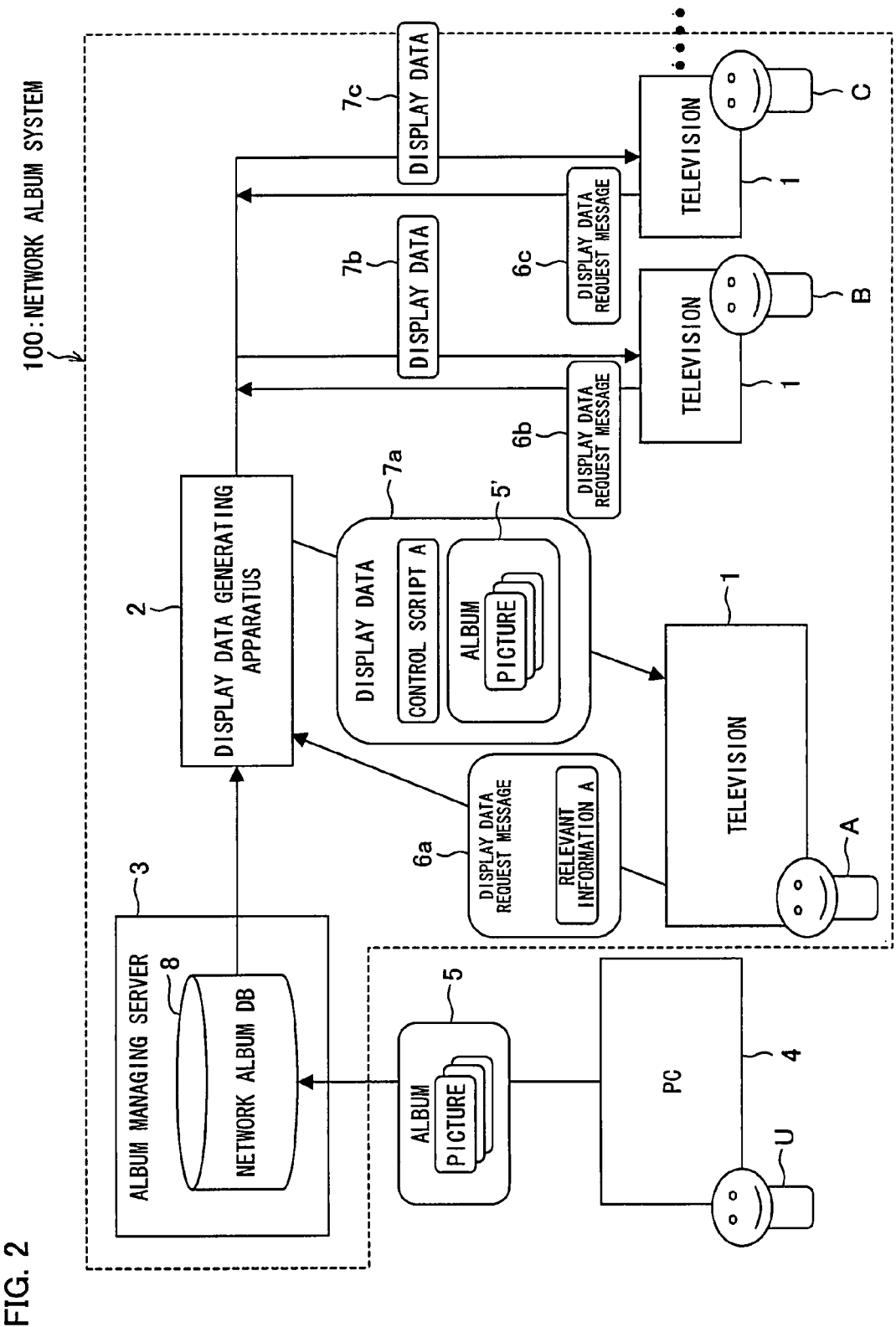
FIG. 2 is a block diagram schematically illustrating a structure of a network album system according to the embodiment of the present invention.

One embodiment of the present invention is described below referring to drawings. By way of example, the present embodiment discusses application of an image data providing apparatus (display data generating apparatus 2) and image display apparatus (television 1) of the present invention to a network album system as illustrated in FIG. 2.

The network album system is a system for displaying a picture (image) on an image display apparatus included therein, which has a communication function and obtains the picture from an album (constituted of a picture or pictures) stored in an album managing server (album managing server 3), the album being uploaded to the album managing server 3 via a communication network such as the Internet from a communication terminal (computer (PC) 4) such as a PC or portable phone. More specifically, an image data providing apparatus generates display data for displaying the picture on the image display apparatus, and provides the display data to the image display apparatus. Thereby, the image display apparatus can display the picture as intended by the image data providing apparatus.

The present embodiment described, assuming that the image display apparatus according to the present invention is a television 1 having a communication function and being connected to the Internet. Moreover, the image data providing apparatus according to the present invention is assumed to be a display data generating apparatus 2 for generating the display data necessary for the television to display various information (such as a picture or the like) on a screen thereof.

[Display Data]

Figure 3:
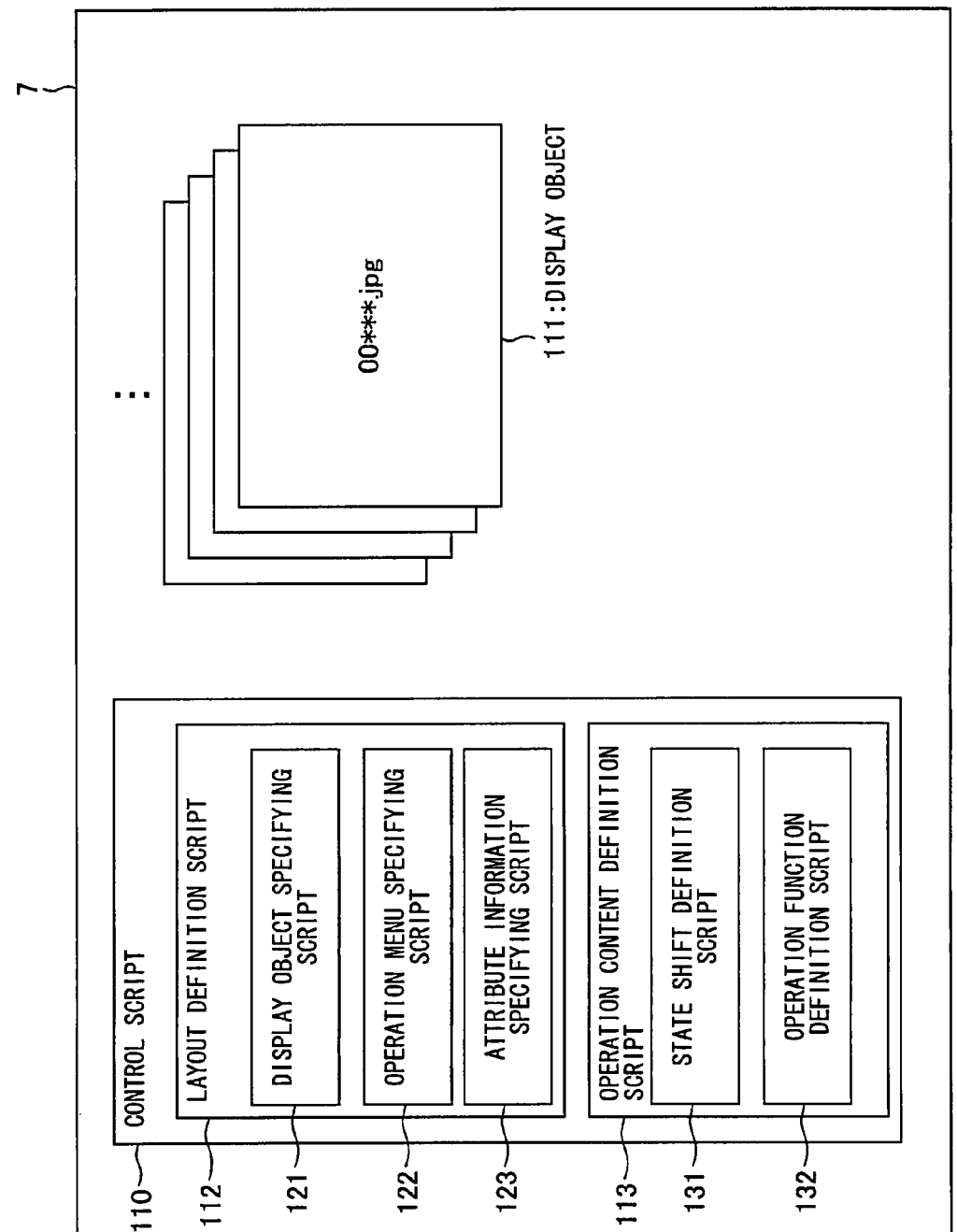
FIG. 3 is a view schematically illustrating a data structure of display data according to the embodiment of the present invention.

The display data is information necessary to create a display screen of the television 1. FIG. 3 is a view schematically illustrating a data structure of the display data. As illustrated in FIG. 3, display data 7 according to the present embodiment includes a control script 110 and a display object 111. The control script 110 describes control commands for instructing the television 1 how to operate. The display object 111 is an object to be displayed on the television 1 and may be a still image (such as a picture or the like), an image such as a menu screen, operation buttons, etc., or the like. With the control script 110, the television 1 performs display of a certain display screen or various application functions (hereinafter, referred to as photo application functions) of the network album. The illustration in FIG. 3 exemplifies a case where the display object 111 included in the display data 7 is a picture (still image) in the JPEG format. Needless to say, the present invention is not limited to this example. The display object 111 included in the display data 7 can be any data in any format, provided that the data can be displayed by the television 1 on itself. For example, the display object 111 may be moving image data, text data, or the other data. The display data 7 may include text data as an object (.txt) different from the control script 110 or as data defined in SVG data (.svg) by which the control script 110 is realized.

Moreover, the display data 7 is not limited to such an object (display object 111) to be displayed, such as image, moving image, text, etc. For example, the display data 7 may include any object (reproduction object) in any format (such as audio data, etc.), which the television 1 can reproduce and provide to a user. Other than the display object 111, the control script 110 may specifically describe an object in any format included in the display data 7, and define various operations that the television 1 performs to reproduce the object, whereby the television 1 can reproduce and present to the user such an object in any format included in the display data 7 In the present embodiment, the control script 110 can be classified into two kinds largely. One is a layout definition script 112 for defining how the display object 111 (i.e., an image object (such as a picture), a GUI screen or text data as a display object defined in SVG to realize the control script 110, or the like) is to be displayed. By referring to the layout description script 112, the television 1 can determine how the television 1 should display which data included in the display data 7.

Examples of the layout definition script 112 encompass display object specifying script 121, operation menu specifying script 122, attribute information specifying script 123, etc. The display object specifying script 121 specifies association between display object identifying information for identifying the display object 111 distinctly and information on where the display object is to be displayed and how large the size of the display object is to be displayed in. The operation menu specifying script 122 specifies a screen of an operation menu to be displayed when the display of the display data 7 is performed. The operation menu shows operations available while the display of the display data 7 is performed. The attribute information specifying script 123 specifies how various pieces of information (a title of the album, a title of the picture, a comment attached thereto) associated with each display data respectively is to be displayed.

Another kind of the control script 110 is an operation content definition script 113 for specifying an operation that the television should perform in response to an event that occurs in the television 1 (e.g., a predetermined time period is passed, a time to start/finish an operation comes, the display data is received, key input by a user is received, etc.). Referring to the operation content definition script 113, the television 1 can determine when and how the television 1 should perform which operation for what.

Examples of the operation content definition script 113 encompass a state shift definition script 131, an operation function definition script 132, etc. The state shift definition script 131 specifies which display data is to be displayed (requested and obtained) next in response to occurrence of which event. The operation function definition script 132 defines operations of the television 1 as photo application functions, which the television 1 performs on the display data that is being displayed. Examples of such operations are: image rotation, color change, text data modification, printing, etc.

These control scripts define which basic function is to be used in which way. The basic functions are intrinsically installed in the television 1 in advance. The photo application is realized by combining such basic functions appropriately. The television 1 can perform a combined function (photo application (first function/second function)) by selecting appropriate basic functions intrinsically installed therein according to the control script, and combining the selected functions.

The basic functions are low-level functional procedure that are invoked by the control script in order to realize the photo application function. Each basic function realizes a particular function. The control script describes which basic function is to be invoked at which timing. The television 1 can realize its photo application function by appropriately invoking and performing various basic functions according to the control script.

In the present embodiment, the control script contains merely the description for invoking the basic functions. The actual execution code, that is, the basic function program is intrinsically installed on the ROM of the television 1, e.g., at the production of the television 1 (the basic function program storage section 29 in FIG. 1). Therefore, the basic function program of the television 1 will not be easily rewritten after the television 1 is shipped to the market.

However, as described above, the basic functions are low-level functional programs that are invoked by the control script. Various photo applications can be realized by combining the basic functions in various ways. Thus, the photo application function to be performed by the television 1 can be changed by changing the procedure for invoking the basic functions, that is, by changing the combination of the basic functions, without changing the basic functions themselves. The combination of the basic functions can be easily changed by using the control script.

The control script can be structured as a text data written in XML (extensible Markup Language). Thus, it is easy to change the contents of the control script and provide it to the television 1. The layout definition script 112 can be written in SVG (Scalable Vector Graphics), for example.

As described above, the photo application function that the television 1 performs can be easily changed by changing the description in the control script contained in the display data and thus the changing of the photo application function does not require changing the basic functions intrinsically installed in the television 1. Specific examples of the control script and the basic functions will be described later.

Moreover, in the network album system according to the present embodiment, the display data for generating the image data providing apparatus may be, for example, single picture display screen display data for display one picture, slide show display screen display data for displaying a slide show of plural pictures, thumbnail display screen display data for displaying the pictures of the album in a list of thumbnails in a montage manner, album viewing record screen display data for displaying a viewing record of the album, which shows pictures that the user has viewed previously, an album ID input screen display data, which is a GUI (graphical user interface) for allowing the user to input an album ID so as to obtain an album he desires. These are merely part of the examples and the function of the image data providing apparatus is not limited to the present invention.

[General Configuration of Network Album System]

FIG. 2 is a block diagram illustrating a general configuration of a network album system according to the present embodiment of the present invention. As illustrated in FIG. 2, the network album system 100 is includes a display data generating apparatus 2, at least one television 1, and an album managing server 3, each of which are connected via the Internet so that they can communicate with each other.

The album managing server 3 has a function of managing an album that contains one or more pictures. The album managing server 3 has a network album data base (DB) 8 in which the album is stored. The album 5 (or the picture contained in the album) is transmitted to the album managing server 3 from a communication terminal apparatus such as a computer (PC) 4 by an album creator (an owner of the picture) U, for example. The transmitted album (or picture) is then stored in the network album DB (image information storage section) 8.

In uploading the picture to the album server 3 via the communication terminal apparatus such as the PC 4 or the like (or in uploading the picture to the album server 3 directly from a portable phone or a digital camera having a communication function), the picture may be transmitted to the album managing server 3 together with image-capturing device information associated with the picture. The image-capturing device information (which may be a product name, model code, etc. of the digital camera (or the portable phone) that captures the picture) indicates an origin of the picture. By this, it is possible to know from which image capturing device the picture has been transmitted.

For example, image-capturing apparatuses having different specifications are different in resolution, image size, aspect ratio (and variation thereof) of the pictures captured by them. Therefore, it is possible to easily identify information of a picture in information in which the resolution, image size, aspect ratio, etc. are recorded in association with the specifications of the image capturing apparatuses. For example, this allows the display data generating apparatus 2 to efficiently perform display data generation process (or display object editing process), such as generating display data for display the picture in desired size or resolution.

Moreover, the communication terminal apparatus is not limited to the PC 4 as illustrated in FIG. 2. The communication terminal apparatus may be any apparatus that has a function of transmitting the album or picture of the album creator U to the album managing server 3. Apart from PC, a television having a communication function, a portable telephone, a PDA (personal digital assistant) or the like may be the communication terminal apparatus.

The network album DB 8 stores the albums in association with album ID, so that all pictures (group) contained in the album can be selected by designating the album ID. Furthermore, each picture is stored in association with picture ID for identifying the pictures individually. Therefore, it is possible to select the pictures individually by designating the album ID and the picture ID.

In the present embodiment, all the pictures contained in the album can be designated by designating the album ID. By designating the album ID and the picture ID, an individual picture can be designated.

The display data generating apparatus 2 has a function of generating display data necessary for the television 1 to display various display screens such as a display screen for displaying the picture of the album. The display data is, as described above, data of the display screen to be displayed on the screen of the television 1. In the present embodiment, the display data includes, at least, the control script for controlling the television 1, and the display object (an image such as a picture, an image of operation buttons constituting a GUI screen, or the other image). The control script includes the layout script for prescribing the television 1 how to display the picture, such as displaying which picture at which position, in which size. The kinds of the layout specifying script are described above. In this exemplary embodiment, the layout definition script includes a display object specifying script that shows association between (a) information on the display position and display size defined by the layout definition script and (b) the display object (picture). The display object specifying script may be a script that designates a reproduction object such as audio data, apart from the display object such as a picture. Furthermore, the control script may include attribute information specifying script, which includes text data for showing attribute information of the album or the picture.

As described above, the television 1, which receives the display data, can display one or plural display objects (picture) according to the control script, the one or plural display objects being contained in the display data. One control script in the display data is created for each display screen. For example, the control script may be a control script of the thumbnail display screen display data for performing thumbnail display of plural pictures, a control script of the slide show display screen display data for performing slide show display of the album by showing pictures thereof one by one, or the like control script.

The control script includes an operation content definition script for specifying what process the television should operate in response to an operation performed to deal with a picture (such as selecting the picture) or to an operation performed to deal with an album (such as selecting the album). Examples of the operation content definition script encompass a state shift definition script for specifying when to shift to which display screen (i.e., specifying which display data should be requested to and obtained from the server), a display operation definition script for specifying which process (image rotation, color change, text data modification, or the like) should be performed on the display data that is being displayed, and the like script.

The operation content definition script 113 is writable in XML, for example. So, the operation content definition script 113 can be transmitted from the display data generating apparatus 2 to the television 1 by transmitting it being embedded in the control script that is also XML data as well, or by transmitting it as a script independent of the display screen display data described above.

The display data generating apparatus 2 receives, from the television 1, a display data request messages 6 (a to c) that request display data to be displayed. The received display data request messages 6 includes relevant information for identifying (a) the requested display data (display image or display object), and (b) relevant information that shows various information regarding the specification of the television 1, functions of the television 1, or the users (A to C) of the televisions 1. Referring to the relevant information, the display data requested by the televisions 1 are generated by the display data generating apparatus 2 as display data 7 (*a* to *c*) suitable for the respective televisions 1. Then, the display data 7 (*a* to *c*) are supplied to the respective televisions 1.

For example, if the display data generating apparatus 2 receives relevant information A (included in the display data request message 6*a*) from the television 1 of the user A, the display data generating apparatus 2 generates the display data 7*a* that includes a control script A generated to be suitable to the television 1 of the user A, and the display data generating apparatus 2 provides the display data 7*a* to the television 1 of the user A. For example, the display data 7*a* includes at least (a) an album 5' adjusted in image size suitably to the television 1 of the user A, and (b) a control script A that includes a layout definition script for pictures of the album 5', etc., the layout definition script been generated suitably to the television 1.

Moreover, if the display data generating device 2 receives the display data request message 6*b* including the relevant information B, from the television 1 of the user B, the display data generating apparatus 2 provides the display data 7*b* (which includes a control script B (not illustrated)) suitably to the television 1 of the user B referring to the relevant information B. Similarly, the display data generating apparatus 2 provides the display data 7*c* (which includes a control script C) to the television 1 of the user C referring to the relevant information C.

The television 1 displays various information (such as the display object) according to the control script included in the display data 7. More specifically, the television 1 displays a picture(s) of the album stored in the network album DB 8. Moreover, the television 1 generates the display data request message 6, which is a message for requesting the display data desired to be displayed. Then, the television 1 sends the display data request message 6 to the display data generating apparatus 2, so as to obtain the display data from the display data generating apparatus 2. Then, the television 1 creates a display screen as instructed by the control script included in the display data thus obtained, and then displays various information as intended by the display data generating apparatus 2 (service providing company).

In this way, the television 1 can perform various application functions of the network album (such as displaying the picture) according to the control script of the display data.

The display data request message 6 includes (a) information for identifying the display object (for example, the album or picture desired to be displayed), (b) display screen designating information for identifying the requested display screen, (c) the relevant information regarding the television 1 or the user thereof, and (d) the other information. Specific examples of the relevant information encompass specification information that shows pixel number and screen size of the television 1, user information that shows an age, address or the like of the user. The relevant information, however, is not limited to these and any information necessary for the display data generating apparatus 2 to generate the display data can be the relevant information.

The display data request message 6 and the display data 7 are described in detail later.

The network album system 100 according to the present invention is not limited to the configuration illustrated in FIG. 2. Albeit the network album DB 8 is provided in the album managing server 3 in the example illustrated in FIG. 2, the network album DB 8 may be provided in the display data generating apparatus 2. In this case, the PC 4 transmits the album to the display data generating apparatus 2.

Moreover, in the example illustrated in FIG. 2, the television 1 of each user exchanges the display data request message 6 and the display data 7 directly with the display data generating apparatus 2. The present invention is not limited to such a configuration. For example, a server apparatus may be provided between the television 1 and the display data generating apparatus 2, for example. The server apparatus manages a site provided by a company that provides the service of the network album. The server apparatus intervenes the communication between the television 1 and the display data generating apparatus 2.

In this configuration, the television 1 operates as follows in order to use the network album system. For a start, the television 1 accesses to the server apparatus of the service providing company, and displays a portal site by using a general Web browser. Then, switching from the Web browser, the television 1 activates an application of the network album system, the application having a function for requesting and displaying display data of an album. This makes it possible to prevent the television 1 from connecting an apparatus other than the display data generating apparatus 2 and album managing server 3, which are designated by the portal site.

[General Configuration of Television]

Figure 1:
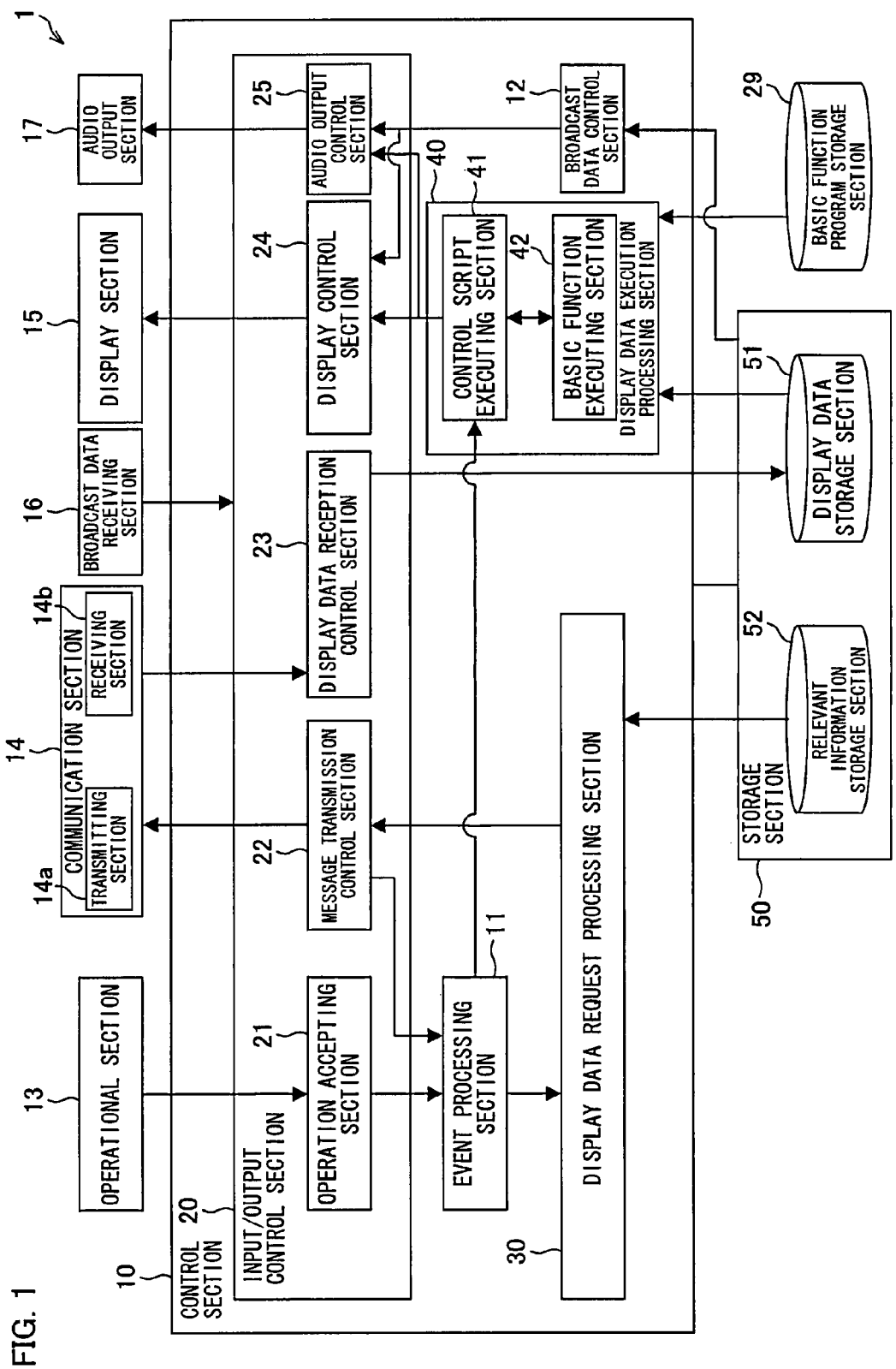
FIG. 1 is a block diagram schematically illustrating a structure of a television according to one embodiment of the present invention.

FIG. 1 is a block diagram schematically illustrating a television 1 according to one embodiment of the present invention. The television 1 includes, as illustrated in FIG. 1, an operational section 13, a communication section 14, a display section 15, a broadcast data receiving section 16, an audio output section 17, a control section 10 for overall control of the television 1, a storage section 50, and a basic function program storage section (basic function program storage section) 29.

The control section 10 has a function of controlling various operations of the sections of the television 1. The control section 10 includes an input/output control section 20, a display data request processing section 30 for generating the display data request message 6, a display data execution processing section 40 for analyzing the display data 7 and for executing prescribed operation, an event processing section 11 for detecting occurrence of a predetermined event in the television 1, and a broadcast data control section 12 for extracting audio data and video data out of broadcast data received by controlling the broadcast data receiving section 16. The control section 10 reads out various programs from the storage section 50 where they are stored. Using the various programs, the control section 10 controls various sections of the television 1 so as to perform various processes of the photo application function according to the display data.

The storage section 50 has a function of storing a control program and an OS program that the control section 10 executes, and various data that the control section 10 reads out to execute various processes of the photo application function according to the display data. The storage section 50 is constituted by a non-volatile storage device such as a flash memory. The various data are stored in various storage sections (for example, display data storage section 51, relevant information storage section 52, etc.) in the storage section 50, respectively. The received broadcast data is stored in a broadcast data storage section (not illustrated) in the storage section 50. It should be noted that the various data to be stored in the strange section 50 is not limited to the data mentioned above by way of example.

The basic function program storage section 29 has a function of storing basic function programs for realizing the basic functions of the photo application that the television 1 has. The basic function program storage section 29 is realized by a ROM (read only memory). The programs of the basic functions stored in the basic function program storage section 29 are read out therefrom by a basic function executing section 42 of the display data execution processing section 40 as required.

The operational section 13 is utilized by the user to input an instruction signal in order to control the television 1. The operational section 13 is constituted by operational buttons provided in the television 1 itself, or by a mouse, a keyboard, and/or the like connected to the television 1 via wire or wirelessly. The instruction signal inputted via the operational section 13 by the user is transmitted to various sections of the control section 10 via the input/output control section 20. In this way, the television 1 can be controlled by the user.

The communication section 14 has a function of communicating with various devices within the network album system 100 but outside the television 1 via a communication network. The communication section 14 includes a transmitting section 14a and a receiving section 14b.

More specifically, the transmitting section 14a has a function of transmitting, to the display data generating apparatus 2, the display data request message 6 generated by the display data request processing section 30. The receiving section 14b has a function of receiving the display data 7 (FIG. 3) provided from the display data generating apparatus 2. The display data 7 received via the receiving section 14b is recorded in the display data storage section 51, so that the display data 7 can be read out from the display data storage section 51 by the display data execution processing section 40 or the display control section 24 as required.

The display section 15 has a function of displaying various data (such as display data) stored in the storage section 50. For example, the display section 15 is constituted by a display apparatus such as LCD (liquid crystal display), PDP (plasma display panel), CRT (cathode-ray tube) display, or the like.

The broadcast data receiving section 16 has a function of receiving broadcast data (audio data and video data of a TV program, or information such as electronic TV guide, etc.) that is broadcast on a broadcast wave from the broadcast station. The broadcast data receiving section 16 includes a tuner, a demodulating section, and TS (transport stream) decoder, and the like. The broadcast data received by the broadcast data receiving section 16 is decoded and then stored in the storage section 50 via the input/output control section 20.

The audio output section 17 is realized as a speaker for outputting the audio data included in the broadcast data.

The input/output control section 20 has a function of controlling input and output of information between the various sections (operational section 13, communication section 14, display section 15, broadcast data receiving section 16, audio output section 17) of the television 1, and various sections (event processing section 11, display data request processing section 30, display data execution processing section 40, or broadcast data control section 12) of the control section 10. The input/output control section 20 includes an operation accepting section 21, a message transmission control section 22, a display data reception control section 23, a display control section 24, and an audio output control section 25.

The operation accepting section 21 has a function of receiving the instruction signal inputted via the operational section 13 by the user, and transmitting the instruction signal to the event processing section 11. For example, if an instruction signal (album display instructing signal) for instructing display of a desired album is inputted via the operational section 13 by the user, the instruction signal is transmitted to the event processing section 11. After that, via the event processing section 11, an instruction signal is transmitted to the display data request processing section 30, the instruction signal instructing to generate the display data request message 6 of the display screen for displaying the designated album.

The message transmission control section 22 has a function of controlling the transmitting section 14a of the communication 14 to transmit the display data request message 6 generated by the display data request processing section 30. The display data receiving section 23 has a function of receiving the display data 7 received at the receiving section 14b of the communication section 14 from the display data generating apparatus 2, and recording the display data 7 in the display data storage section 51.

The display control section 24 has a function of controlling the display section 15 to display thereon various data stored in the storage section 50. The display control section 24 reads out the display object included in the display data stored in the display data storage section 51. Then, the display control section 24 displays the read-out display object according to the control script (layout definition script) included similarly in the display data. More specifically, the display data execution processing section 40 analyzes the control script.

According to analysis results (coordinate information of a starting point for positioning the display object (picture), information identifying a picture associated with the coordinate information, etc.), the display control section 24 designs a display screen to be displayed on the display section 15. The display control section 24 outputs data of the designed display screen to the display section 15. In this way, the information included in the display data is presented (displayed on the display section 15) to the user.

Moreover, the display control section 24 receives, from the broadcast data control section 12, the video image included in the broadcast data, and outputs the video data to the display section 15. In this way, the video data in the broadcast data received by the television 1 is provided to the user.

The display screen designing data that the display control section 24 will output to the display section 15, is temporally written in temporal storage section 18 constituted by a volatile storage apparatus such as a RAM. In a frame buffer 19, the display screen data is accumulated screen by screen. The display control section 24 outputs to the display section 15 the display screen data stored in the frame buffer 19. In this way, the display object of the display data is displayed on the display section 15 according to the control script. The configurations of the temporal storage section 18 and the frame buffer 19 are described in Embodiment 2.

The audio output control section 25 has a function of controlling the audio output section 17 to output the audio data in the broadcast data stored in the storage section 50. The audio output control section 25 outputs the audio data from the broadcast data control section 12, and outputs the audio data to the audio output section 17. In this way, the audio data in the broadcast data received by the television 1 can be provided to the user.

The broadcast data receiving section 16, the audio output section 17, audio output control section 25, and the broadcast data control section 12 are sections that the image display apparatus according to the present invention would have if the image display apparatus was applied to the television 1. Thus, these sections are not to limit the configuration of the image display apparatus according to the present invention. If the image display apparatus was not realized as the television 1, the image display apparatus might not have these sections.

The display control section 24 may further have a function of dividing a display regions of the display section 15 into plural display regions, and displaying different display screens respectively on the plural display regions by controlling (performing image data reformation) the plural display regions individually. For example, the display control section 24 may divide the display region of the display section 15 into two display regions (first display region and second display region), and display the video data contained in the broadcast data on the first display region and a picture of the album on the second display region (dual screen display). Further, the display control section 24 may divide the display region of the display section 15 into three display regions, and display on a third display region the electronic program guide or a Web page available in the Internet (ternary screen display).

However, even if the television 1 performs dual screen/ternary screen display as described above, the display data generating apparatus 2 provides display data for displaying the display screen for the full screen display operation, which is normally performed. In this case, the television 1 should display the display data it received.

Even if the dual screen/ternary screen display is performed when the display control section 24 receives the display data from the display data generating apparatus 2, the display control section 24 switches to controlling the section 15 to display the full screen display, in response to reception of the display data. Then, the display control section 24 controls the display section 15 to display the display data on the full screen according to the analysis result obtained from the display data execution processing section 40. With this, the display data provided from the display data generating apparatus 2 can be displayed on the full screen always even if the display control section 24 has been performing the display control for displaying in plural regions until just before the switching-over. As a result, it is possible that the display data generating apparatus 2 can display the picture always in the display size instructed by the display data generating apparatus 2.

The event processing section 11 has a function of detecting various events that occur in the television 1, and transmitting a predetermined instruction signal to the display data request processing section 30 or the display data execution processing section 40. The event processing section 11 detects the events by using signals transmitted thereto from the input/output control section 20 (for example, the operation accepting section 21 or the display data receiving control section 23), and a timer section (not illustrated). Then, the event processing section 11 controls timing at which the display data request processing section 30 or the display data execution processing section 40 performs its operation.

More specifically, judging from contents of the transmitted signal and a current condition of the television 1, the event processing section 11 determines, based on a predetermined rule, which operation the display data request processing section 30 or the display data execution processing section 40 should perform. The event processing section 11 sends instructions to the display data request processing section 30 or the display data execution processing section 40 so as to cause the display data request processing section 30 or the display data execution processing section 40 to perform the predetermined process.

The timer section (not illustrated) sends a timer notice to the event processing section 11 when a predetermined time passes from, e.g., activation. If the operation accepting section 21 receives the instruction signal inputted via the operational section 13 by the user, the operation accepting section 21 sends the instruction signal to the event processing section 11. Moreover, if the display data reception control section 23 receives the display data from the display data generating apparatus 2 via the receiving section 14b, the display data reception control section 23 notifies the event processing section 11 of the reception of the display data.

As described above, the various events that the event processing section 11 detects encompass passage of a certain time from a predetermined operation, pressing of a certain button of the operational section 13 during the display of the display screen, reception of display data from the display data generating apparatus 2, and the like events.

The display data request processing section 30 has a function of generating the display data request message 6. More specifically, the event processing section 11 instructs the display data request processing section 30 to generate a display data request message 6 (e.g., in response to an input of an album display instructing signal by the user), which requests a display screen on which a designated album is to be displayed. The display data request processing section 30 and the display data request message 6 will be described in more detail later.

The display data execution processing section 40 has a function of analyzing the display data and processing the display data according to the analysis result. The display data execution processing section 40 includes a control script executing section 41 for executing the photo application function according to the control script, and a basic function executing section 42 for performing the basic function program stored in the basic function program storage section 29. The event processing section 11 instructs the control script executing section 41 (e.g., in response to the reception of the display data) to analyze the control script include in the display data, and control the basic function executing section 42 according to contents of the analyzed control script, so as to perform one or plural basic functions thereby to execute a photo application function as a result of the execution of the one or plural basic functions in combination.

More specifically, the control script executing section 41 starts the control script execution in response to the notification from the event processing section 11. That is, the control script executing section 41 reads the control script so as to execute the control script from its first line. For example, the control script executing section 41 also manages a control structure (such as "If" sentence) contained in the control script. Moreover, the control script executing section 41 manages variables and key input values (notified from the event processing section 11) for computing.

If the control script includes description for calling a basic function, the control script executing section 41 passes an argument to the basic function executing section 42 based on the process carried out so far. The basic function executing section 42 executes the basic function designated by the control script executing section 41, and returns the result of the execution to the control script executing section 41.

The control script executing section 41 receives the result from the basic function executing section 42, and continues the control script execution. Following the control script, the control script executing section 41 performs, for example, display of an obtained image by executing a basic function(s), and then terminates the control script execution.

Examples of the photo application functions that the control script executing section 41 performs by controlling the basic function executing section 42 are thumbnail montage display of plural pictures of the album according to the layout definition script in the control script, 90° rotation of the picture being displayed, display of the operation menu (GUI screen) showing a list of operations operable to the picture being displayed.

In the following, the basic functions performed by the basic function executing section 42, and the photo application functions performed by the control script executing section 41 are exemplified.

For example, the script "rotate (90,960,540)" in a broken line frame 251 in FIG. 25 is for calling a basic function for executing rotation of an image at certain degree according to an argument passed from the control script executing section 41. The basic function of rotating is carried out by the basic function executing section 42.

The script "rgb (0,0,0)" in the broken line frame 252 in FIG. 26 is for calling a basic function for setting a background color of a text object according to an argument passed from the control script executing section 41. The basic function of setting the background color is performed by the basic function executing section 42.

Figure 13:
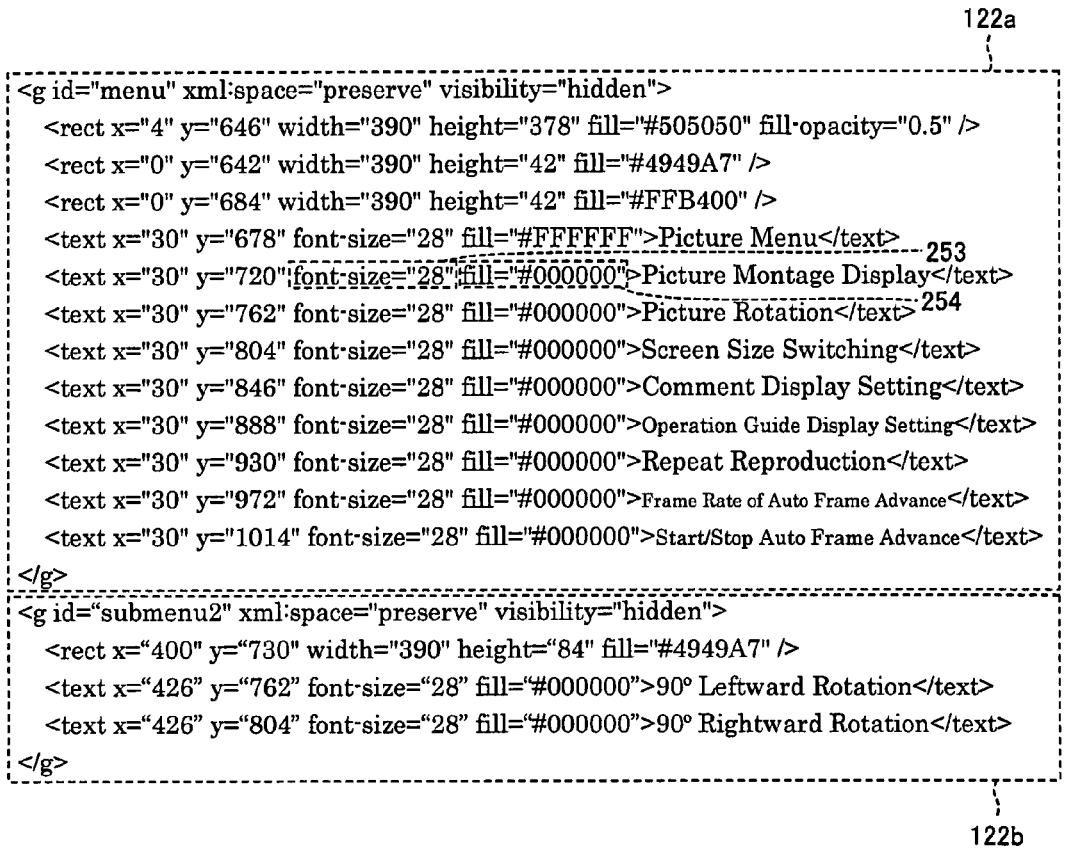
FIG. 13 is a view illustrating a specific example of the control script, which the control script executing section of the television refers to in order to perform the display data execution process.
Figure 14:
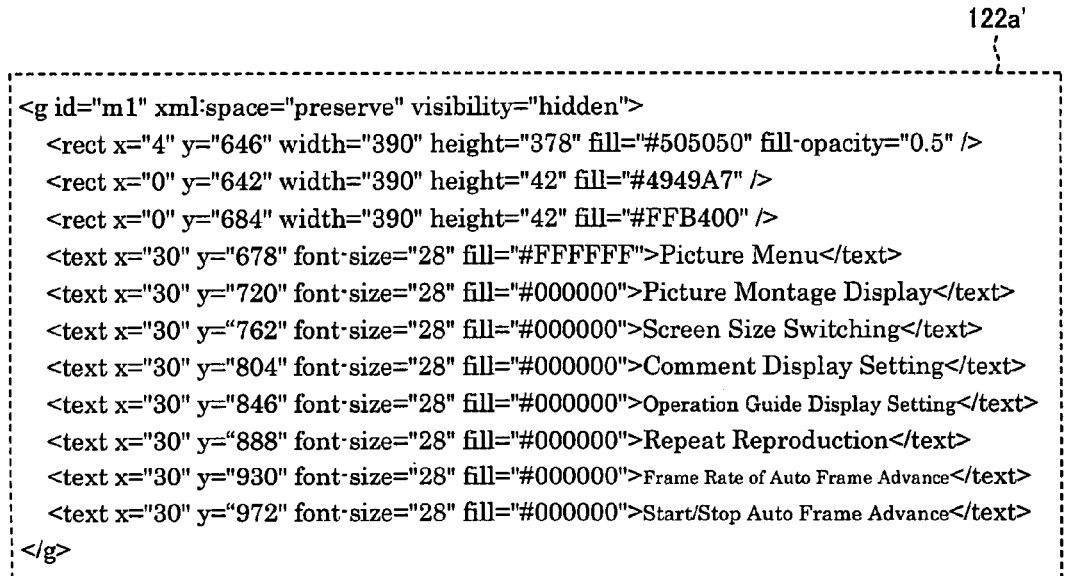
FIG. 14 is a view illustrating a specific example of the control script, which the control script executing section of the television refers to in order to perform the display data execution process.

The script "font-size=28" in the broken line frame 253 in FIG. 13 is for calling a basic function for setting a font size of a text object. The script "fill=#000000" in the broken line frame 254 is for calling a basic function of setting a color of a text object. These basic functions are executed by the basic function executing section 42.

As an alternative, the script "setTrait ("visibility", 'hidden')" in the broken line frame 261 in FIG. 12 defines a function for setting a property "visibility" of a data structure of an image to 'hidden'. This function is performed by the control script executing section 41.

A script 132b in FIG. 12 is performed by the control script executing section 41. The script 132b defines photo application functions for opening and closing a sub operation menu (a sub operation menu 1106 in FIG. 11(c)), and calling a function (basic function/photo application function) corresponding to a selected operation in the sub operation menu. According to the script 132b, the control script executing section 41 executes a function of displaying the sub operation menu (here, "submenu2") when it is detected that a certain button is pressed while the sub menu is closed. On the other hand, when it is detected that a certain button is pressed while the sub menu is open, the control script executing section 41 calls the function procedure "menuFunction" (photo application function) corresponding the item selected on the opened sub operation menu. A specific example of the function procedure "menuFunction" is illustrated in the script 132d of FIG. 12. The script 132d defines candidates of the functions that would be selected while the "submenu2" is being displayed.

The script "setFloatTrait ("r", '100')" in the broken line frame 262 in FIG. 32 defines a function for substituting, with a numerical value data 100, a value of r of the data structure (a value of a circle object of a script 112a). This function is carried out by the control script executing section 41.

Note that the photo application function is not limited to these function exemplified above. The display data execution processing section 40 will be described later in more details about its structure and photo application function that it performs by using the basic function(s).

With this configuration, the control script executing section 41 of the display data execution processing section 40 analyzes, in response to the instructions from the even processing section 11, the control script of the display data stored in the display data storage section 51. Thus, according to the analysis result, the control script executing section 41 calls the basic function, that is, the control script executing section 41 performs one photo application function by appropriately combining the basic function(s) performed by the basic function executing section 42.

With this, it is possible to realize various photo application functions in the television 1 by using the control scripts. Thus, various photo application functions in the television 1 can be realized without changing the basic function programs. As described above, the control scripts are created externally and provided to the television 1. Thus, even after the television 1 is shipped to the market, the photo application functions to be performed by the television 1 can be changed flexibly, and the television 1 can be modified easily in its functions without updating the program stored in the basic function program storage section 29.

Moreover, because the function can be changed so easily, the television 1 before shipping is not required to be wastefully installed with a huge number of functions to cover all possible needs just in case. As a result, this can alleviate the work load on the development of the television 1.

Furthermore, the control script is provided to the television 1 in such manner that the control script is included in the display data transmitted thereto. Thus, the display data (display screen) is provided with the control script in association with the display data (display screen). Thus, for both the party (display data generation apparatus 2) which generates and transmits the display data, and the party (television 1) which receives the display data, it is easy to manage the display data and the control script. Further, by providing the control script per display data, only the functions that the television 1 would be instructed to perform for displaying the display data can be efficiently provided to the television 1 depending on the display data.

These make it possible to raise the efficiency of the development and to easily change the functions of the apparatus that has been shipped to the market, and the changing the functions can be done without updating the program of the apparatus.

[Structure of Display Data Generating Apparatus Outline]

Figure 4:
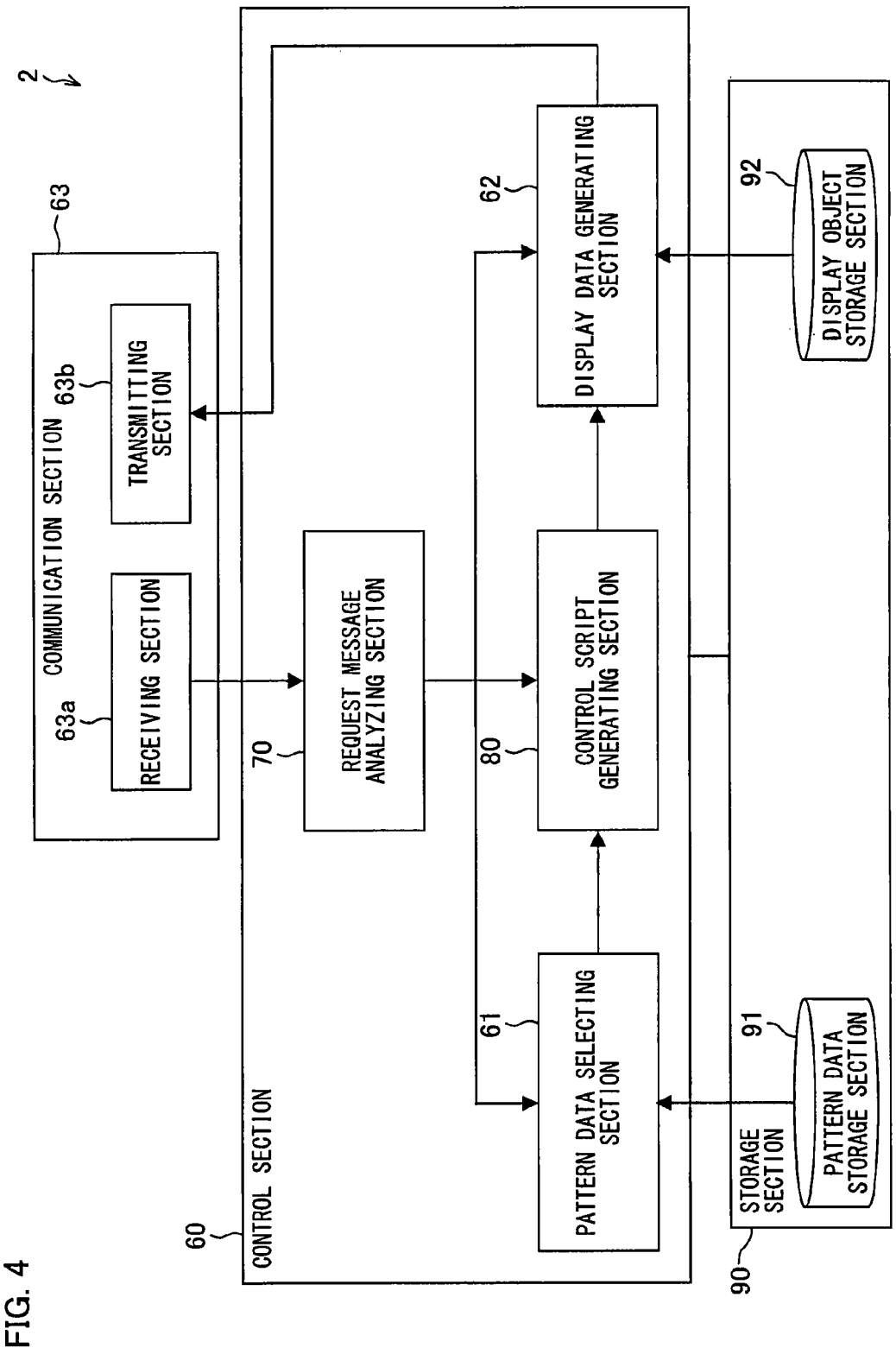
FIG. 4 is a block diagram schematically illustrating a display data generating apparatus according to the embodiment of the present invention.

FIG. 4 is a block diagram schematically illustrating the configuration of the display data generating apparatus 2 according to the present embodiment of the present invention. The display data generating apparatus 2 includes, as illustrated in FIG. 4, a communication section 63, and a control section 60 for controlling a display data generating apparatus 2, and a storage section 90.

The control section 60 controls various operations of various sections of the display data generating apparatus 2. The control section 60 includes a request message analyzing section 70, a control script generating section 80, a pattern data selecting section 61, and a display data generating section 62. The control section 60 reads out various programs stored in the storage section 90, so as to control the various sections of the display data generating apparatus 2, thereby to cause various operations for generating the display data (and the control script to be included therein).

The storage section 90 has a function of storing a control program and an OS program that the control section 60 executes, and various data that the control section 60 reads out for executing various process to generate the display data. The storage section 90 is a non-volatile device such as a hard disc. The various data are stored in respective storage sections such as pattern data storage section 91, the display object storage section 92, etc. in the storage section 90. The various data to be stored in the storage section 90 are not limited to these.

The communication section 63 has a function of externally communicating with devices out of the display data generating apparatus 2 in the network album system 100. The communication section 63 includes a receiving section 63*a* and a transmitting section 63*b*.

More specifically, the receiving section 63*a* has a function of receiving the display data request message 6 transmitted from the television 1. The display data request message 6 received via the receiving section 63*a* is forwarded to a request message analyzing section 70 of the control section 60. The transmitting section 63*b* has a function of transmitting the display data 7 generated in response to the request from the television 1. Via the transmitting section 63*b*, the display data 7 transmitted thereto from the display data generating section 62 is transmitted to the television 1 that requests the display data 7.

Moreover, in generating the display data 7, the communication section 63 communicates with the album managing server 3 (FIG. 2), if the display data 7 to be generated is for a display screen for displaying pictures of an album. Thereby, the communication section 63 requests the album managing server 3 to supply the album 5 (or picture) to be displayed, and acquires the album 5 (or picture) from the album managing server 3.

If the display data generating apparatus 2 has the network album DB 8, it is not necessary to acquire the album 5 (picture) via the communication section 63. In this case, the album 5 (picture) received via the receiving section 63*a* from the communication terminal device such as the PC4 is stored in the network album DB 8.

The request message analyzing section 70 has a function of analyzing the display data request message 6 transmitted from the television 1. For example, if the display data request message 6 is a message for requesting display data for a display screen (slide show display screen) of the slide show of an album, the request message analyzing section 70 extracts, out of the display data request message 6, album ID, display screen ID (information from which it can be judged that the slide show display screen is requested), terminal ID (information that identifies the television 1 that requests the slide show display screen) and other various relevant information.

The pattern data selecting section 61 has a function of selecting pattern data most suitable for generating the requested display data referring to the analysis result of the request message analyzing section 70. The pattern data selecting section 61 selects from the pattern data storage section 91 the most suitable pattern data specified by the analysis result. The pattern data selected by the pattern data selecting section 61 is transmitted to the control script generating section 80 for generating the control script from the pattern data.

The pattern data is pattern information of the control script and is written in fixed forms of the various scripts mentioned above (or the pattern data is a combination of the fixed-form scripts). That is, pattern data is a template of the control script. The pattern data would be referred to as a "container" for "contents" if the "contents" referred to the display object identifying information, information indicating association between the display object identifying information and information regarding the display position and display size, information specifically defining the screen of the operation menu, album title, comment, and the like information.

For example, if the analysis of the request message analyzing section 70 finds that the television 1 requests the display data for the slide show display screen, the pattern data selecting section 61 selects, from the pattern data storage section 91, pattern data of the control script for constructing the slide show display screen. Then, the control script generating section 80 generates the control script based on the selected pattern data.

Based on the pattern data selected by the pattern data selecting section 61, the control script generating section 80 generates the control script to be included in the requested display data.

Based on the analysis result of the request message analyzing section 70, the control script generating section 80 extracts, out of the various information stored in the storage section 90, all information to be included in the display data (i.e., the control script generating section 80 specifies the contents of the control script). Then, the specified contents (for example, the title of the album, picture ID, information on shift direction of the screen) is embedded into the pattern data thereby to accomplish the control script.

In the above example, the accomplished control script is the control script for constructing the slide show display screen.

The display data generating section 62 has a function of generating the display data designated by the display data request message 6, and transmitting the display data to the television 1. More specifically, the display data generating section 62 combines the control script generated by the control script generating section 80, and the display object designated by the display object specifying script included in the control script, thereby to generate the display data for displaying the display screen requested by the television 1.

The display data generated in this way includes what is requested by the television 1, that is, the most suitable information, i.e., the control script, according to the contents of the display data request message 6.

With this arrangement, the pattern data selecting section 61 selects the most suitable pattern data according to the analysis result of the request message analysis section 70, and the control script generating section 80 specifies the most suitable contents. Thus, the display data generating apparatus 2 can prepare a control script suitable for the display data requested by the television 1, and provide the control script to the television 1. The television 1 can realize a photo application function according to the suitable control script thus provided.

As described above, the television 1 can be controlled by the control script so that the television 1 can operate suitably for the requested display data (the contents of the display screen) to be displayed.

With this configuration, the function of the television 1 can be changed by a generated control script provided to the television 1, without updating the program. Furthermore, the generated control script is in association with the display data. Thus, it is possible to provide the television 1 with a control script customized according to the contents of the display data.

[Process of Network Album System]

Figure 5:
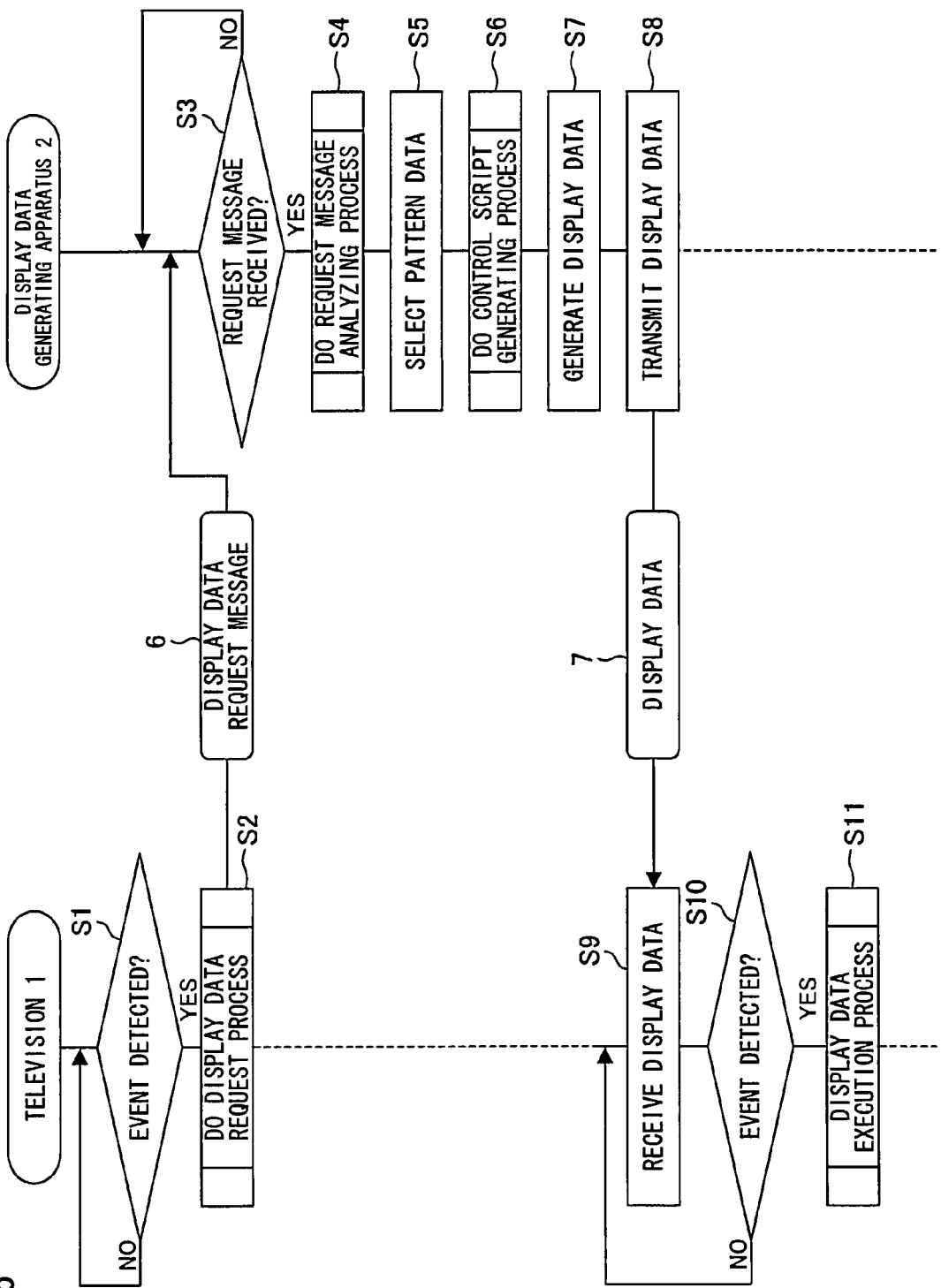
FIG. 5 is a sequence diagram illustrating a flow of processes of the apparatuses in the network album system according to the embodiment of the present invention.

FIG. 5 is a sequence diagram illustrating a flow of the processes of each apparatus in the network album system 100 according to the present embodiment.

If the event processing section 11 of the television 1 detects a certain event (passage of a predetermined time period, reception of an instruction signal from the operational section 13 of the user, or the like event) (Yes at S1), the display data request processing section 30 performs the display data request process for requesting the display data generating apparatus 2 to supply the display data (S2). More specifically, the display data request processing section 30 generates the display data request message 6 and transmits it to the display data generating apparatus 2. The display data request processing section 30 may extract, out of the relevant information storage section 52 (FIG. 1), relevant information necessary for the display data generating apparatus 2 to generate the display data, and then include the extracted relevant information in the display data request message 6.

When the display data generating apparatus 2 receives the display data request message 6 from the television 1 (Yes at S3), the request message analyzing section 70 performs the request message analyzing process (S4) to analyze the received display data request message 6.

Then, referring to the analysis result obtained at S4, the pattern data selecting section 61 selects pattern data (S5) most suitable for generating the display data to be provided to the television 1. The pattern data is stored in the pattern data storage section 91 (FIG. 4) and the pattern data selecting section 61 selects the most suitable pattern data from the pattern data storage section 91.

Next, the control script generating section 80 performs control script generating process according to the selected pattern data (S6), which is a process for generating a control script for causing the television 1 to display the display object to be display or for causing the television 1 to perform a certain operation. Subsequently, display data is generated (S7), the display data including the control script generated by the control script generating section 80 and the display object to be displayed, which is stored in the display object storage section 92 (FIG. 3).

Finally, the display data generating apparatus 2 transmits the display data generated at S7 to the television 1 that requests the display data (S8).

The television 1 receives the display data 7 from the display data generating apparatus 2 (S9). If the event processing section 11 of the television 1 detects a certain event (reception of the requested display data, reception of instruction signal of the operational section 13 of the user, or the like event) (Yes at S10), the display data execution processing section 40 performs display data execution process (S11), thereby processing the display data 7.

The contents of the operation to be executed by the display data execution processing section 40 is described in the control script included in the received display data. By controlling the basic function executing section 42 according to the control script, the control script executing section 41 can perform various processes (photo application functions) as the application functions of the network album by using the basic function(s).

For example, if the display data includes a picture as the display object and a control script containing a layout definition script for specifying a layout for the display of the picture, the display data execution processing section 40 performs the display of the picture according to the layout definition script in the control script.

As described above, the television 1 can perform the photo application functions by following the control script contained in the display data.

This makes it possible to change the function(s) of the television 1 easily by changing the description in the control script.

Moreover, the display data generating apparatus 2 can generate suitable display data (control script) in response to the request of the television 1, and control the operation of the television 1 with the display data.

In the following explanation, where three examples are discussed to exemplify the photo application functions that the television 1 performs. Each of the following embodiments respectively describes, in details, the steps of changing the photo application functions of the television 1 by using the control script of the display data and the basic function of the television 1.

Function 1

Operation Menu Display/Operation Execution

Embodiment 1

When the display section 15 thereof is displaying the display data regarding the application of the network album, the television 1 presents to the user an operation menu, which is a list of executable operation items of the television 1. Moreover, an operation item selected by the user from the displayed operation menu is notified to the television 1 via the operational section 13 and then the operation accepting section 21, and the television 1 performs the operation of the selected operation item.

By using the control script included in the display data, the operation menu to be displayed can be changed per display data, and the operation items and contents thereof that the television 1 performs can be changed flexibly.

Furthermore, by using the control script, it is possible to control the display of the operation menu in the television 1. For example, the display position, display timing, design, etc. of the operation menu can be changed flexibly.

Function 2

Display Image Data Reformation Region Designation

Embodiment 2

The television 1 generates the data of the display screen based on the display data, and outputs the display data of the display screen on the display section 15 thereby to display the display screen. To switch the display screen to be displayed, the television 1 recreates data of a new display screen, based on another display data. If it is not necessary to change the display contents of a whole display region of the display section 15, that is, it is necessary to change the display contents of only part of the display region of the display section 15, the television 1 can perform the image data formation in such a manner that an image data formation region is limited to the part of the display region, thereby to switch the display screen efficiently.

By using the control script included in the display data, it is possible to designate the image data formation region for each display data. Thereby, the image data formation region can be designated to the television 1 flexibly according to the display data. Furthermore, the recreation of a complicate-shaped graphic generally requires a high-load process (clipping process) for working out, exactly according to the complicate-shaped graphic, the region that requires the image data formation. In this point, the television 1 does not need such a high-load clipping process, in order to specify the image data formation region. The television 1 can specify the image data formation region by designating the image data formation region of a simple shape (for example, a rectangular shape) that includes the whose complicate-shaped region that requires the image data formation. This allows to perform appropriate image data formation process efficiently.

What is meant by the terms "image data formation (reformation)" (and grammatical variants thereof) is, broadly, any operation that the computer (television 1) carries out for displaying data on the display apparatus (the display section or the like). Thus, the terms "image data formation" encompasses a wide variety of actions and therefore writing (to write in a memory such as the frame buffer the data to be displayed on the display apparatus), converting (to convert the data in a format displayable on the display apparatus), rendering, rasterizing, updating, expanding, and any actions that have similar meanings in this technical field.

Function 3

Remote Control Button Function Allotting

Embodiment 3

The television 1 performs various operations according to the instruction signal inputted to the operation accepting section 21 by pressing the various buttons of the operation section 13 by the user.

Each button is allotted with a function in advance. When a certain button is pressed, a certain operation corresponding to the button is performed by the television 1.

By using the control script included in the display data, it is possible to change allocation of the functions to the buttons of the operational section 13 per display data.

More specifically, for example, allocation of a function to a certain button may be changed such that the button is allocated with another function so that when the button is pressed when a certain display data is displayed, the television 1 executes the another function. Furthermore, allocation of a function to a certain button may be changed such that the function is allocated to another button so that the another button should be pressed in order to cause the television 1 to perform the operation of the function.

In the following embodiments, the identical members are labeled in the same fashion. Thus, the constituents of the apparatuses described above are labeled in the same fashion and their explanation is not repeated where appropriate.

Embodiment 1

[Background Art and Object]

In conventional apparatuses, such as conventional televisions, conventional portable phones, etc. in which an embedding type computer is built in, appearance or specification of implemented application cannot be changed without changing of an application program embedded therein.

For example, in case where a GUI screen or the like is realized by a Web browser, a change such as a change in display position can be done by rewriting current contents (display data).

Known Document 1 (Japanese Unexamined Patent Application, No. 2005-51563 (published on Feb. 24, 2005) discloses a content distributing method and a content distributing system in which a layout of an image to be displayed on a screen of a receiver is grasped on a delivering side, and the layout can be changed by an easy operation from the delivering side.

However, to change a function of a browser itself still requires changing a program implemented in the apparatus. Furthermore, it is not possible to flexibly change a function of the content receiver side (computer-embedded apparatus (television 1) according to what the delivered content (display data) is.

In the methods of the Known Document 1, it would not be necessary to rewrite the whole software in order to change the function of the receiving-side apparatus, if a program is so created by the delivering party in advance that the program can be changed with a setting file and a plug-in that will be delivered to the receiving-side apparatus. However, in this case again, the function of the apparatus cannot be changed flexibly according to the delivered content, without delivering, in association with the content, the setting file of the operation menu for the content. It is a problem that this complicates management of the contents and setting files for the delivering party and the receiver-side apparatus.

The present embodiment describes a television 1 and display data generating apparatus 2 (network album system 100) in which, by using a control script easy to manage because it is included in display data, operation items of an operation menu to be displayed are selected according to contents of display data (display screen/content) to be displayed by the television 1, so as to customize the television 1 regarding its executable functions.

[Configuration 1 of Television—Details]

Figure 6:
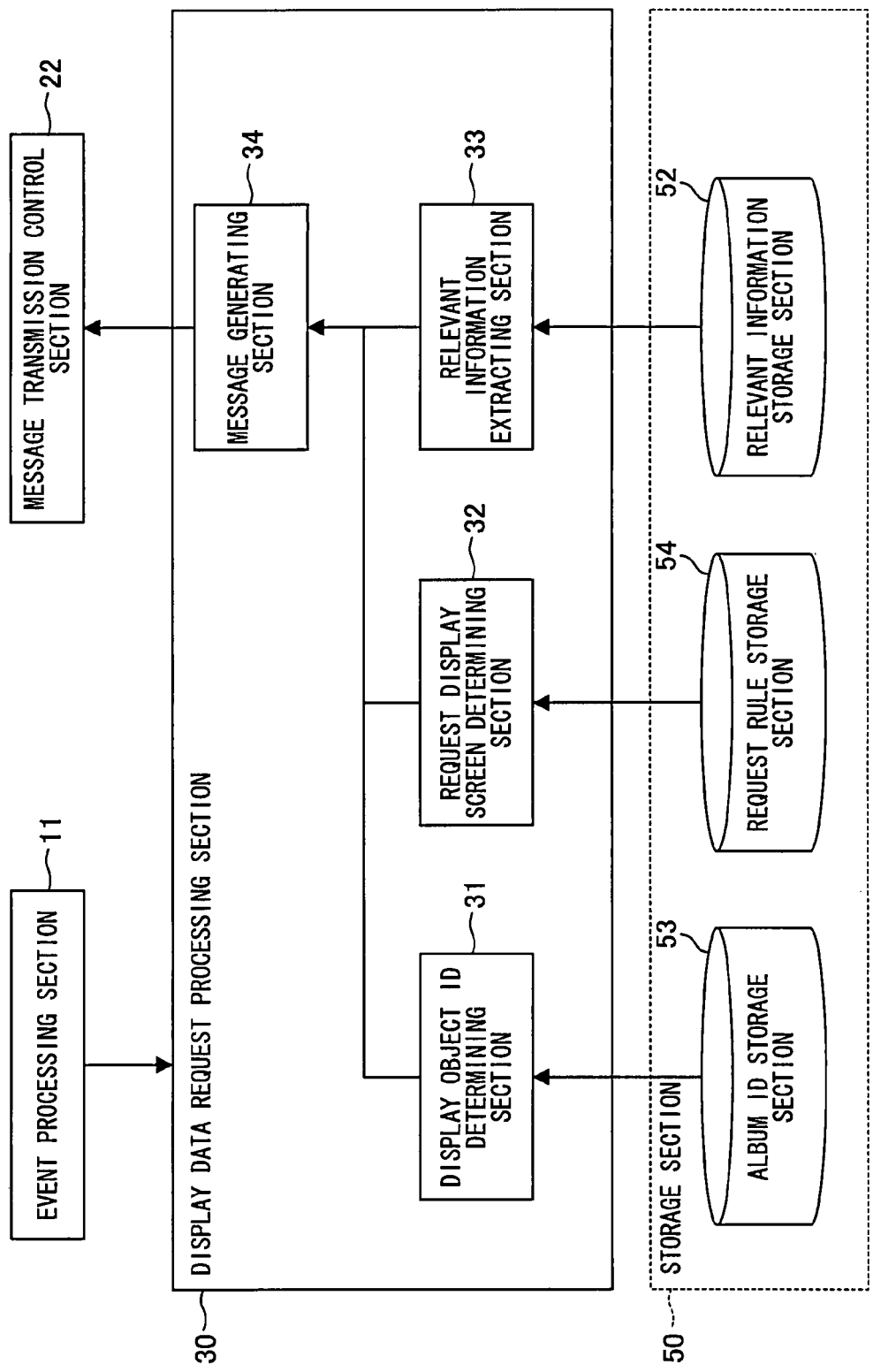
FIG. 6 is a block diagram of a main part of the television of the present embodiment, and is a view illustrating more details of a display data request processing section of the television illustrated in FIG. 1.
Figure 9:
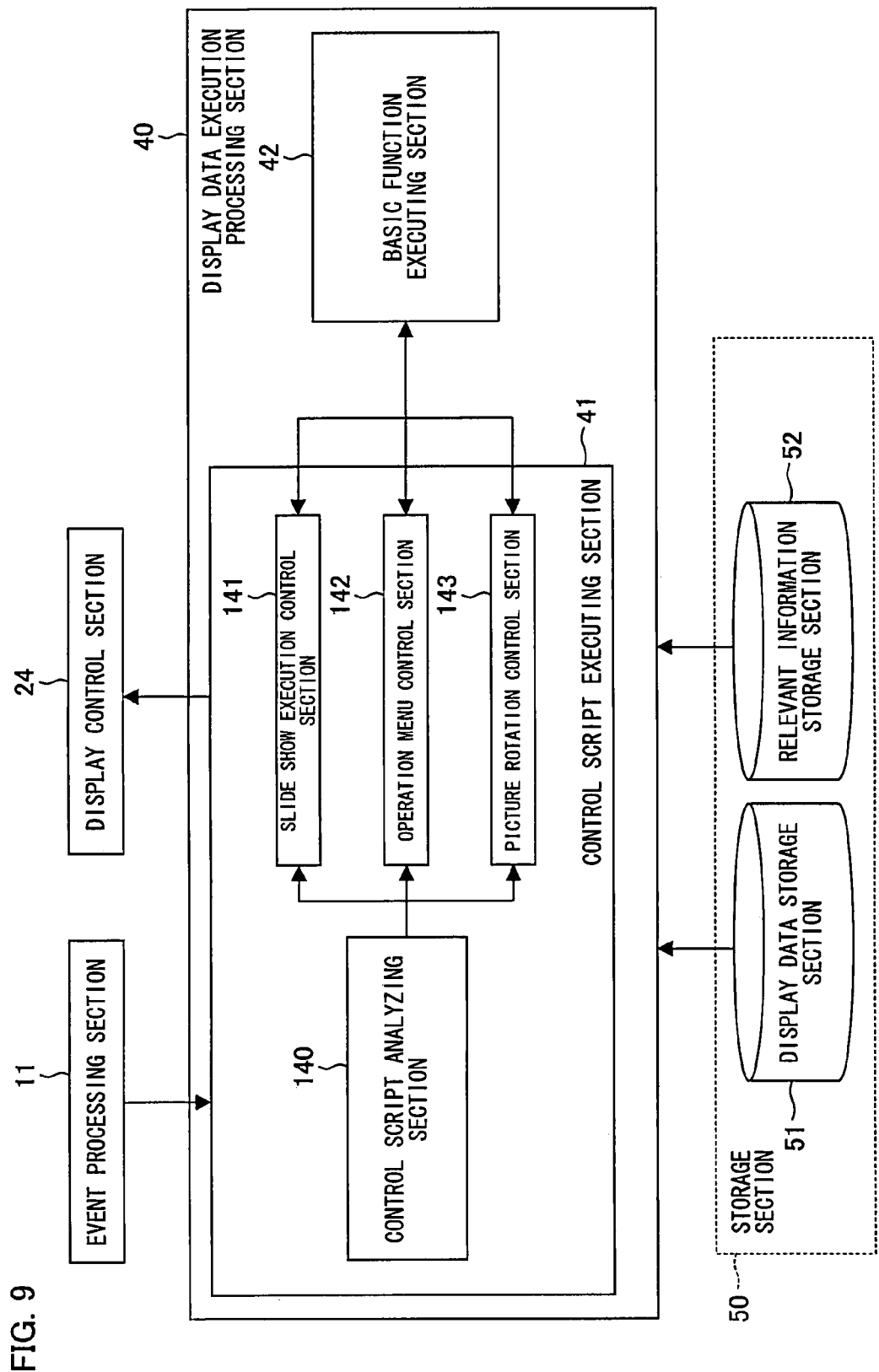
FIG. 9 is a block diagram illustrating a main part of the television according to the present embodiment, and is a view illustrating more details of the display data execution processing section of the television illustrated in FIG. 1.

FIGS. 6 and 9 are block diagrams illustrating configurations main parts of the television 1 according to the present embodiment. FIG. 6 is a diagram illustrating more details of the display data requesting section 30 of the television 1 illustrated in FIG. 1.

As illustrated in FIG. 6, the display data request processing section 30 of the television 1 further includes a display object ID determining section 31, a request display screen determining section 32, a relevant information extracting section 33, and a message generating section 34. The storage section 50 includes an album ID storage section 53 and a request rule storage section 54 in addition to the configuration of FIG. 1.

These members of the display data request processing section 30 carry out the display data request process (S2) of FIG. 5 in response to receipt of a predetermined signal at the display data request processing section 30 from the event processing section 11 which detects a certain event and transmits the signal. As a result of the display data request process (S2), the display data request message 6 is generated.

FIG. 7 is a diagram schematically illustrating a data structure of the display data request message 6 generated by the display data request processing section 30. FIG. 7 illustrates a display data request message 6 for requesting a slide show display screen (display data for the slide show display screen) by way of example.

In the example illustrated in FIG. 7, the display data request message 6 has a data structure in which 5 records are grouped as one. In the display data request message 6 illustrated in FIG. 7, a first column C101 indicates names of data, and a second column C102 indicates contents of the data. The type of the data can be arbitrarily selected according to contents, data size, and usage indicated by the data.

A record R1 indicates an album ID (identification information) of an album to which pictures (requested picture) to be displayed by the request slide show display screen belong. A record R2 indicates the picture ID (identification information) of the picture to be displayed on the display screen. In the present embodiment, the picture ID is an order of display of the pictures. Each album has an order of display that should be followed. In FIG. 7, "No. 1" indicates that the photo is to be displayed first in the album identified by the record R1.

A record R3 indicates display screen ID for identifying a type of the display screen the display data request message 6 requests. In the example illustrated in FIG. 7, the display screen ID "Scr_C" indicates that the display screen is a slide show display screen. Thus, the display data request message 6 is requesting the slide show display screen for a slide show of the picture which is first in the order of display of the album identified in the record R1.

A record R4 indicates a terminal ID for identifying a television 1 that requests the display data and has generated the display data request message 6. In the example illustrated in FIG. 7, the record R4 stores an IP address of the television 1. With this, the display data generating apparatus 2 can identify the sender of the display data request message 6, that is, can be specifically notified of the receiver to which the generated display data is to be returned. The terminal ID may be any information that can uniquely identify the terminal (television 1) that will receive the display data 7 in the network album system 100. The terminal ID may be an identification of the terminal that is given to the television 1 by the display data generating apparatus 2 when the television 1 is registered, or may be an identification of the terminal such as MAC address, product serial number, etc.

Further, the display data request message 6 may include specification information of the television 1, as illustrated in records R5 to R7. For example, specification information of the television 1 (information of the specification especially related to the display function, such as screen size, resolution, etc. or related to the function of the network album such as machine name, software version information, etc.) may be included in the display data request message 6. With this, the display data generating apparatus 2 can generate the display data 7 suitably for the specification of the television 1 that requests the display data 7.

The display object ID determining section 31 of FIG. 6 has a function of determining which display object to be requested to the display data generating apparatus 2, and designates the display object ID. More specifically, the display object ID determining section 31 designates the album ID and picture ID to be stored in the records R1 and R2 of the display data request message 6 illustrated in FIG. 7.

For example, the display object ID determining section 31 designates the album ID and picture ID in the following manner.

In the album ID storage section 53, album ID of albums that the user have previously viewed. Based on the previously-viewed album information stored in the album ID storage section 53, the albums previously viewed are displayed on the display section 15 via the display control section 24.

When a button is pressed by the user via the operational section 13, one of the album displayed on the display section 15 is selected, and an instruction signal is inputted to start the slide show of the selected album. The signal of the instruction is transmitted to the display object ID determining section 31 via the event processing section 11. The display object ID determining section 31 refers to the album ID storage section 53 thereby to identify the album ID selected by the user. As an alternative, the user manually inputs the album ID in an album ID input screen displayed on the display section 15, and thereby a signal of a button pressed is transmitted. The album ID thus transmitted may be designated as the album ID.

For example, the designation of the picture ID is assumed that the slide show is performed by displaying the pictures in the predetermined order. When the event processing section 11 detects that the instruction input instructing the start of the slide show is inputted, the display object ID determining section 31 specifies the picture ID as "No. 1", which designates the first picture in the order of the display. Moreover, if the event processing section 11 detects that a button for selecting a next page is pressed, when n-th slide show display screen in the order of the display is displayed, the display object ID determining section 31 specifies the picture ID as "No. n+1" in the order of display.

The request display screen determining section 32 has a function of determining the type of the display screen to be requested in the display data request message 6, from among various display screens described above. The request display screen determining section 32 determines which display screen is to be requested, according to the event detected by the event processing section 11, and a current operation state of the television 1.

The request rule storage section 54 stores (1) events that the event processing section 11 would detect, (2) operation states of the television 1, (3) display screen ID of display screens to be requested in such a manner that combinations of (1) the events and (2) the operation states are associated with (3) the display screen ID of display screens to be requested. With this, the request display screen determining section 32 can know which display screen should be requested, based on the notice from the event processing section 11 and the request rule storage section 54. For example, when the event processing section 11 detects that the display data execution processing section 40 of the television 1 activates the photo application function, the request display screen determining section 32 determines to request a welcome screen of the application.

The display screen ID of the display screen determined by the request display screen determining section 32 is for example stored in the record R3 of the display data request message 6 illustrated in FIG. 7.

The relevant information extracting section 33 has a function of acquiring, from the relevant information storage section 52, relevant information that should be included in the display data request message 6, from among the various relevant information regarding the television 1 and being registered in the relevant information storage section 52 in advance.

FIG. 8 is a view illustrating an example of a relevant information table stored in the relevant information storage section 52. In the present embodiment, the relevant information stored in the relevant information storage section 52 is categorized into three kinds.

A first column group C11 stores specification information regarding specification of the television 1, such as "machine type", "terminal ID", "screen size", and "pixel number" etc. of the television 1. The first column group C11 may store "software version information" as the specification information, the software version information indicating the version of the application software of the network album system. A second column group C12 stores setting information regarding display of a picture or the album, such as "frame rate (of slide)", "repeat reproduction", "comment display", "operation guide display", etc. The second column group C12 may store "the number of the previously-viewed album" as the setting information, where the number of the previously-viewed album indicates the number of the pieces of the album information to be displayed on the previously-viewed album screen. Assume that "the number of the previously-viewed album" is two as in the example illustrated in FIG. 8. In this case, two pieces of information of previously-viewed albums are always displayed on the previously-viewed album screen. A third column group C13 stores user information of the user of the television 1 such as "viewer's age", "viewer's domicile", "post code", etc.

In the present embodiment, the display data 7 for the display screen (slide show display screen, thumbnail montage display screen, or the like) for display the picture is generated according to the pixel number of the display section 15 of the television 1. Thus, to request such a display screen, the relevant information extraction section 33 extracts the information on "pixel number" of the television 1 from the relevant information storage section 52. The thus extracted information on "pixel number" constitutes the record R5 of the display data request message 6 illustrated in FIG. 7.

The message generating section 34 generates the display data request message 6 that includes the various information for the request of the display data, the various information being determined (extracted) by the display object ID determining section 31, request display screen determining section 32, and the relevant information extracting section 33 in response to the notice from the event processing section 11. The display data request message 6 (FIG. 7) generated by the message generating section 34 is transmitted to the display data generating apparatus 2 from the transmitting section 14*a* via the message transmission control section 22.

FIG. 9 is a view illustrating more details of the display data execution processing section 40 of the television 1 illustrated in FIG. 1.

As illustrated in FIG. 9, the television 1 is arranged such that the control script executing section 41 of the display data executing process section 40 further includes a control script analyzing section 140, a slide show execution control section 141, an operation menu control section 142, and a photo rotation control section 143.

There members of the control script executing section 41 perform the display data execution process (S11) of FIG. 5 in response to the reception of the predetermined signal at the display data executing section 40 from the event processing section 11 that detects the certain event (e.g., the requested display data is supplied from the display data generating apparatus 2 as described above). The display data 7 is processed by the execution of the display data execution process. The control script analyzing section 140 has a function of analyzing the display data 7 as illustrated in FIG. 3, especially, the control script 110 included in the display data 7. For example, the control script analyzing section 140 analyzes the control script 110, extracts the script regarding the operation menu (such as operation menu specifying script 122, operation function definition script 132, or the like), and transmits the result of the analysis to the operation menu control section 142.

The slide show execution control section 141 has a function of controlling the execution of various processes for executing the slide show of the photos of the album. More specifically, the slide show execution control section 141 controls the basic function executing section 42 thereby to generate the data of the slide show display screen according to the layout definition script 112. Then, the slide show execution control section 141 causes the display control section 24 to write. Moreover, the slide show execution control section 141 controls the basic function executing section 42 to perform auto reproduction of the slide show, to display or not to display a character string or figure to be displayed overlapping the picture.

The operation menu control section 142 has a function of controlling the display process of the operation menu that shows a list of items of the functions of the television 1 (executable operations of the television 1). More specifically, the operation menu control section 142 controls the basic function executing section 42 to generate data of the operation menu that is to be displayed overlapping the slide show display screen. The generation of the data of the operation menu is carried out according to the operation menu specifying script 122 of the layout definition script 112. The data of the operation menu is then written.

Each operation item, which constitutes the operation menu specified by the operation menu specifying script 122, is associated with a function that the television 1 should perform when the operation item is selected. The function associated with the operation items is defined by the operation function definition script 132, and realized as one of photo application functions by the control script executing section 41 and the basic function executing section 42 controlled by the control script executing section 41.

One example of operation function execution control sections is a photo rotation control section 143.

The photo rotation control section 143 has a function of controlling the basic function executing section 42 to execute the picture rotation and display process according to the operation function definition script 132. For example, if the user selects an operation item "90°, rightward rotation", the photo rotation control section 143 causes the display section 15 to display the picture rotated by 90° rightward.

The display control section 24 has a function of write the display region according to the data of the display screen, which is transmitted from the control script executing section 41, and displays on the display section 15 of the television 1 the display screen defined by the display data.

[Display Data Execution Process Flow of Television]

Figure 10:
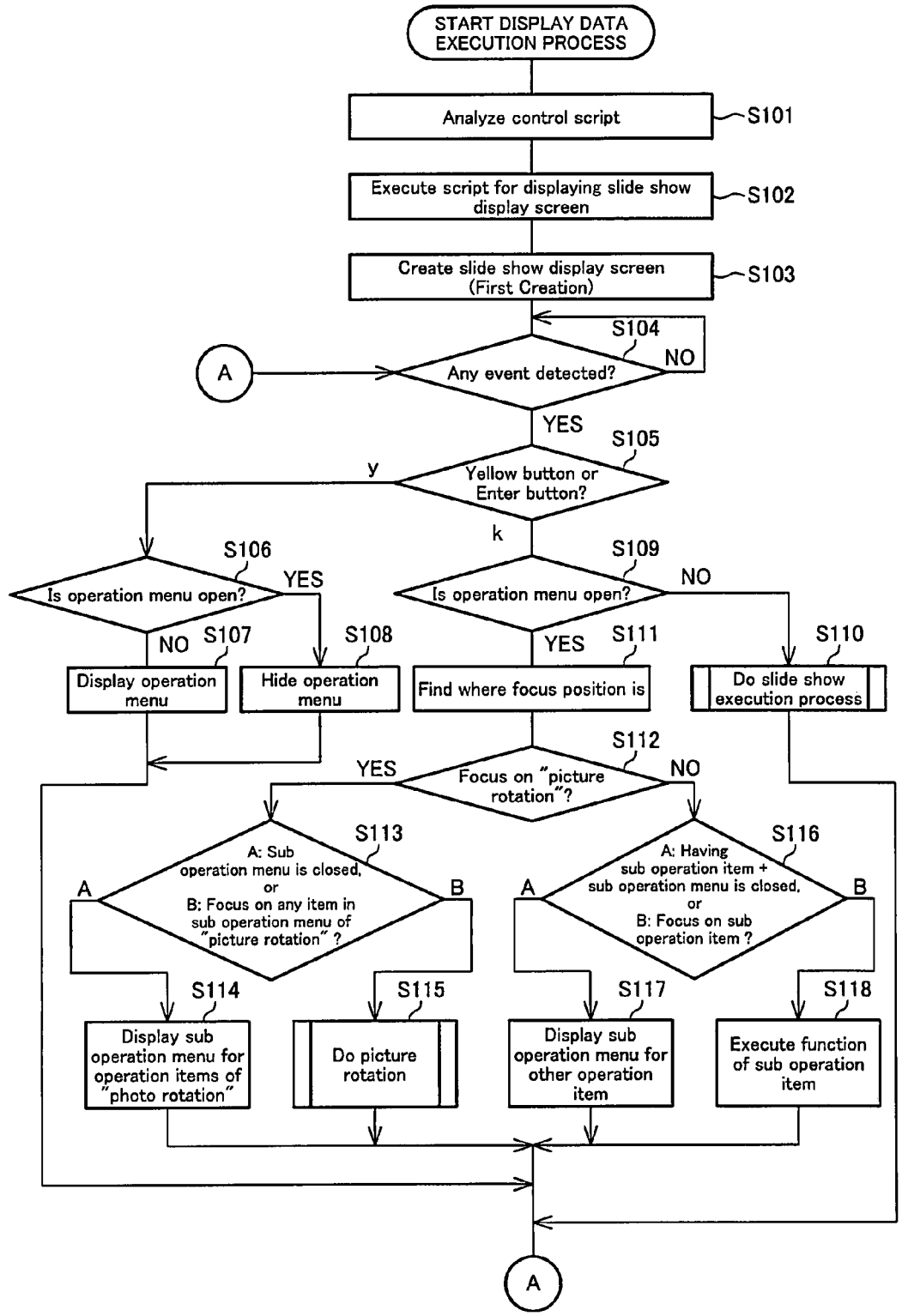
FIG. 10 is a flow chart illustrating a flow of a display data execution process performed by the television of the present invention.

FIG. 10 is a flow chart illustrating a flow of the display data execution process of the television 1. By way of example, FIG. 10 illustrates a flow of the process that the television 1 receives the requested display data for the slide show display screen, and displays the slide show display screen thereby to perform for slide show.

Upon receiving, from the event processing section 11, the instruction for stating the display data execution process, the control script analyzing section 140 acquires the received display data for the slide show display screen from the display data storage section 51 according to the instruction, and analyzes the control script included in the display data (S101).

The slide show execution control section 141 executes the script (layout definition script or the like) (S102) for displaying the slide show display screen on the display section 15. The display control section 24 writes the slide show screen and displays the slide show screen on the display section 15 according to the control by the slide show execution control section 141 (S103). By this, the initial image data formation is finished and a picture, for example, as the display object 111 included in the display data for the slide show display screen is displayed as illustrated in FIG. 11(a). Then, the television 1 is in an event waiting state (e.g., waiting for button input via the operational section 13 by the user) (S104). In case where the slide show is reproduced automatically, the slide show execution control section 141, as illustrated in FIG. 11(a), displays an auto frame advance icon 1101 as instructed by the control script. The auto frame advance icon 1101 indicates the slide show is being reproduced automatically. Moreover, the slide show execution control section 141 may display a picture title 1102, an operation guide screen 1103, or the like, following the control script.

For example, if a yellow button (not illustrated) or enter button (not illustrated) of the operational section 13 is pressed by the user's operation while the image initially written (FIG. 11(a)) is being displayed, a signal caused by the button pressing is transmitted to the event processing section 11 via the operation accepting section 21, and thereby the event processing section 11 detects the event (Yes at S104).

If the event processing section 11 found that the pressing of the yellow button (y at S105), the control script executing section 41 performs a process to deal with the pressing of the yellow button.

Here, the yellow button of the operational section 13 is a button for operating the television 1 to display the operation menu 1104 (FIG. 11(b)), and a button to operate the television 1 to close the operation menu 1104 when the operation menu 1104 is being displayed, thereby to return to the state of FIG. 11(a). Such association between the buttons of the operational section 13 and functions that the television 1 should perform when the buttons are pressed is described in the operation content definition script contained in the control script.

Upon being notified by the event processing section 11, the control script executing section 41 determines whether the operation menu 1104 is open or not when the yellow button is pressed (S106).

If the control script executing section 41 determines that the operation menu is not open (No at S106), the operation menu control section 142 displays the operation menu 1104, contents of which is as required by the display data of the slide show display screen, according to the operation menu specifying script 122 of the control script 110 contained in the display data (S107). More specifically, the operation menu control section 142 controls the basic function executing section 42 to transmit to the display control section 24 the data to be displayed. By this, the display screen of the display section 15 is shifted from FIG. 11(a) to FIG. 11(b).

On the other hand, if the control script executing section 41 determines that the operation menu 1104 is being displayed (Yes at S106), the operation menu control section 142 closes the displayed operation menu 1104 according to the control script 110. By this, the display screen of the display section 15 is shifted from FIG. 11(b) to FIG. 11(a).

At S105, if the event processing section 11 found that the pressing of the enter button (k at S105), the control script executing section 41 performs a process to deal with the pressing of the enter button.

Here, the enter button of the operational section 13 is a button to open a sub operation menu. If the enter button is pressed while an operation item (having a sub operation menu) on the operation menu 1104 is selected, the sub operation menu of the operation item is opened. For example, as illustrated in FIG. 11(b) and FIG. 11(c), the enter button is pressed while the operation item 1105 "picture rotation" is being selected, the operation menu control section 142 displays the sub operation menu 1106. If the selected operation item has no sub operation menu (if the operation menu specifying script does not define that the selected operation item has sub operation menu), the control script executing section 41 performs an process of the operation item according to the control script 110, when the operation item is selected. Further, if the enter button is pressed while none of the menus is opened, the slide show execution control section 141 performs the slide show execution process.

More specifically, this is carried out as follows.

Like at S106, upon being notified by the event processing section 11, the control script executing section 41 determines whether the operation menu 1104 is open or not when the enter button is pressed (S109).

If the control script executing section 41 determines that the operation menu is not open (No at S109), the slide show executing control section 141 performs the slide show execution process (S110). More specifically, if the enter button is pressed while the display screen of FIG. 11(a) is being displayed, the slide show execution control section 141 displays a slide to display a photo that is, in the order of display, next to the photo currently displayed on the display screen.

On the other hand, if the control script executing section 41 determines that the operation menu 1104 is open (Yes at S109), the control script executing section 41 determines which operation item on the opened operation menu 1104 is focused when the enter button is pressed (S111). The state "being focused" is a state that the operation item is selected by the cursor. In the present embodiment, the display region of the selected operation item is displayed in a color different from the unselected operation items (e.g., the operation item 1105 for "picture rotation").

As illustrated in FIG. 11(b), if the control script executing section 41 determines that the enter button is pressed while the operation item 1105 for "picture rotation" is being focused (Yes at S112), then the control script executing section 41 determines whether to open or close the sub operation menu and which sub operation item is focused (S113).

If the control script executing section 41 determines that the sub operation menu 1106 is close (A at S113), the operation menu control section 142 displays the sub operation menu associated with the operation item for "photo rotation", as instructed by the operation menu specifying script 122 (S114). FIG. 11(c) illustrates an example in which the sub operation menu 1106 of the operation item 1105 is displayed.

On the other hand, if the control script executing section 41 determines that any of the operation items (e.g., "90° leftward rotation" or "90° rightward rotation" illustrated in FIG. 11(c)) on the sub operation menu 1106 of the operation item 1105 (B at S113) is being focused, the photo rotation control section 143 controls the basic function executing section 42 to perform the photo rotation process, as instructed by the operation function definition script 132 (S115). For example, if the enter button is pressed while the sub operation item "90° leftward rotation" is focused (FIG. 11(c)), the picture rotation control section 143 performs a process to make a 90° leftward rotation of a long-sideways picture 1107 displayed in FIG. 11(c). By this, the picture is rotated by 90° leftward to be a long-lengthways picture 1108 and displayed on the display section 15.

On the other hand, if another operation item other than the operation item 1105 is being focused and the focused another operation item has a sub operation menu and its sub operation menu is close (No at S112, and A at S116), the operation menu control section 142 displays the sub operation menu of the another operation item (S117). On the other hand, if the sub operation menu of the another operation item is open and a sub operation item is being focused (No at S112, and B at S116), the control script executing section 41 executes a function associated with the sub operation item, as instructed by the operation function definition script 132 (S118).

As S116, the operation item is an operation item that has no sub operation menu, the control script executing section 41 performs the function associated with the operation item, as instructed in the operation function definition script 132.

In case where the picture rotation control section 143 displays the rotated picture after the photo rotation process at S115, the rotated picture is displayed with the operation menu closed as illustrated in FIG. 11(d), if the control script has such a script that "the operation menu is closed after the picture rotation process". If not, the photo rotation control section 143 displays the rotated picture with the operation menu opened as illustrated in FIG. 11(e).

FIGS. 12 to 15 are views illustrating concrete examples of the control script that is referred to by various members of the control script executing section 41 in order to execute the display data executing process.

The script 132a illustrated in FIG. 12 is included in the operation function definition script illustrated in FIG. 3. The script 132a describes which function should be performed depending on the display state at the pressing of the yellow button. The control script executing section 41 (operation menu control section 142) can perform the processes at S106 to S108 as instructed in the script 132a.

The script 132b illustrated in FIG. 12 is included in the operation function definition script 132 illustrated in FIG. 3. The script 132b describes which function should be performed depending on the display state of the main operation menu and the sub operation menu (the sub operation menu 1106 of FIG. 11(c)) when the enter button is pressed. More specifically, the script 132b describes that the sub operation menu should be opened if the sub operation menu is not open when the enter button is pressed, and that the sub operation menu should be closed and the function of the sub operation menu should be performed if the sub operation menu is open when the enter button is pressed.

For example, the script 132d defines the function of the picture rotation that the picture rotation control section 143 should perform if any of the sub operation items of the picture rotation is selected (from the sub operation menu 1106 of FIG. 11(c)) by pressing the enter button.

The control script executing section 41 (the operation menu control section 142, and picture rotation control section 143) can performs the processes at S113 to S118 as instructed in the script 132b.

The script 122a illustrated in FIG. 13 is included in the operation menu specifying script 122 illustrated in FIG. 3. By the description in the script 122a, the main operation menu 1104 (e.g., FIG. 11(b)) to be displayed depending on the contents of the currently-displayed displays screen is specified. The script 132a (FIG. 12) defines that the function to display the operation menu (g id="menu") when the yellow button is pressed, the operation menu (g id="menu") being specified by the script 122a.

The script 122b illustrated in FIG. 13 is included in the operation menu specifying script 122 illustrated in FIG. 3. The script 122b specifies the sub operation menu 1106 of the operation item 1105 for "picture rotation". The operation function definition script 132 defines the function to display the sub operation menu (g id="submenu2") when the enter button is pressed while the operation item 1105 is being displayed, the sub operation menu (g id="submenu2") being specified by the script 122b.

Here, if it was in such a situation that the long-sideways picture 1107 illustrated in FIG. 11(c) should not be rotated, it would be undesirable that the operation item 1105 for "picture rotation" be displayed by the television 1 (operation menu control section 142) like the operation menu 1104. The reasons why the rotation is undesirable may be that the producer of the album (owner of the pictures) does not wish to rotate the picture, for example, due to the lack of the function of rotating the picture in the television 1, inappropriateness of displaying the picture long lengthways, or appropriateness of displaying the picture as the long-sideways picture 1107, etc.

In these cases, most appropriate operation menu script 122 may be provided to the television 1 according to the picture (contents of the display data) as the display object.

If there was such a reason as above, it would be desirable not to allow the television 1 to perform the function of the "picture rotation" for the display data containing the picture. To deal with such a case, the display data generating apparatus 2 can provide a control script including a script 122a' illustrated in FIG. 14, instead of the script 122a illustrated in FIG. 13. In this case, the operation function definition script 132 of the control script does not include the script for describing the function of the picture rotation. The script 122a' illustrated in FIG. 14 specifies the operation menu 1104 (FIG. 16) that does not include the operation item 1105 for "picture rotation", unlike the script 122a. Following such a script, the operation menu control section 142 can display, on the display section 15, an operation menu 1104 as illustrated in FIG. 16.

As described above, by providing the television 1 with the control script most appropriate for the contents of the display data, the television 1 can display an operation menu that is always most appropriate for the display data.

Furthermore, by appropriately changing the control script, the television 1 can be arranged to display a particular operation item on the operation menu 1104 in two stages in the same manner the sub operation menu is displayed. For example, assume that the rotation of the picture is possible but the person that provides the photo dose not intend to use the picture rotation function willingly. In such a case, the television 1 may be provided with an operation menu specifying script 122 (FIG. 17(a)) and an operation function definition script 132 that specify that the operation menu 1104 is provided with an operation item "other" and only if the operation item "other" is selected, the operation item 1105 is displayed in two stage like the sub operation menu.

It can be arranged such that by providing the television 1 with the operation menu specifying script 122 and the operation function definition script 132, the operation menu control section 142 displays, as illustrated in FIG. 17(b), the operation item 1105 in two stages like the sub operation menu. Moreover, it can be arranged such that the picture rotation control section 143 performs the picture rotation process only when the operation item 1105 is selected.

As an alternative, in case where the control script for displaying the same operation menu 1104 is provided to the television 1 regardless of whether the picture rotation is possible or not, it may be arranged such that the control script executing section 41 determines, based on the control script, whether the rotation is possible or not, and thereby determines whether to display the sub operation menu 1106 for "picture rotation".

For example, instead of the script 132*b* illustrated in FIG. 12, the display data generating apparatus 2 provides to the television 1*a* script 132*b*' illustrated in FIG. 15. By this, the television 1 operates as instructed by the script 1230 describing that the following process should be performed only when the picture rotation is possible. That is, only when the control script executing section 41 determines that the picture is a picture to which the picture rotation is applicable, the operation menu control section 142 performs the operation to display the sub rotation menu 1106 for "picture rotation" specified by the script 122*b* of FIG. 13.

As described above, it can be arranged such that by providing the script 132*b*' illustrated in FIG. 15 to the television 1, the television 1 can display the sub operation menu 1106 only when it is possible to rotate the picture.

In addition, at S110 of FIG. 10, the slide show executing process that the slide show execution control section 141 can be controlled by the script 132*c* illustrated in FIG. 12.

Figure 11:
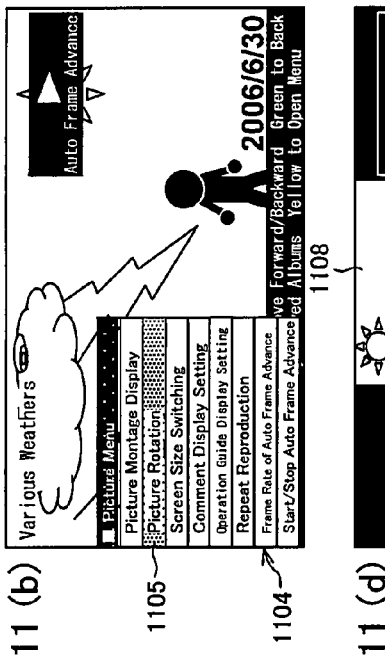
FIGS. 11 (*a*) to 11(*e*) are views illustrating example of displays of the display screens displayed on a display section of the television according to control scripts.
Figure 11:
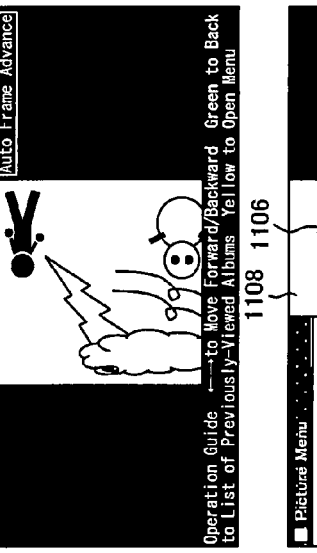
Figure 11:
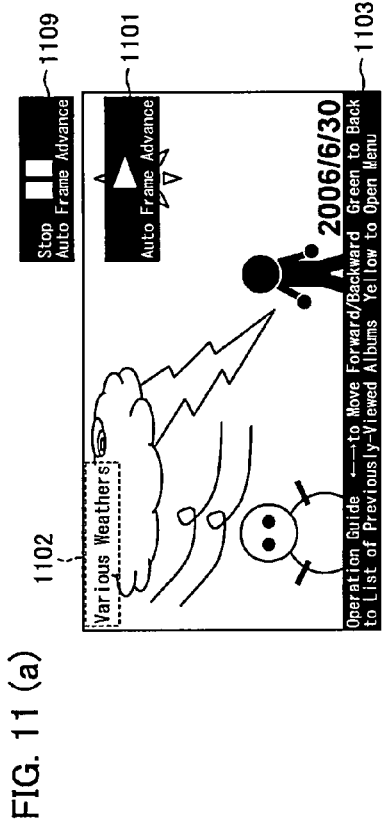
Figure 11:
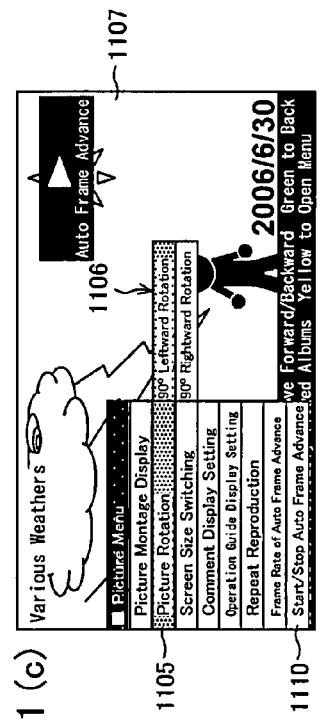
Figure 11:
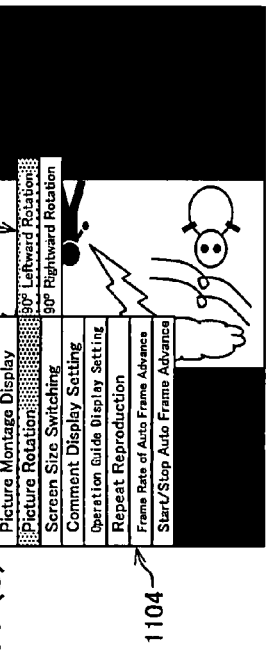

If the enter button of the operational section 13 is pressed by the user while the operation menu 1104 illustrated in FIG. 11(*b*) is not opened, the slide show execution control section 141 further determines whether the slide show is being automatically reproduced or not.

The slide show execution control section 141 stops displaying the auto frame advance icon 1101, displays an auto frame advance stop icon 1109, and stops the auto reproduction of the slide show when the enter button is pressed while the slide show execution control section 141 is performing the slide show reproduction. On the other hand, the enter button is pressed when the slide show reproduction is stopped, the slide show execution control section 141 displays the auto frame advance icon 1101, stop displaying the auto frame advance stop icon 1109, and restarts the auto reproduction of the slide show. As described above, by providing the script 132*c* to the television 1, it is possible to realize a television 1 that can control the auto reproduction of the slide show by pressing the enter button while the operation menu is not open.

Next, the display data generating apparatus 2 that generates the display data included in the control script as described above and provides the display data to the television 1.

[Configuration 1 of Display Data Generation Apparatus—Details]

Figure 18:
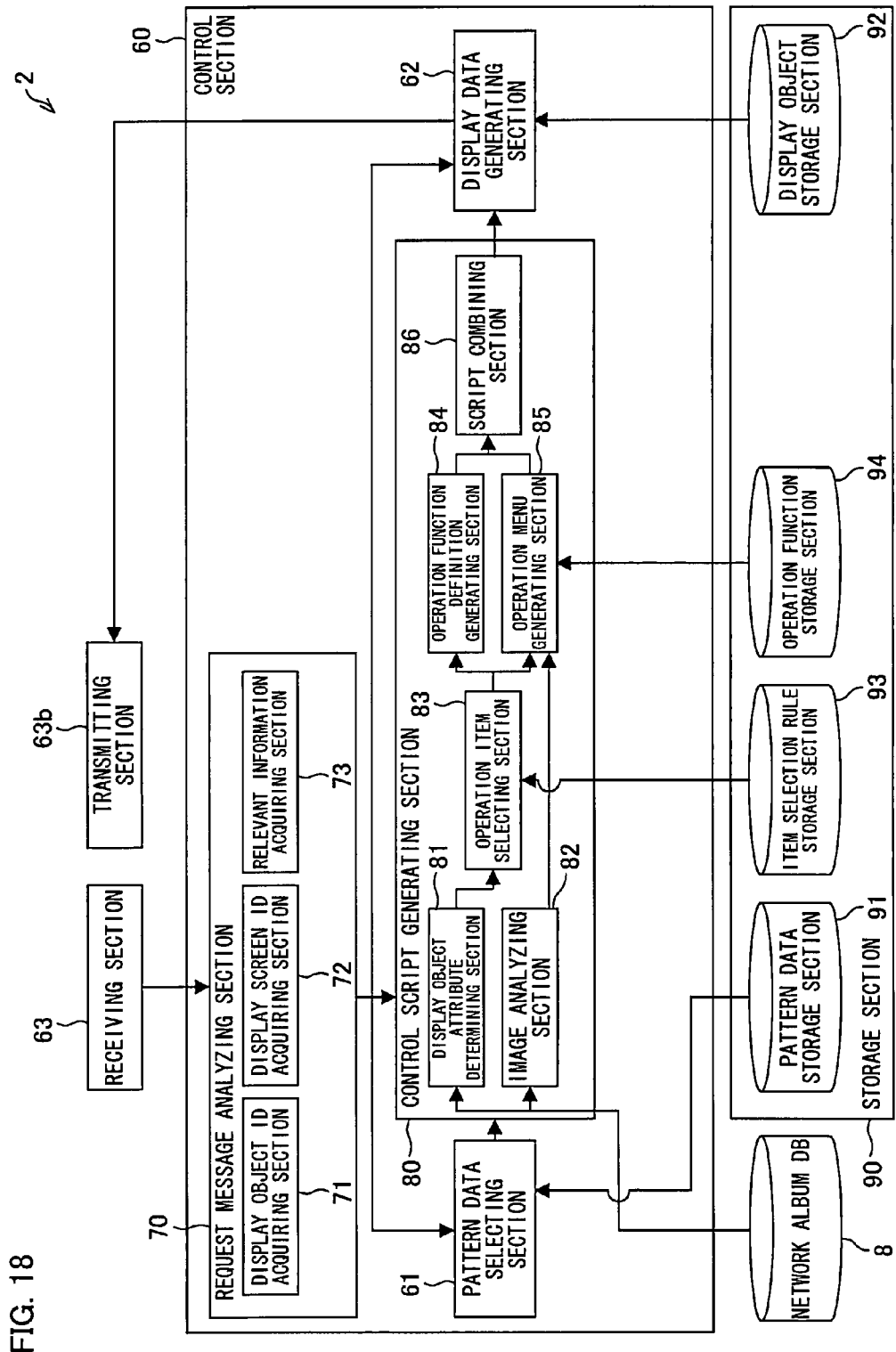
FIG. 18 is a block diagram illustrating a main part of the configuration of the display data generating apparatus according to the present embodiment.

FIG. 18 is a block diagram illustrating main part of the configuration of the display data generating apparatus 2 according to the present embodiment. As illustrated in FIG. 18, the request message analyzing section 70 of the display data generating apparatus 2 further includes a display object ID acquiring section 71, a display screen ID acquiring section 72, and a relevant information acquiring section 73. The control script generating section 80 further includes a display object attribute determining section 81, an image analyzing section 82, an operation item selecting section 83, an operation function definition generating section (control script generating means) 84, an operation menu generating section (control script generating means) 85, and a script combining section 86. A storage section 90 includes an item selection rule storage section 93 and an operation function storage section 94 in addition to the configuration in FIG. 4.

In the network album DB 8 of the album managing server 3 in the network album system 100 (FIG. 2), album information (attribute information of the requested image) regarding the album, picture information (attribute information of the requested image) of the photo included in the album, and the picture data itself are stored. The album and the photo are stored in such a manner that the album can be identified with the album ID, and the photo can be identified with the combination of the album ID and the picture ID.

The display data generating apparatus 2 can acquire the information via the communication section 63 if necessary, the information being stored in the network album DB 8.

Upon receiving the display data request message received from the television 1, the members of the request message analyzing section 70 perform the request message analyzing process (S4) illustrated in FIG. 5. Moreover, the members of the control script generating section 80 perform the control script generating process (S6) for generating the control script using the pattern data selected at S5 by the pattern data selecting section 61.

The configuration of the display data generating apparatus 2 is described below, discussing, by way of example, a case where the display data request message 6 (as illustrated in FIG. 7) for requesting the slide show display screen (display data) is received from the television 1.

In response to the display data request message 6 (FIG. 7), the display data generating apparatus 2 generates the display data 7 (FIG. 3). More specifically, the display data generating apparatus 2 generates the screen (operation menu specifying script 122) of the operation menu according to the content of the slide show display screen requested by the display data request message 6, and specifies how the television 1 behaves when the respective operation items are selected (i.e., the display data generating apparatus 2 generates the operation function definition script 132).

The display object ID acquiring section 71 of the request message analyzing section 70 has a function of acquiring the display object ID for identifying the display object (such as the album, picture, or the like) to be displayed, the display object ID being included in the display data request message. In the present embodiment, for example, the album ID and the picture ID included in the display data request message 6 are acquired by the display object ID acquiring section 71. By this, the display data generating apparatus 2 can find out which album and which picture the requested display screen is for.

The display screen ID acquiring section 72 has a function of acquiring the display screen ID for indicating the type of the display screen, the display screen ID being included in the display data request message. As described above, in the present embodiment, there are plural types of display screens that the display data generating apparatus 2 can provide to the television 1. Thus, the display data request message includes the display screen ID that indicates which type of display screen is requested by the television 1. By acquiring the display screen ID in the display data request message via the display screen ID acquiring section 72, the display data generating apparatus 2 can find out which display screen the requested display data is for.

The display data generating apparatus 2 may not include the display screen ID acquiring section 72, if there is only one type of the display screen to be generated.

The relevant information acquiring section 73 has a function of acquiring the relevant information of the television 1 that sends the display data request message, the relevant information included in the display data request message. In the example illustrated in FIG. 7, the relevant information acquiring section 73 acquires, from the display data request message 6, the terminal ID and specification information (pixel number of the display screen) of the television 1.

However, the relevant information is not limited to the example illustrated in FIG. 7. For example, as illustrated in the relevant information table of FIG. 8, the user information regarding the user of the television 1, other specification information (screen size, machine type, software version information or the like) of the television 1, or setting information of the setting of the television 1 may be included in the display data request message 6 so as to be acquired by the relevant information acquiring section 73. More specifically, the display data request message 6 illustrated in FIG. 7 includes the machine name of the television 1 and the version information of the software installed in the television 1 so that the television 1 can realize the photo application function, the machine name and the version information being stored in the relevant information table (FIG. 8). The relevant information acquiring section 73 can acquire, from the display data request message 6, the machine name and the software version information of the television 1 that requests the display data 7 by sending the display data request message 6. The various relevant information acquired by the relevant information acquiring section 73 is used as materials based on which determination is made in order to let the display data generating apparatus 2 generate most suitable display data (control script) for the request from the television 1.

In the present embodiment, the relevant information acquiring section 73 acquires the pixel number of the screen of the television 1 as the relevant information. By this, the display data generating apparatus 2 can generate most suitable display data (control script) considering the pixel number and size of the picture designated as the display object and the pixel number of the screen of the television 1.

As an alternative, in case where the user information includes information (age information) on the age of the user and availability of the display data is dependant on the age of the user, the display data generating apparatus 2 can select the control script and the display object to be included in the display data, referring to the age information acquired by the relevant information acquiring section 73. As an alternative, the display data generating apparatus 2 can perform such an operation as to generate display data including an error message instead of the requested display data, if the requested display data having an age restriction in its availability and the age of the user does not satisfy the age restriction.

The display data generating apparatus 2 may not include the relevant information acquiring section 73, if the relevant information is not used in generating display data.

As described above, the pattern data selecting section 61 selects, from the pattern data storage section 91, most suitable pattern data for generating the requested display data. In the present embodiment, the pattern data is selected based on the display screen ID acquired by the display screen ID acquiring section 72, the pattern data serving as a template of the display screen.

FIG. 19 is a view illustrating an example of the pattern data table stored in the pattern data storage section 91. In the example illustrated in FIG. 19, templates for the various display screens (single picture display screen, slide show display screen, thumbnail montage display screen, etc.) as described above are stored therein in association with the display screen ID.

In the example illustrated in FIG. 7, the display screen ID acquiring section 72 acquires the display screen ID "Scr_C" out of the display data request message 6. Thus, referring to the pattern data storage section 91 illustrated in FIG. 19, the pattern data selecting section 61 perform pattern data selection to select pattern data for generating the display data for the slide show display screen designated by the display data ID "Scr_C". The pattern data selected by the pattern data selecting section 61 is then combined with contents thereby completing the control script.

By using the pattern data generated by the pattern data selecting section 61, the control script generating section 80 generates the control script to be included in the requested display data.

The display object attribute determining section 81 of the control script generating section 80 has a function of determining the attribute of the display object designated by the display object ID acquiring section 71. The display object attribute determining section 81 acquires the attribute information (album information/picture information) of the album (picture) based on the album ID (picture ID) of the album (picture) from the network album DB 8 (FIG. 2) and determines the attribute of the album (picture).

For example, the display object attribute determining section 81 can determine whether or not the picture rotation function is necessary for the picture designated as the display object, whether or not the pixel number of the picture is smaller than the pixel number of the television 1, whether or not a comment is attached to the picture, whether or not the picture is with copyright lock, or the like criterion. These are merely examples not to limit the present invention. The display object attribute determining section 81 can determine on various attributes of the display object, based on the relevant information included in the display data request message received from the television 1, the album information of the designated album, and the picture information of the picture.

The image analyzing section 82 has a function of analyzing image data if the display object is image data (e.g., the picture in the album).

More specifically, the image analyzing section 82 analyzes color information of each pixel of the picture, thereby to specify color tone of the picture. As illustrated in FIGS. 11(*b*) and 11(*c*), the operation menu 1104 is displayed overlapping the picture. Here, it is preferable that the operation menu 1104 is in a color more eye-catching for the user than the color tone of the picture. Thus, the image analyzing section 82 specifies such a color tone of the picture that allows to choose more eye-catching color as the color of the operation menu, and the image analyzing section 82 notifies the operation menu generating section 85 of the color.

Moreover, the image analyzing section 82 may be arranged to perform the image recognizing process to locate a position at which a subject is positioned in the picture. The image analyzing section 82 then outputs the result of the process to the operation menu generating section 85. With this arrangement, the operation menu generating section 85 can choose the display position of the operation menu so that the operation menu will not overlap the subject of the picture.

FIG. 20 is a view illustrating an example of the album information table stored in the network album DB 8. In the example illustrated in FIG. 20, the album information is stored in a table structure in which the album information is stored in the record associated with the album ID per album.

The column of "album ID" indicates the album ID for identifying the albums. The display object attribute determining section 81 refers to the album ID in acquiring the album information of the album designated by the display object ID acquiring section 71.

The column of "name of album creator" indicates the album creator who created the album. The column of "title of album" indicates the title of the album. The column of "comment on album" shows comment attached to the album by the album creator. The column of "date of creation" indicates the date on which the album is created (the album is registered on the album managing server 3). The album basic information described above are recording and registered in the album managing server 3 via the PC 4 by the album creator U.

The column of "the number of pictures" indicates the number of pictures in the album. The column of "picture ID" indicates the picture ID for identifying the picture in the album. In the present embodiment, the picture ID indicates the order of display. For the slide show or for displaying plural pictures in thumbnail, the control script generating section 80 generates the layout definition script such that the pictures are displayed in the order of display. The column of "file name of picture" indicates the file name of the picture.

The columns of "sound file name" and the "effect ID" are described later.

FIG. 21 is a view illustrating an example of a picture information table stored in the network album DB 8. As one example of the picture information table, FIG. 21 illustrates a picture information table showing a list of pictures included in the album with album ID 0125478225142584 (FIG. 20). This is not only picture information table stored in the network album DB 8. That is, in the network album DB 8, the picture information table is provided to each album managed in the album information table FIG. 20.

The display object attribute determining section 81 and the image analyzing section 82 are so arranged that they look up the picture information table associated with the album, by referring to the album ID acquired by the display object ID acquiring section 71.

As illustrated in FIG. 21, the picture information table for managing the pictures of the album stores records for the respective pictures. In the picture information table, the picture IDs (order of display) for identifying the pictures in the album uniquely, "picture ID", "file name of picture", "horizontal pixel number", "vertical pixel number", "data size", "title of picture", "comment on picture", "rotation function", "copyright", and data of pictures are stored in such a manner that "file name of picture", "horizontal pixel number", "vertical pixel number", "data size", "title of picture", "comment on picture", "rotation function", "copyright", and data of pictures are in association with "picture ID".

The column of "horizontal pixel number" indicates the pixel number of the picture in the horizontal direction. The column of "vertical pixel number" indicates the pixel number of the picture in the vertical direction. The column of "data size" indicates the data size of the picture. The column of "picture title" indicates the title of the picture, which was given to the picture by the album creator. The column of "comment on picture" indicates comments registered for the picture by the album creator.

The column of "rotation function" indicates whether or not the rotation function is necessary for the picture. The "need" for the "rotation function" indicates that the picture labeled with the "need" should be rotatable. The "no need" for the "rotation function" indicates that the picture labeled with the "no need" does not need to be rotatable. The setting on whether the rotation function is needed or not needed may be done when the picture is uploaded to the album management server 3 by the album creator U. In uploading a picture that he does not want to rotate, the album creator U can set the rotation function as "no need".

Instead of the column of the "rotation function", a column of "upside (downside) direction" for indicating whether the picture is upside up or down. With this, the display object attribute determining section 81 can determine that the rotation function is not necessary if the actual upside direction of the picture matches with the "upside direction" of the picture.

The column of "copyright" indicates whether the picture is with or without copyright lock. If "yes" in "copyright", the picture is with copyright lock and prohibited from being printed or copied. If "no" in "copyright", the picture can be freely printed or copied.

The album information (FIG. 20) and the picture information (FIG. 21) are read out if necessary, in determining the attribute of the album (picture) by the display object attribute determining section 81, and in analyzing the picture by the image analyzing section 82.

As described above, the display object attribute determining section 81 determines, referring to the network album DB 8, the attribute of the album or picture designated as the display object data. Further, the image analyzing section 82 performs the image analysis of the pictures. Then, the display object attribute determining section 81 and the image analyzing section 82 outputs the results of the determination and the analysis to the operation item selecting section 83 and operation menu generating section 85.

Moreover, in the above explanation, the album information/picture information has the table structure having the records with plural columns. The present invention is not limited to this. The album (picture) information can have any structure as appropriate, provided that it contains information necessary to determine the attribute of the display object.

Moreover, in the above explanation, the display object attribute determining section 81 refers to the picture information "rotation function", in order to determine whether the rotation function is necessary for the picture or not. The present invention is not limited to this. For example, the image analyzing section 82 may use image analysis algorism to analyze whether the picture is upside up or down, and then determine whether the analyzed upside (downside) of the picture matches with the upside (downside) of the data of the actual picture. The display object attribute determining section 81 would determine that the rotation function is not necessary if the analyzed upside (downside) of the picture matched with the upside (downside) of the data of the actual picture.

The operation item selecting section 83 has a function of selecting the operation items to be included in the operation menu to be displayed on the display screen. Based on the determination result and analysis result of the display object attribute determining section 81 and the image analyzing section 82, the operation item selecting section 83 selects the operation items (functions of the television 1) to be included in the operation menu. By this, it is possible to complete the control script for displaying an operation menu most appropriate for the contents of the display data (display screen). Moreover, the control script can provide the television 1 with the various functions that are listed up on the operation menu.

Referring to the selection rule stored in the item selection rule storage section 93 and the determination result/analysis result, the operation item selecting section 83 selects an operation item to be added to the operation menu to make it appropriate for the display screen.

FIG. 22 is a view illustrating a rule table stored in the item selection rule storage section 93. Based on the rule table, the operation item selecting section 83 performs the selection of the operation item.

As illustrated in FIG. 22, the rule table lists up, in advance, various functions that are available to be provided to the television 1 according to the control script. The functions and various information thereof are stored in association with function IDs (column C1).

The "function" in column C2 indicates what the function to be provided to the television 1 is.

The "determination method" in column C3 indicates how the determination process is carried out for the display data request message. These determination processes are carried out by the display object attribute determining section 81 (or the image analyzing section 82, operation item selecting section 83, or the like). Based on the determination result, the operation item selecting section 83 determines whether to add the operation item of the function to the operation menu.

The "selection rule" in column C4 shows the rule which the operation item selecting section 83 refers to determine whether to add the operation item of the function to the operation menu (or sub operation menu), based on the determination result obtained via the determination method shown in column C3. Column C4 shows the "selected operation (then)" (in column C42) that the operation item selecting section 83 should perform in response to each "determination result (if)" in column C41.

As described above, referring to the "selection rule" in column C4 and depending on the determination result of the display object attribute determining section 81, the operation item selecting section 83 selects the operation item to be added.

For the functions (e.g., functions 5 to 7) that should be provided always for all display data commonly and do not need any determination, the information in columns C3 and C41 are not necessary. In the present embodiment, the selection rule sets that the functions 5 to 7 are "the operation menu always has" these functions.

The result of the selection performed by the operation item selecting section 83 (for example, the function ID for the function selected by the operation item selecting section 83). is forwarded to the operation function definition generating section 84 and the operation menu generating section 85.

Based on the function ID selected by the operation item selecting section 83, the operation function definition generating section 84 extracts, from the operation function storage section 94, the operation function definition script 132 (FIG. 3) for causing the television 1 to perform the function. Then, the operation function definition generating section 84 embeds the operation function definition script 132 (i.e., "contents") in the pattern data.

The operation menu generating section 85 has a function of generating the operation menu (operation menu specifying script 122 (FIG. 3)) including the operation items of the function, based on the function IDs selected by the operation item selecting section 83. More specifically, based on the function IDs, the operation menu generating section 85 extracts the names of the operation items (text data (content) indicating the operation items in the operation menu 1104 in FIG. 11(b)) from the operation function storage section 94, and then embeds the extracted name of the operation items in the pattern data.

In addition to the embedding the names of the operation items (content) in the pattern data, the operation menu generating section 85 works out and embeds, in the pattern data, display position, display size (x and y coordinates of the origin, width, height (content)) for displaying the operation items after the operation item selecting section 83 determines which operation items are to be added.

As described above, the operation menu generating section 85 may determine the display color or the display position of the display menu based on the analysis result of the image analysis section 82.

For example, the determination of the display color may be carried out in such a manner that a bluish color is selected if overall hue of the picture is reddish, or a blackish color is selected if hue in that part of picture which is to be overlapped with the operation menu is whitish.

FIG. 23 is a view illustrating an example of the function table stored in the operation function storage section 94. The function table stores the information of the content to be embedded in the pattern data.

As illustrated in FIG. 23, the function table lists up, in advance, the various functions available to be provided to the television 1 according to the control script. The functions and the information thereof are stored in association with the function ID. Unlike the rule table (FIG. 22), the information is stored in association with the sub operation items (such as functions 1-1, 1-2, etc.) of the sub operation menu.

The "name of operation item" in column C5 indicates the text data that indicates the operation items in the operation menu 1104 of FIG. 11(b). The operation menu generating section 85 completes the operation menu specifying script by embedding the text data (names of operation items) in column C5, and the display position and the display size of the operation items in the pattern data.

The "script" in column C6 indicates the operation function definition script for defining a certain process that the television 1 performs as a photo application function. As illustrated in FIG. 23, each function is provided with a script. The operation function definition generating section 84 completes the operation function definition script by embedding the scripts of column C6 in the pattern data, the operation function definition script collectively having the scripts provided for the respective functions.

In FIG. 23, the script is written in text in column C6 for the sake of easy explanation. Actually, the information to be extracted from column C6 and embedded in the pattern data by the operation menu generating section 85 is text data written in XML as illustrated in the script 132b of FIG. 12.

Note that the present invention is not limited to the function table illustrated in FIG. 23, which is merely an example discussed here for easy explanation. The display data generating apparatus 2 can provide the television 1 with, apart from the function illustrated in FIG. 23, any other functions (second function) that the television 1 carries out while the television 1 is performing the display operation (first function).

FIG. 24 is a view illustrating a specific example of the pattern data. In FIG. 24, the operation menu specifying script 122 generated by the operation menu generating section 85 is illustrated among the pattern data of the display screen ID "Scr_C". The script 240 is a template of the script for specifying the operation menu. The script 250 is a template of the script for specifying the sub operation menu.

In FIG. 24, the part in which the operation menu generating section 85 will insert the content is denoted by "@@_***_@@". More specifically, a replacement position 241 is for name of operation items. Replacement positions 242 are for display positions (x and y coordinates of the origin) of the operation items. Replacement positions of 243 and 244 are for the display sizes (width and height) of the operation menus.

By embedding in all the replacement positions the actual values specified by the operation function definition generating section 84, the operation menu specifying script 122 (FIG. 13) of the control script is completed.

FIGS. 25 and 26 are views illustrating specific examples of the operation function definition scripts generated by the operation function definition generating section 84. The operation function definition generating section 84 acquires specific script(s) from the function table (column C6) of the operation function storage section 94 according to the selection result of the operation item selecting section 83, and completes the operation function definition script for each function. FIG. 25 illustrates a specific example of an operation function definition script that defines the "rotation function". According to the operation function definition script of FIG. 25, the display of the picture is stopped when the rotation of the picture is carried out according to the script 132b of FIG. 12. Then, a rotation position is calculated out (a variable "rotaneno" is calculated out). Based on the calculated rotation position, the rotated picture is displayed (script 132d of FIG. 12) thereby realizing the rotation function of the picture. FIG. 26 illustrates a specific example of an operation function definition script that defines the "comment display function". The operation function definition generating section 84 completes one operation function definition script in by embedding scripts of functions in the pattern.

The script combining section 86 has a function of generating a control script by combining, to one, various scripts (e.g., operation menu specifying script 122 (FIG. 13) and operation function definition script 132 (FIG. 12) etc.) generated by various members of the control script generating section 80. The control script generated by the script combining section 86 contains scripts for providing the television 1 with an appropriate function according to contents of the display data requested by the display data request message.

The present invention is not limited to the examples above, which explain the cases where the various members of the control script generating section 80 generates the operation menu specifying script 122 and operation function definition script 132 by using the pattern data. Not-illustrated various members of the control script generating section 80 embed appropriate contents in a pattern data selected by the pattern data selecting section 61, thereby completing the display object specifying script 121, attribute information specifying script 123, and state shift definition script 131, and supply such scripts to the script combining section 86.

The control script generated by the script combining section 86 is supplied to the display data generating section 62. The display data generating section 62 generates the display data by combining the control script acquired from the script combining section 86, and the display object. Then, the display data generating section 62 provides the display data via the communication section 63b to the television 1 that requests the display data.

Examples the display objects specifically acquired by the display data generating section 62 include album information, picture information, and picture, which are stored in the network album DB 8, and other images (images commonly used in each display screen such as images of operation buttons etc. stored in the display object storage section 92), and the like.

By this, the television 1, which received the display data, can display the requested display screen (e.g., slide show display screen) and perform a certain photo application according to the control script of the display data while performing the display of the display screen. The display data generating apparatus 2 can provide the television 1 with a control script that is appropriately altered according to the contents of the requested display data. With this arrangement, it is possible to easily alter the function of the television 1 according to the contents of the display data to be displayed.

Moreover, it is desirable that if a new photo application function is added to the service of the network album system 100, the new function can be added to the television 1 that has been shipped to the market. With the display data generating apparatus 2 of the present invention, such a new function can be added to the television 1 by generating a new control script and providing the new control script to the television 1. For example, it is possible to provide the slide show with a function of adding an effect (such as fading-in) to a picture, by describing the function of the effect in the control script and adding an operation item for the function to the operation menu specifying script.

Figure 27:
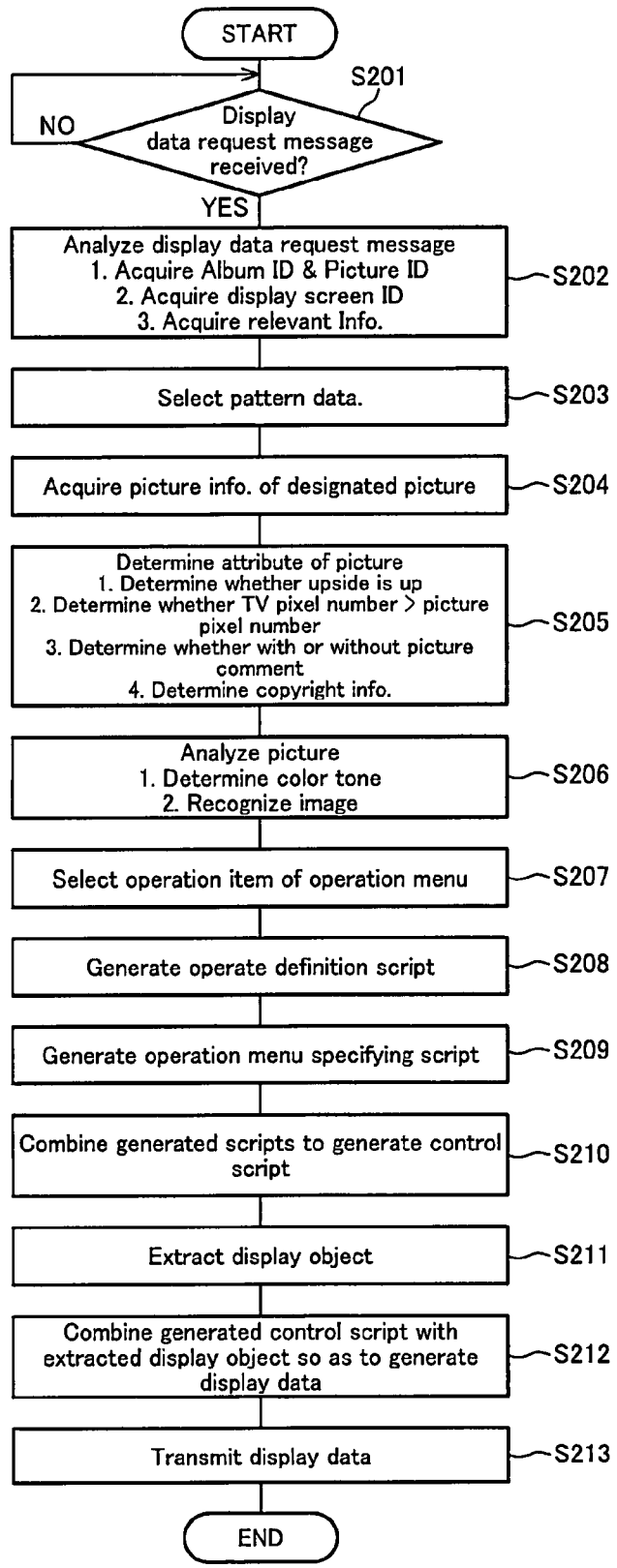
FIG. 27 is a flow chart illustrating details of a flow of a display data generating process performed by the display data generating apparatus.

FIG. 27 is a flow chart illustrating the details of the flow of the processes (S3 to S8 in FIG. 5) for generating the display data in the display data generating apparatus 2.

If the receiving section 63a receives the display data request message (FIG. 7) from the television 1 (Yes at S201), then the request message analyzing section 70 analyzes the received display data request message (S202). More specifically, the display object ID acquiring section 71 acquires the album ID and the picture ID. The display screen ID acquiring section 72 acquires the display screen ID. The relevant information acquiring section 73 acquires the specification information (pixel number of the screen).

Next, based on the display screen ID, the pattern data selecting section 61 selects, the pattern data most appropriate for the requested display data, from the pattern data table of the pattern data storage section 91 (S203). Here, by way of example, it is assumed that the pattern data for generating the slide show display screen display data is selected.

Using the selected pattern data, the control script generating section 80 generates the control script to be included in the display data. Referring to the album ID and the picture ID, the control script generating section 80 finds the picture among from the display objects stored in the network album DB 8.

The display object attribute determining section 81 acquires the picture information (FIG. 21) of the designated picture from the network album DB 8 (S204).

Next, the display object attribute determining section 81 determines the attribute of the picture based on the picture information thus acquired and the specification information included in the display data request message (S 205). More specifically, the display object attribute determining section 81 determines the attribute of the picture as follows.

(1) Determine whether the upside of the picture is correctly up.

From the picture information table of FIG. 21, the display object attribute determining section 81 determines whether the upside of the picture is correctly up (it is necessary to have the rotation function or not), based on the "upside/downside direction" (or rotation function) of the designated picture.

(2) Compare the pixel number of the screen of the television 1 and the pixel number of the picture.

The display object attribute determining section 81 compares the screen pixel number (R5) of the television 1 illustrated in FIG. 7 with the pixel number of the picture worked out from the "horizontal pixel number" and "vertical pixel number", thereby determining whether the pixel number of the picture is smaller than the pixel number of the screen.

(3) Determine whether comments is attached to the picture.

The display object attribute determining section 81 determines whether a comment is stored in the "comment on picture" illustrated in FIG. 21.

(4) Determine whether the picture is copyrighted or not.

Based on the "copyright information" illustrated in FIG. 21, the display object attribute determining section 81 determines whether the picture is with or without copyright lock.

Next, the image analyzing section 82 acquires the designated picture from the network album DB, and analyzes the picture (S206). More specifically, the image analyzing section 82 finds out the color tone of the picture and the display position of the subject.

Based on the determination result of the display object attribute determining section 81, the operation item selecting section 83 selects the operation items to be displayed on the operation menu (i.e., the functions to be provided to the television 1) (S207).

If the designated picture is upside down incorrectly the operation item selecting section 83 determines to add the operation item and sub operation items of the rotation function to the operation menu in accordance with the selection rule (column C4). It can be arranged such that the rotation function is provided to the television 1 only if the rotation function is necessary.

Moreover, if it is determined that the pixel number of the screen of the television 1 is smaller than the pixel number of the picture, the operation item selecting section 83 adds the operation item of the screen size switching function (to enlarge the picture and display the picture in the full screen size of the television 1) to the operation menu. It can be arranged such that only if the size of the picture is smaller than the screen size of the television 1, a zoom-in function can be provided to the television 1.

If it is determined that a comment is attached to the picture, the operation item selecting section 83 adds the operation item of the comment display function to the operation menu. If it is determined that the picture is without the copyright lock, the operation item selecting section 83 adds the operation item of the printing function to the operation menu. In this way, it is possible to control the television 1 not to be able to print out the picture being displayed on the picture screen, if the picture is with the copyright lock.

The operation item selecting section 83 may be arranged such that the operation item selecting section 83 selects an operation item based on the contents of the relevant information acquired by the relevant information acquiring section 73. For example, assume that setting information (for setting whether the operation guide screen 1103 as illustrated in FIG. 11(*a*) is always displayed or not (i.e., "operation guide display" in FIG. 8)) is included, as the relevant information, in the display data request message as the relevant information.

The operation item selecting section 83 determines based on the contents of the setting information "operation guide display". If it is set as turning "off" the guide method display, then it is determined not to added the operation item of the operation guide display function to the operation menu (or the operation item of the operation guide display function is added as the sub operation item of the operation item "other"). On the other hand, if it is set as turning "on" the guide method display, then it is determined to add the operation item of the operation guide display function to the operation menu.

By this, it is possible to provide the television 1 with the operation guide method function only if the television 1 requesting the display data is set as "displaying the operation guide screen".

At S207, the operation item selecting section 83 selects, according to the item selection rule storage section 93, the selected item (function) to be included in the operation menu. Then, the operation item selecting section 83 supplies the function ID of the selected function to the operation function definition generating section 84 and the operation menu generating section 85.

Next, the operation function definition generating section 84 extracts the script (operation function definition script) of column C6 from the function table (FIG. 23) of the operation function storage section 94 referring to the function ID, and embeds the extracted script in the pattern data thereby to generate the operation function definition script (S208). The operation menu generating section 85 extracts the operation item name in the column C5 referring to the function ID, and embeds the extracted operation item name in the pattern data, thereby to generate the operation menu specifying script (S209). In generating the operation menu specifying script, the display size, display position, display color, etc. of the operation menu are worked out and the results thereof are embedded in the pattern data.

The script combining section 86 generates the control script by combining various scripts generated by the various members of the control script generating section 80 (S210).

The display data generating section 62 finds out all the necessary display objects and extracts from the necessary display objects from the network album DB 8 and/or the display object storage section 92 (S211), and combines the necessary display objects with the control script(s) thus generated, thereby to generate the display data (S212).

In response to the display data request message of the television 1, the transmitting section 63*b* transmits the display data generated by the display data generating section 62 (S213).

Even though the flow chart of FIG. 27 discusses the generation of the slide show display screen of one picture in the slide show of the album, the generation of the slide show display screen of all the pictures in the album may be carried out by repeating S204 to S212 for each picture.

With this configuration and method, the display data generating apparatus 2 generates a screen of the operation menu most appropriate for the display data requested by the television 1, and provides the television 1 with the functions of the operation items of the operation menu together with the data of the screen of the operation menu. The television 1, which receives the display data, can displays the display screen (e.g., the slide show display screen) that the television 1 requested, and can perform a certain photo application function according to the control script of the display data.

That is, the operation items of the display menu to be displayed can be selected per display data to be displayed on the television 1, thereby customizing the television 1 as to the available functions thereof.

As described above, it is possible to alter the function of the television 1 easily by providing the television 1 with an altered control script.

The alternation in the operation menu may be an increase or a decrease in the operation items of the operation menu, providing a sub operation menu to a certain operation item or not, changing the number of the sub operation items of a certain operation item, changing the name of the operation item as necessary, changing the display position or display color of the operation menu, or the other alternation.

By following the control script, the television 1 can alter the operation menu dynamically to be suitable for its operation.

For example, the operation menu control section 142 (FIG. 9) may be arranged such that the name of the operation item ("start/stop auto frame advance" in the example illustrated in FIG. 11(*c*)) of the operation item 1110 of the auto frame advance illustrated in FIG. 11(*c*) is altered dynamically to be suitable for the operation of the slide show execution control section 141.

It is arranged that the control script includes two kinds of text data for the operation item to be displayed in the part of the operation item 1110 for the frame advance control. One is an operation item "start auto frame advance" for the function of starting the auto frame advance and the other is operation item "stop auto frame advance" for the function of stopping the auto frame advance.

Furthermore, it is arranged that the control script includes a script for defining that the operation item "stop auto frame advance" is displayed in the region of the operation item 1110 while the television 1 is performing the auto slideshow reproduction, and a script for defining that the operation item "start auto frame advance" is displayed in the region of the operation item 1110 while the television 1 is not performing the auto slideshow reproduction.

Figure 28:
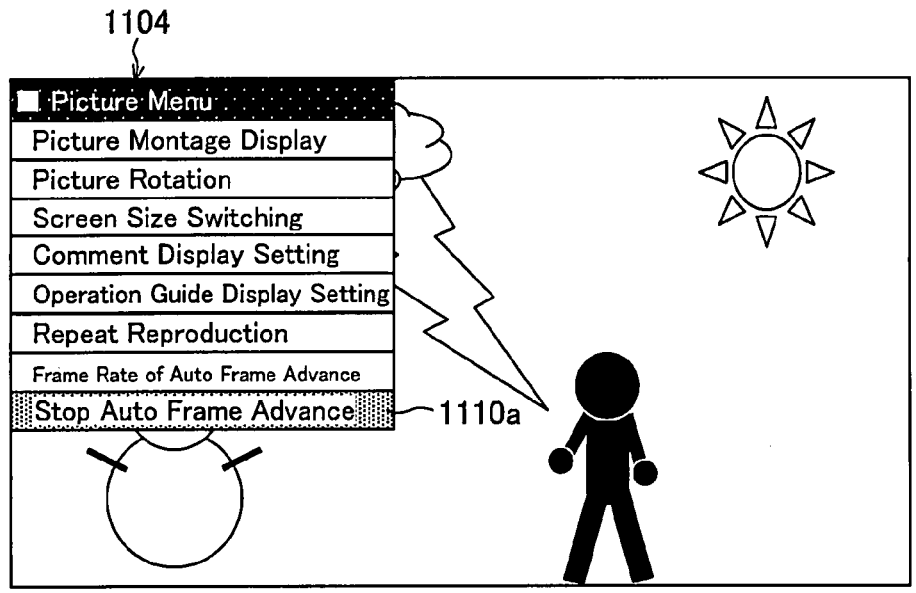
FIGS. 28(a) and 28(b) are views illustrating examples of display of the operation menus in which name of the operation item is changed.
Figure 28:
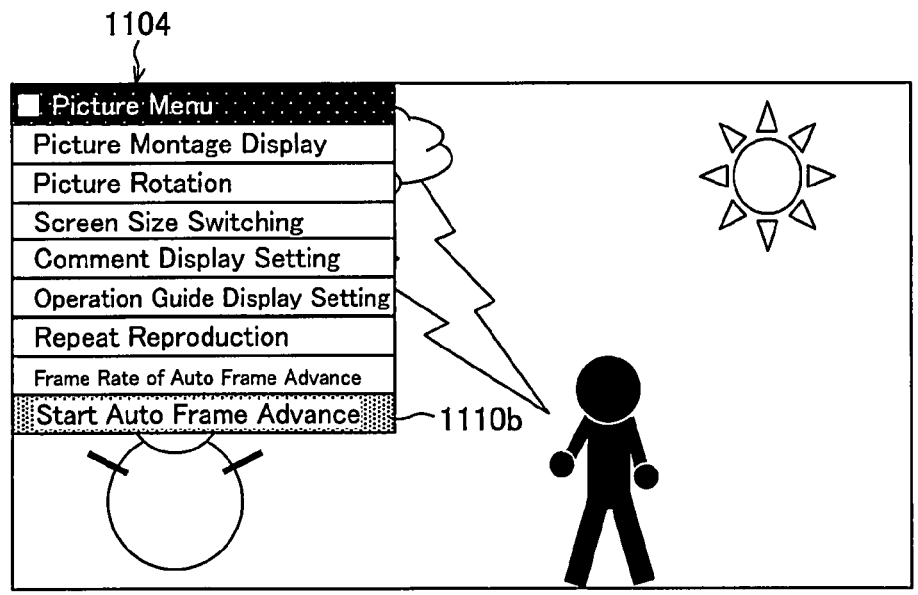

By this, the operation menu control section 142 performs display of the operation menu 1104 including the operation item 1110a "stop auto frame advance", as illustrated in FIG. 28(a), when the enter button is pressed (the operation menu 1104 is called) while the slide show execution control section 141 is performing the slide show auto reproduction. On the other hand, the operation menu control section 142 performs display of the operation menu 1104 including the operation item 1110b "start auto frame advance", as illustrated in FIG. 28(b), when the enter button is pressed while the slide show execution control section 141 is not performing the slide show auto reproduction. As such, the television 1 can alter the display of the operation menu 1104 dynamically by following the control script.

As an alternative, it is possible to control how display (such as auto frame advance icon 1101, picture title 1102, and operation guide screen 1103 in FIG. 11(a)) other than the display of the operation menu is performed. More specifically, in addition to the script for defining the function of stopping the auto reproduction of the slide show of the pictures included in the album, the control script may includes a script for instructing to change (a) the auto frame advance icon 1101 for indicating the auto reproduction is being performed to (b) the auto frame advance stop icon 1109 for indicating the auto reproduction is being stop.

Furthermore, the function of the television 1 can be easily altered by changing the control script in terms of the description that defines how the television 1 should behave when a certain event is detected. For example, the photo rotation function may be altered to have a sub operation function for rotating the picture 180° not by 90°. Moreover, a duration of displaying one picture in the automatic slide show may be changed arbitrarily by using the control script.

Modification Example 1

To Alter Order of Display of Operation Items

The operation menu generating section 85 of the display data generating apparatus 2 may generate the operation menu specifying script for displaying the operation menu, such that the operation menu is so specified that the order of the display of the operation items is determined according to a certain condition so as to display the operation items in the order.

For example, the order of the display of the operation items may be determined considering how frequently the user uses the functions.

The television 1 transmits menu usage information to the display data generating apparatus 2 every time a function provided to the television 1 from the display data generating apparatus 2 is used, the menu usage information notifying that the function is used in the television 1. The menu usage information includes the function ID for identifying the used function. In addition to the function ID, the menu usage information may include the terminal ID of the television 1, user information, date/time information to show when the function was used, or the other information.

The display data generating apparatus 2 includes a column for storing the usage frequency of each function in the function table as illustrated in FIG. 23.

If the display data generating apparatus 2 receives the menu usage information from the television 1, then the request message analyzing section 70 acquires the function ID from the received menu usage information, thereby finding out which function was used by the television 1. A function usage frequency managing section (not illustrated) of the control section 60 adds 1 to a count in the usage frequency of the function in the function table of the operation function storage section 94. In this way, the usage frequency for each function (operation item) is recorded.

When the operation menu generating section 85 generates the operation menu specifying script, the operation menu generating section 85 reads out, from the operation function storage section 94, the usage frequency of each operation item selected by the operation item selection section 83. The operation menu generating section 85 can generate the operation menu specifying script such that the operation items will be displayed in the descending order of their usage frequencies.

Figure 29:
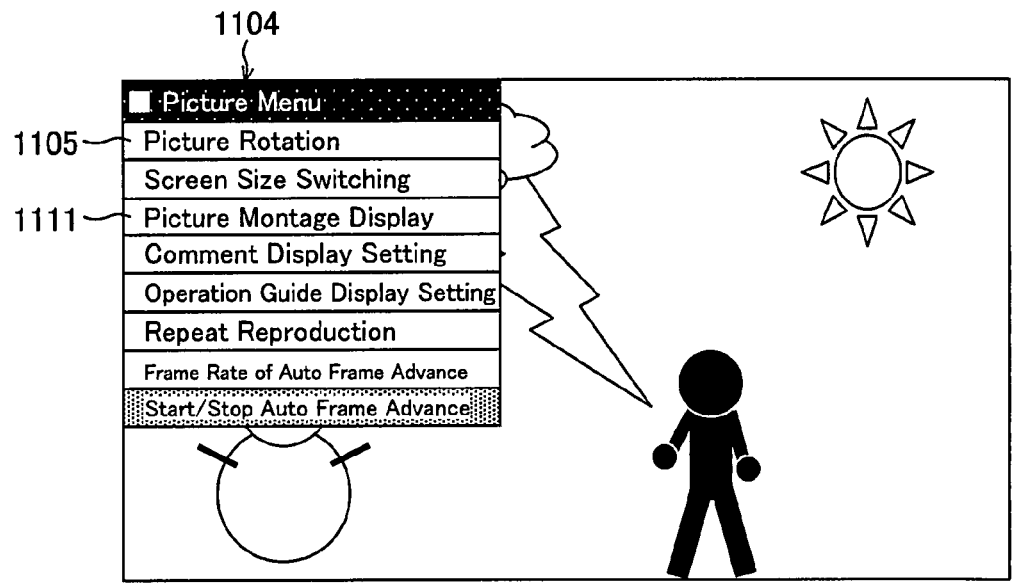
FIGS. 29(a) and 29(b) are views illustrating examples of display of the operation menu before and after the change in an order of display of the operation items.
Figure 29:
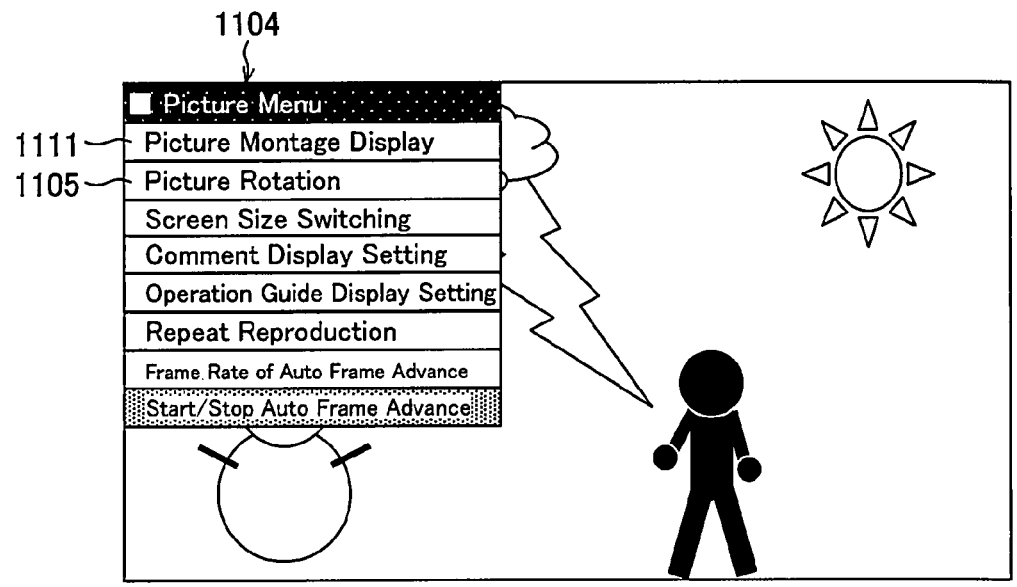

FIGS. 29(a) and 29(b) are views illustrating example of displays of the operation menu before and after the alternation in the order of display of the operation items. Assume that according to the control script, the television 1 has been displayed the operation menu 1104 in such a order of display that the operation item 1105 "Picture Rotation" is the top of the order, as illustrated in FIG. 29(a). Here, the operation item 1111 "Picture Montage Display" is displayed in the third of the order.

After that, the television 1 requests the display data generating apparatus 2 for the slide show display screen display data. The display data generating apparatus 2 determines the order of display of the displayed items according to the usage frequency of each function at the time, and generates a new control script. Let the function of "Photo Montage Display" be the function most frequently used by the user. The operation menu generating section 85 of the display data generating apparatus 2 generates the operation menu specifying script so that the operation item 1111 "Photo Montage Display" will be the top in the order of the display.

According to the new control script containing the operation menu specifying script, the television 1 displays the operation menu 1104 so that the operation item 1111 "Photo Montage Display" is the top of the operation menu 1104, as illustrated in FIG. 29(b).

As described above, it is possible to alter the design of the operation menu dynamically according to the function usage frequency of the user so that more frequently used operation items are positioned at positions easy to select (e.g., upper positions in the list). With this, it is possible to provide the user always with an operation menu in which frequently used function are easy to select.

As an alternative, the display data generating apparatus 2 may record, for each picture of the album, a frequency of viewing the picture in response to the request from the television 1 of the user. With this, it is possible to generate a control script so that a frequently-viewed popular picture is displayed distinctly, for example, with decoration or marking.

Modification Example 2

Focus Movement

By using the control script, the operation menu control section 142 (FIG. 9) of the television 1 can be operated as follows.

More specifically, following the control script, the operation menu control section 142 determines a focus position based on the setting information of the television 1 or operation state of the operation menu control section 142. Then, the operation menu control section 142 moves the cursor to the focus position thus determined, and displays the focused operation item in a color that distinguishes the focused operation item from the other (focus display operation).

FIG. 30 is a view illustrating a specific example of the control script for performing the focus display operation by the television 1. As illustrated in FIG. 30, the control script defines the display of the (sub) operation menu to be so performed as to (1) read the setting information, (2) read operation of the slide show execution control section 141, (3) move the cursor to the (sub) operation item that matches with the reading results, and (4) change the display color of the (sub) operation item with the cursor.

The television 1 performs the operations (1) to (4) according to the control script.

This is described in more details, assuming that such a focus display operation to focus a sub operation menu after the main operation item is selected. Firstly, the operation menu control section 142 of the display data execution processing section 40 reads the setting information according to the control script of FIG. 30. The setting information is the setting information (column group C12) in the relevant information table stored in the relevant information storage section 52 as illustrated in FIG. 8. In the example illustrated in FIG. 8, the operation menu control section 142 reads the following values out of the relevant information storage section 52: "Comment Display"="on", "Operation Guide Display Setting"="on", "Repeat Reproduction"="off", "Frame Rate"="10 sec".

Next, the operation menu control section 142 reads out the operation state of the slide show execution control section 141 so as to determine whether the slide show is being reproduced automatically or being stopped. Assume that the slide show is being reproduced.

Next, referring to the operation menu specifying script, the operation menu control section 142 finds out the (sub) operation menu to be displayed on the display section 15. Then, the operation menu control section 142 determines the operation item that matches with the contents of the reading and moves the cursor to the operation item.

The operation menu control section 142 displays the operation menu in which the operation item with the cursor is changed in the display color.

FIGS. 31 (*a*) to (*e*) are views illustrating examples of the sub operation menu focused by the focus display performed by the television 1 following to the control script.

FIG. 31(*a*) illustrates an example in which the sub operation menus of the operation item "comment display setting" are displayed. In the example discussed above, the operation menu control section 142 reads out the value "Comment Display"="On". Thus, the focus position is determined to be at the sub operation item "Display Comment". Then, the sub operation menu is displayed with the focus position.

FIG. 31(*b*) is illustrates an example in which the sub operation menus of the operation item "Operation Guide Display Setting" are displayed. In the above example, the operation menu control section 142 reads out the value "Operation Guide Display Setting"="on". Thus, the focus position is determined to be at the sub operation item "Display Operation Guide". Then, the sub operation menu is displayed with the focus position.

FIG. 31(*c*) is illustrates an example in which the sub operation menus of the operation item "Repeat Reproduction" are displayed. In the above example, the operation menu control section 142 reads out the value "Repeat Reproduction"="off". Thus, the focus position is determined to be at the sub operation item "Do Not Repeat Reproduction". Then, the sub operation menu is displayed with the focus position.

FIG. 31(*d*) is illustrates an example in which the sub operation menus of the operation item "Frame Rate of Auto Frame Advance" are displayed. In the above example, the operation menu control section 142 reads out the value "Frame Rate of Auto Frame Advance"="10 sec". Thus, the focus position is determined to be at the sub operation item "10 sec Frame Rate". Then, the sub operation menu is displayed with the focus position.

FIG. 31(*e*) is illustrates an example in which the sub operation menus of the operation item "Start/Stop Auto Frame Advance" are displayed. In the above example, the operation menu control section 142 determines that "the slide show execution control section 141 is automatically reproducing the slide show". Thus, the focus position is determined to be at the sub operation item "Start Auto Frame Advance". Then, the sub operation menu is displayed with the focus position.

As described above, by providing the control script, the television 1 can display the operation menu focusing a certain operation item that matches with the contents of the setting information or operation state of the television 1.

Embodiment 2

[Background Art and Object]

For conventional image display apparatus for displaying large-data sized digital image data, image formation process for writing an image in an image buffer such as VRAM and displaying the image on a display section is a process requiring much work load. It has been desired to be able to carry out such image formation process at a high speed.

To attain a high-speed image formation process, the hardware resources and its system have been improved or a data amount has been reduced to reduce the load on the image formation process.

For example, Known Document 2 (Japanese Patent Application publication, Tokukaihei, No. 6-149533 (published on May 27, 1994)) discloses a graphic display apparatus and a high speed image formation method using a segment image formation method having double buffers. In the segment image formation system, a process to be carried out in one of the buffers that deals with a segment out of a display region is omitted thereby attaining high-speed image formation.

In the apparatus of Known Document 2, partial change in the data requires rewriting of the whole data (for the full screen). It is a problem that the rewriting process is unnecessarily carried out for a portion other than a portion that requires the rewriting.

In view of this, Known Document 3 (Japanese Patent Application publication, Tokukaihei, No. 11-65813 (published on Mar. 9, 1999)) discloses an image formation apparatus that enables partial alternation of data, thereby preventing delay in the image formation process.

The apparatus of Known Document 3 is arranged such that an application embedded in the apparatus works out an image data reformation region that requires rewriting. Thus, the process of working out the image data reformation region by the apparatus cannot be dynamically altered according to the contents of data (display data). Thus, the image data reformation region is worked out by a fixed process regardless of the data to be rewritten. Thus, for some kinds of data, the image data reformation region would include a region that a data providing party does not intend to be included therein. This would cause unnecessary rewriting process.

Furthermore, if another information (especially, a complicate-shaped object) that does not need alternation was partially included in the image data reformation region unintentionally, the portion of the another information included in the image data reformation region should be clipped (clipping process). It is a problem that the clipping process would put more load on the apparatus as the object that is partially included in the image data reformation region has a more complicated shape.

Moreover, the image display apparatus such as televisions and portable telephones are generally restricted in hardware resource designing (restriction in production cost, apparatus size, etc.). It is not realistic to improve the resource to attain high-speed image data formation process without considering the restrictions. Especially for image display apparatuses such as televisions, whose memory region is extremely restricted, it is desired to realize more efficient image data reformation process.

Therefore, in the present embodiment, a display data control script defines an image data reformation region most appropriate for display data (display screen) to be displayed by a television 1 (FIGS. 1, 6, and 9), considering on contents of the display data. The most appropriate image data reformation region is such an image data reformation region that does not require a complicate process and is as small as the need permits. The television 1 can define the image data reformation region most appropriate for the contents of the display data by referring to the control script, thereby to perform efficient image data reformation process. The "considering the contents of the display data" may be, but not limited to, to consider which object on the display screen can be changed, or to consider which object has a fixed display position or is movable.

In the following, the television 1 and the display data generating apparatus 2 (network album system 100), which can define the most appropriate image data reformation region and efficiently perform the image data reformation process.

[Control Script (Image Data Formation Control Script)]

FIG. 32 is a view illustrating a specific example of a control script included in the display data (FIG. 3) of the present embodiment. In the control script of FIG. 32, a layout definition script 112 and an operation content definition script 113 are included by way of example. The layout definition script 112 defines display of three figures, circle, cloud, and balloon. The operation content definition script 113 defines that the circle being displayed should be altered in radius from 50 to 100 when a certain signal (e.g., 'a') is inputted via an operational section 13.

In the layout definition script 112, the definitions of the three figures are enclosed between tags ("<" and "/>") (script 112*a*). The image data or the text data (or audio/image data) to be displayed on the display screen is defined by using a pair of tags. In the following explanation, the definitions enclosed with tags are referred to as objects regardless of their data formats.

Figure 33:
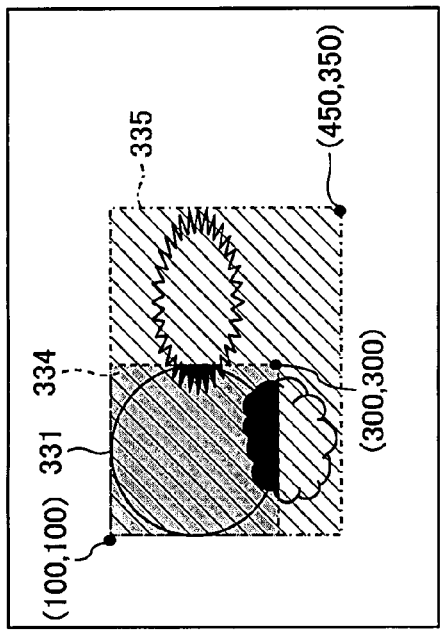
FIG. 33 (a) is a view illustrating a specific example of a display screen displayed on a display section of the television according to the control script, the display screen including an object before a change.
Figure 33:
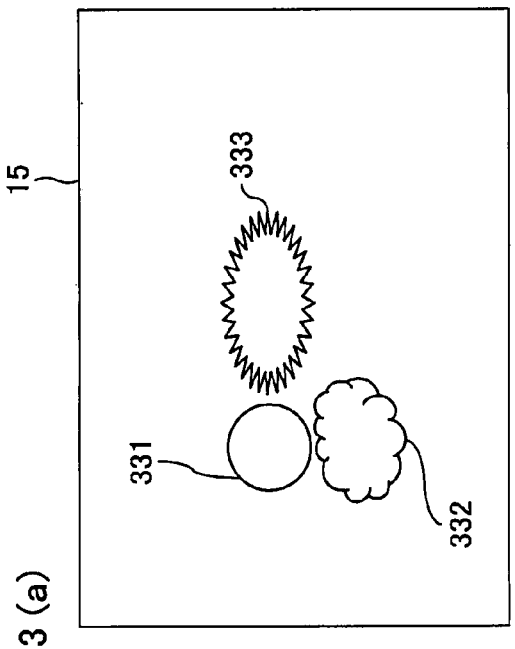
Figure 33:
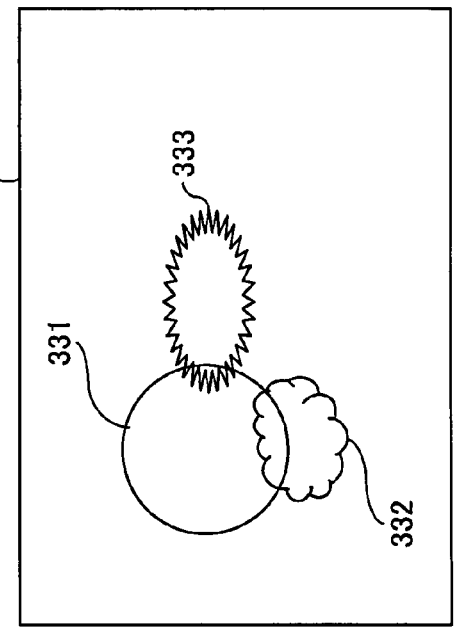

The television 1 can display the three objects (circle 331, cloud 332, balloon 333) on the display section 15 according to the layout definition script 112, as illustrated in FIG. 33(*a*).

In the following, an image data reformation control script is explained. The image data reformation control script allows the television 1 of the present embodiment to define the most appropriate image data reformation region for efficient image data formation process.

The image data reformation control script constitutes a part of the control script, and includes an image data reformation region definition script 112*b* and an image data reformation region changing script 113*b*.

By the image data reformation region definition script 112*b*, the region to be rewritten is defined as a rectangular shape by being specified in the origin of the region (x and y coordinates) and width and height of the region. The object of the image data reformation region is an object for allowing the television 1 to define the image data reformation region. Thus, the object is not intended to be visible to the user. Thus, as illustrated in FIG. 33(*a*), the rectangular shape of the image data reformation region is not displayed on the display section 15 (because the color of the object is not set (it is set as "none"), the object is not visible to the user regardless of whether "visibility" is set as "visible" or "hidden").

The image data reformation region changing script 113*b* defines a changing process for acquiring the definition of the image data reformation region defined by the image data reformation region definition script and performing alternation in the image data reformation region. In the example illustrated in FIG. 32, the image data reformation region changing script 113*b* defines that the setting should be changed from "hidden" to "visible" when the signal 'a' is inputted (changing function "setTrait ("visibility", 'visible');). By defining the changing process in the image data reformation region changing script 113*b* as such, it is possible to allow the television 1 to determine, at an appropriate timing, the necessity of the rewriting in the image data reformation region defined in the image data reformation region definition script 112*b*.

FIG. 33(*b*) is a view illustrating a display example illustrating an example of display on the display section 15 after the changing process is performed by the television 1 according to the operation content definition script 113 when the signal 'a' is inputted by pressing a certain button of the operational section 13. As defined the operation content definition script 113, the circle 331 is displayed with a radius changed from 50 to 100.

Assume the rewriting control script is not described in the control script. In this case, if the object (circle 331) is to be changed, the television 1 specifies the image data reformation region as a rectangular shape (broken-line framed half-tone region 334 in FIG. 33(*c*)) circumscribing the object to be changed. Then, if another object (cloud 332 or balloon 333) is included in the image data reformation region partially, the clipping process (to clip the part of the another object which is included in the image data reformation region) is carried out. To work out the clipping region (the black-out portion in FIG. 33(*c*)) will put more load on the television 1, as the shape of the object is more complicated.

In the present embodiment, the television 1 specified the image data reformation region as the rectangular region (dashed line-framed hatched region 335 in FIG. 33(*c*)) when the circle 331 is to be changed. Thus, the image data reformation region includes the whole area of the another object (cloud 332 and balloon 333) (or does not include the another object at all). Thus, no clipping treatment is necessary. As a result, it becomes possible for the television 1 to perform the image data reformation process more efficiently.

As described above, it is desirable that the image data reformation region of the image data reformation region definition script do not partially include the object, so that the clipping process for the object will not be necessary.

The display data generating apparatus 2 for generating the display data (including control script and display object) defines the image data reformation regions for all the objects described (figure, picture, operation menu, text data, etc.) in the control script, in such a manner that the image data reformation regions include all the area of an object or does not include the object at all (not to include the object partially). The display data generating apparatus 2 generates the image data reformation region specifying script with such definition of the image data reformation region. That is, the display data generating apparatus 2 works out the most appropriate image data reformation region with work load as small as the need permits in consideration of the contents (position of the objects) of the display screen (display data) requested by the television 1, and provides the television 1 with the control script for specifying the image data reformation region.

In the following, more details of the configuration of the television 1 for performing the image data reformation according to the image data reformation control script.

[Configuration 2 of Television—Details]

Figure 34:
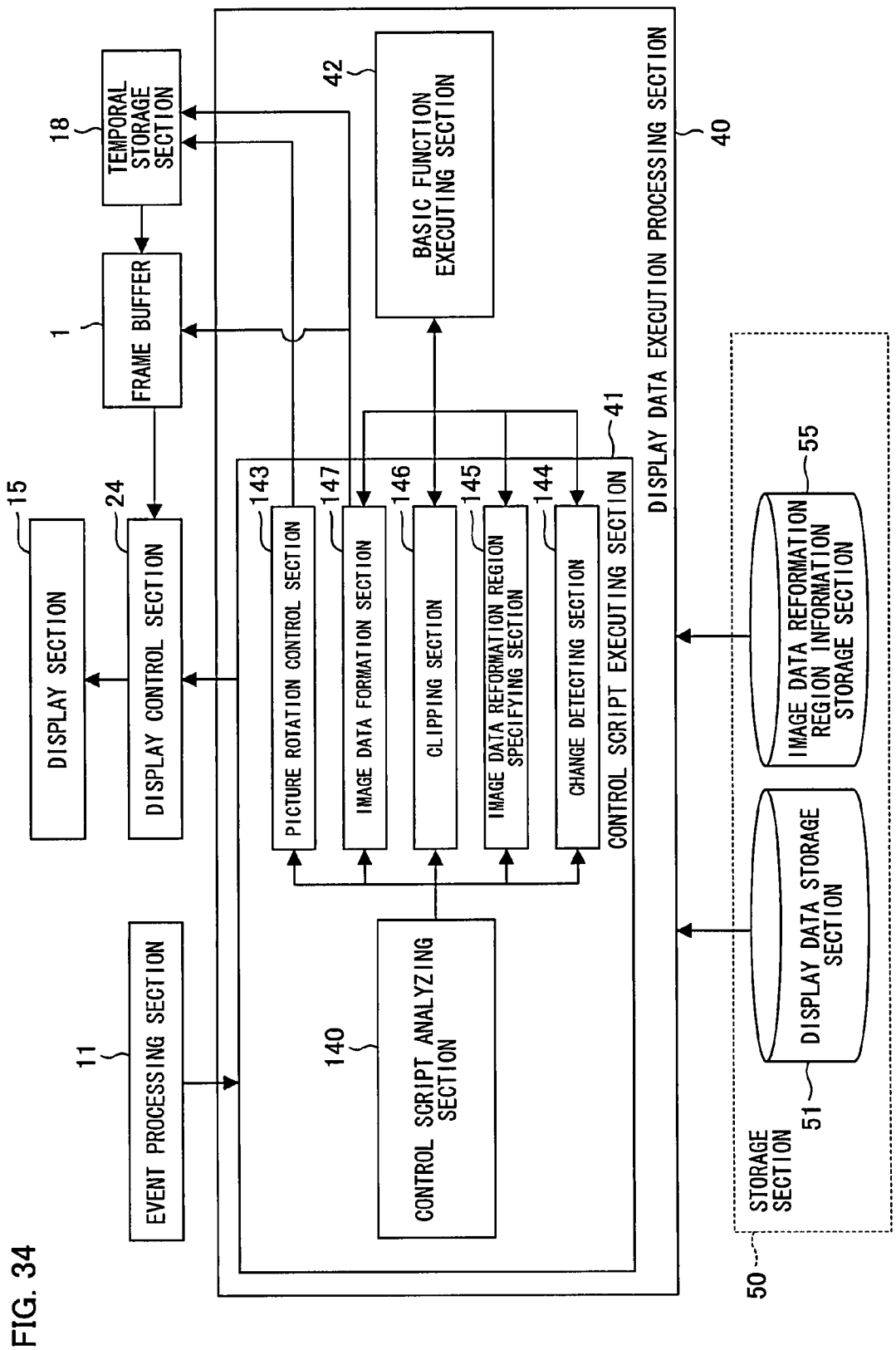
FIG. 34 is a block diagram illustrating main part of a configuration of a television according to another embodiment of the present invention.

FIG. 34 is a block diagram illustrating main part of the configuration of the television 1 according to the present embodiment. Like FIG. 9 for Embodiment 1, FIG. 34 is a view illustrating a display data execution processing section 40 of the television 1 illustrated in FIG. 1.

The television 1 illustrated in FIG. 34 is different from the one illustrated in FIG. 9 in that the control script executing section 41 includes a change detecting section 144, an image data reformation region specifying section 145, a clipping section 146, and an image data formation section 147, in addition to a control script analyzing section 140, and a picture rotation control section 143, and that a storage section includes an image data reformation region information storage section 55.

Even if it is not illustrated here, the control script executing section 41 may includes a slide show execution control section 141 and an operation menu control section 142 as described above.

Moreover, the television 1 includes, as described above, a temporal storage section 18 and a frame buffer 19, each of which is provided by using a volatile storage such as a RAM.

The temporal storage section 18 has a function of temporally storing display data after it is read out from the display data storage section 51, the display data being to be processed by various member of the display data execution processing section 40.

The frame buffer 19 has a function of temporally storing one-frame data of the display screen to be displayed on the display section 15, after the one-frame data is generated via various processes performed by the various member of the display data execution processing section 40. The data of the display screen stored in the frame buffer 19 is written in the display section 15 by the display control section 24 so as to be displayed visually to the user.

The control script analyzing section 140 has a function of analyzing the control script as described above. In the following, the function of the control script analyzing section 140 is described in more details.

(DOM Tree)

In the present embodiment, more specifically, the control script analyzing section 140 has a function of expanding the control script written in XML text to a tree structure called DOM (Document Object Model) tree. The DOM tree defines logical structures of XML texts. By expanding the control script to the DOM tree, it becomes possible to deal with the data in the control script per object described with tabs, and further it becomes possible to identify how the objects are related with each other. The DOM tree is advantageous in that it is possible to access to a desired object regardless of where the desired object is in the order of describing the objects in the control script.

Figure 35:
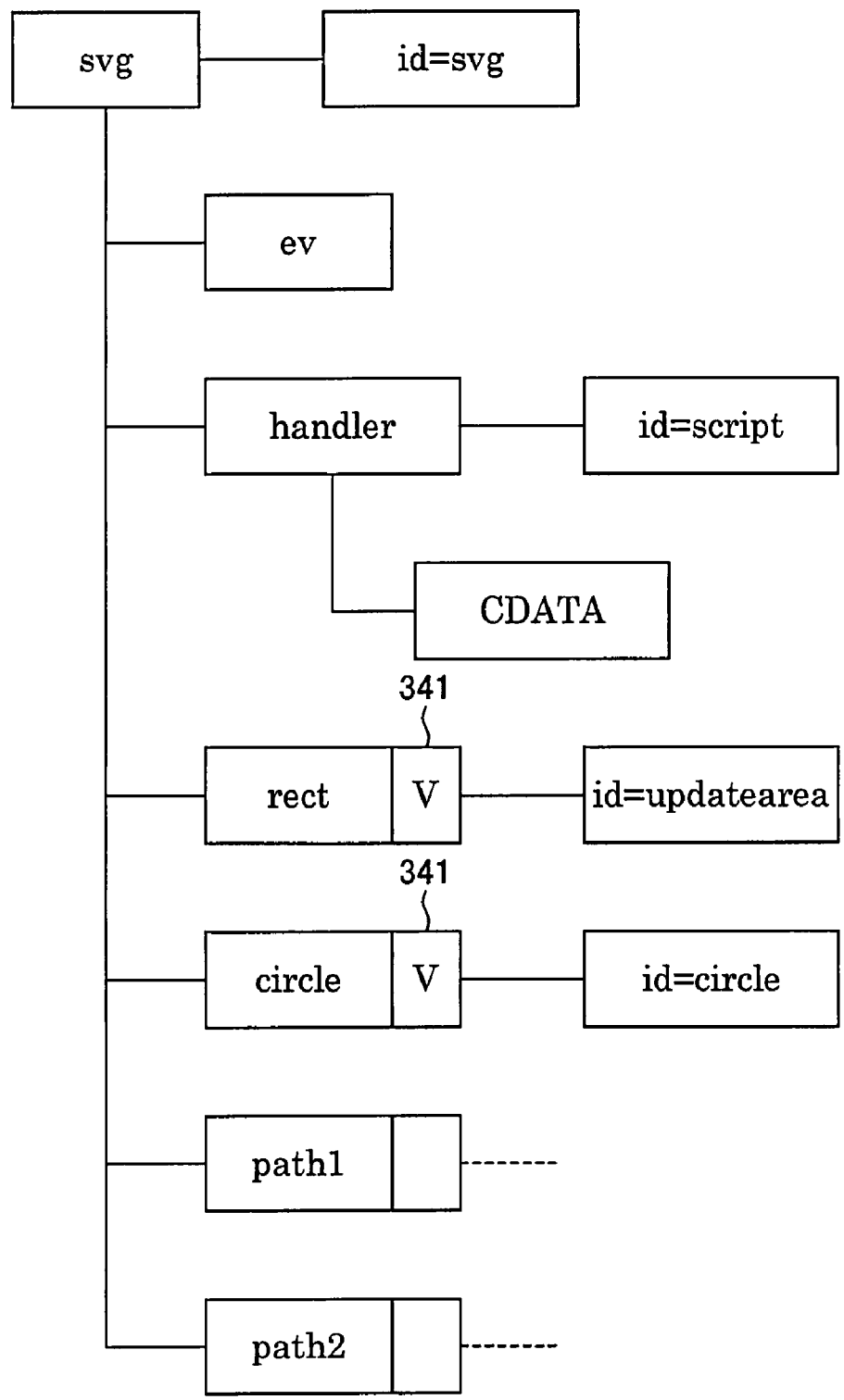
FIG. 35 is a view illustrating a specific example of the DOM tree.

For example, the control script illustrated in FIG. 32 may be expanded to a DOM tree as illustrated in FIG. 35. The DOM tree outputted from the control script analyzing section 140 is expanded in the temporal storage section 18 of the television 1, and read out by the various members of the display data execution processing section 40 if necessary.

The change detecting section 144 has a function of detecting, in the control script, a script for defining the change process (e.g., a change function of the image data reformation region script 113b), so as to determine, for each object, whether the image data reformation is necessary or not.

If the change detecting section 144 detects a change process script for altering an object being displayed and thus determines that it is necessary to perform image data reformation of the object, the change detecting section 144 sets a change flag on the object on the DOM tree. The change flag indicates that an object with the change flag requires the image data reformation.

In the control scripts illustrated in FIGS. 32 and 35, the change detecting section 144 detects the rectangular shape identified with ID="updatearea" and the circle identified with ID='circle', as objects necessary for the image data reformation (the rectangular shape is the hatched portion in FIG. 33(c), which is specified as the image data reformation region in advance, and the circle is the circle 331 in FIG. 33(a)). Therefore, in FIG. 34, the change detecting section 144 sets the change flags 341 on the rectangular object "rect", and the circle object "circle".

The detection of the change detecting section 144 is not limited to the change function. For example, the change detecting section 144 may detect an animation object. The detection of the object to be changed may be carried out with any criterion, provided that the object requiring the image data reformation can be detected accurately by detecting the change in the object.

The image data reformation region specifying section 145 has a function of specifying the image data reformation region by acquiring from the temporal storage section 18 the information of the object on which the change detecting section 144 sets the change flag.

More specifically, the image data reformation region specifying section 145 scans through the DOM tree (FIG. 35) stored in the temporal storage section 18 thereby acquiring the image data reformation regions of all the objects on which the change flag 341 is set. All the image data reformation regions acquired by the image data reformation region specifying section 145 are listed up in a list called an image data reformation region list. The image data reformation region specifying section 145 generates the image data reformation region list and stores it in the image data reformation information storage section 55. If the object has a circle shape or the other complicated shape, the image data reformation region specifying section 145 works out a rectangular shape circumscribing all the area of the objects to be changed, and adds, in the list, the thus worked-out rectangular shape as the image data reformation region of the object.

After making the list of all the image data reformation regions referring to the DOM tree, the image data reformation region specifying section 145 scans all the listed-up image data reformation regions and merges image data reformation regions overlapping with each other if any. That is, the image data reformation region specifying section 145 works out a rectangular shape circumscribing all the image data reformation regions overlapping with one other.

FIG. 36(a) is a view illustrating an example of the image data reformation region list stored in the image data reformation region information storage section 55. The example is the image data reformation region list generated by the image data reformation region specifying section 145 based on the controls scripts illustrated in FIGS. 32 and 35.

The image data reformation region list is generated for each control script that constitutes one display screen. In the examples illustrated in FIGS. 32 and 35, the change flags are set on the rectangular object "rect" and the circle object "circle". Thus, the image data formation regions of the two objects are added to the list. The image data formation region list stores the information (x and y coordinates of the origin of the rectangular shape, width and height) of the image data reformation region in association with the control script IDs for identifying the control scripts of FIGS. 32 and 35, and the object IDs for identifying the objects in the control scripts.

After making the list of the image data reformation regions of all the objects with the change flag, the image data reformation region specifying section 145 then merges the image data reformation regions that overlaps with each other, thereby finally settling one image data reformation region (or plural image data reformation regions if they are not overlapping with each other) and specifying the image data reformation region as the "settled image data reformation region".

FIG. 36(b) is a view illustrating an example of the settled image data reformation region stored in the image data reformation region storage section 55. This is an example in which the image data reformation regions shown in FIG. 36(a) are merged together. The image data reformation regions listed up in the example of FIG. 36(a) overlap with each other as illustrated in FIG. 33(c). Thus, the rectangular region 334 circumscribing the circle 331 and the rectangular region 335 defined by the image data reformation script in advance are merged together, thereby working out one settled image data reformation region. In some cases, one control script would have plural settled image data reformation regions. Thus, each settled image data reformation region is managed with image data reformation region ID.

The settled image data reformation region outputted by the image data reformation region specifying section 145 is supplied to the image data formation section 147 for performs the image data reformation process to the settled image data reformation region.

The image data formation section 147 performs the image data reformation of the settled image data reformation region specified by the image data reformation region specifying section 145. A clipping section 146 has a function of performing the clipping process.

More specifically, the image data formation section 147 forms data reflecting the result of the changing process for the object to be changed in the settled image data reformation region (that is, the object with the change flag 341). Then, the image data formation section 147 writes the data in the temporal storage section 18.

Next, the image data formation section 147 scans the DOM tree. If the scanning finds an object that is not to be changed but included in the settled image data formation region whole or partially, the image data formation section 147 acquires the script that defines the object. This is because the information after the changing process will not be displayed correctly without reforming the image data of the object not to be changed, as long as the object not to be changed is included in the settled image data reformation region. If the whole object is included in the settled image data reformation region, the object is written in the temporal storage 18 based on the acquired script.

On the other hand, if the acquired object is partially included in the settled image formation region, the clipping section 146 works out that portion of the object which is included in the settled image data reformation region. The portion is returned as a clipped region to the image data formation section 147 from the clipping section 146. The image data formation section 147 acquires the clipped region from the clipping section 146 and then writes the clipped region in the temporal storage section 18.

As mentioned above, the image data reformation region specified by the image data reformation control script can be defined by the display data generating apparatus 2 according to the contents of the display data, so that the image data reformation region does not includes an object (especially an object having a complicated shape) partially. Consequently, the settled image data reformation region thus worked out by the television 1 does not include a complicated shape. This can avoid a high-load clipping process.

By this, all the objects requiring the image data reformation in the settled image data reformation region are written in the temporal storage section 18. Finally, the image data formation section 147 writes in the frame buffer 19 the data of the settled image data reformation region, which has been subjected to the changing process and then written in the temporal storage section 18. Thereby, the data before the changing process in the settled image data reformation region is updated in the frame buffer 19. In this way, the image data reformation is completed for the settled image data reformation region, and the new data reflecting the change is displayed on the display section 15.

In this arrangement, if the television 1 receives display data including an image data reformation script that designates an image data reformation region, then an initial display screen is displayed according to the control script of the display data. After that, if the change detecting section 144 detects a change in the displayed information, then the image data reformation region specifying section 145 specifies a settled image data reformation region according to the image data reformation control script included in the control script. The image data formation section 147 performs the image data reformation in the settle image data reformation region specified by the image data reformation region specifying section 145, and displays a new display screen reflecting the change.

Here, the image data reformation regions designated by the image data reformation control script are defined in advance as an image data reformation region that do not need complicated process and are as small as the need permits. Thus, the settled image data reformation region specified by the television 1 based on such image data reformation regions does not include an object partially. With this, the image data reformation is carried out only in such a region as small as the need permits, while avoiding the clipping process of the object. As a result, the image data reformation process can be efficiently carried out.

Moreover, the designation of the image data reformation region is carried out by using the control script. Thus, the television 1 can specify the image data reformation region most appropriate for the contents of the display data always. This allows the television 1 to perform the image data reformation process always efficiently, avoiding the load of the clipping process.

[Flow of Image Data Reformation Process]

Figure 37:
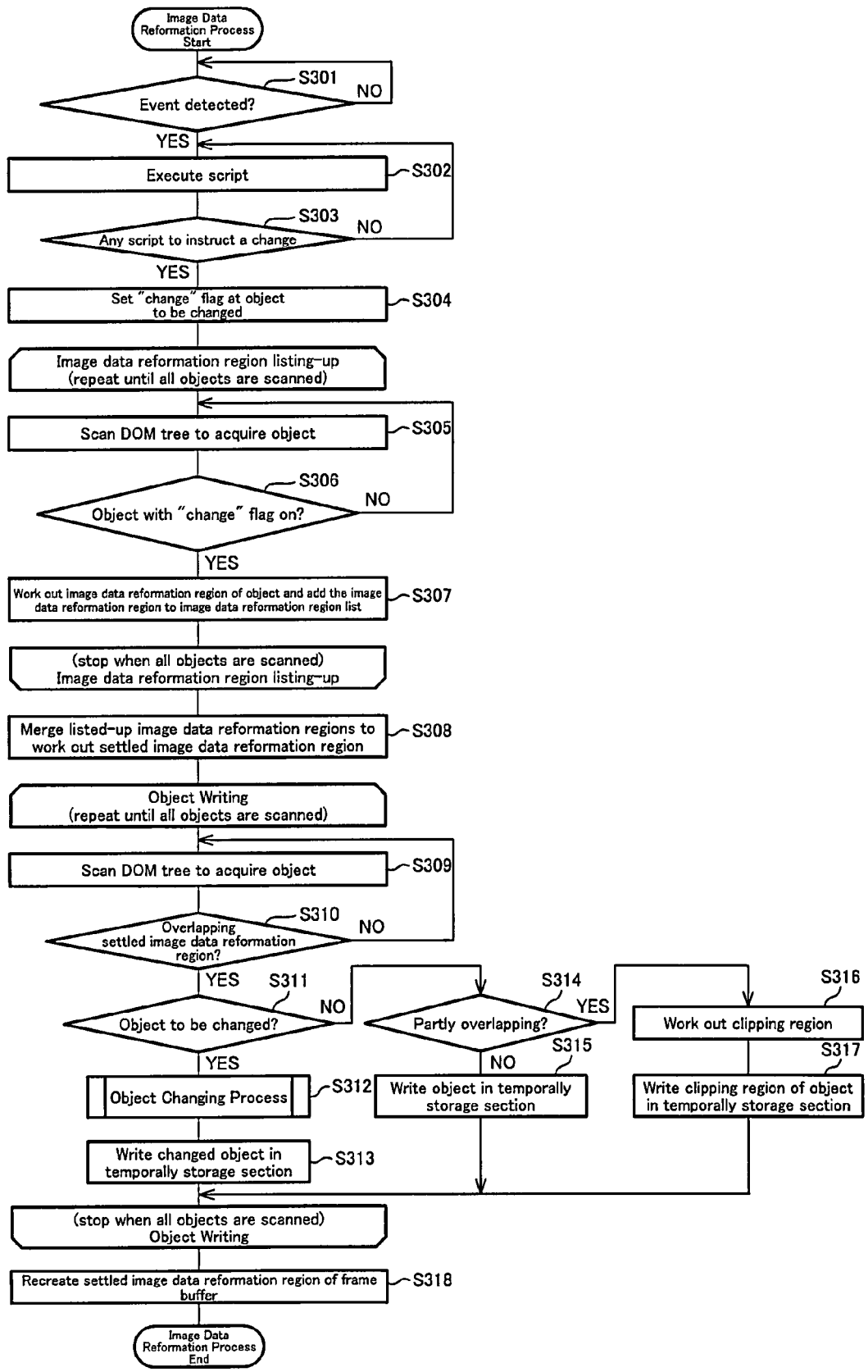
FIG. 37 is a flow chart illustrating a flow of an image data reformation process in the television according to the another embodiment of the present invention.

FIG. 37 is a flow chart illustrating the flow of the image data reformation process of the television 1. The image data reformation process is carried out as follows. The control script executing section 41 (FIG. 34) analyzes the control script in the display data (expands the control script to the DOM tree), and executes the control script, thereby creating the initial screen. After that, if the event processing section 11 detects a certain event, the image data reformation is carried out by the various members of the control script executing section 41.

Broadly speaking, the image data reformation process is constituted of three steps, namely: the change detecting section 144 determining from the image data reformation region changing script whether it is necessary to perform the image data reformation; the image data reformation region specifying section 145 specifying the image data reformation region referring to the image data reformation region definition script; and the image data formation section 147 performing the image data reformation for the specified image data reformation region.

Details of each step is described below.

If the event processing section 11 detects the certain event while the initial screen is being displayed (yes at S301), then the control script executing section 41 and the event processing section 11 execute the display data according to the DOM tree (control script) that is currently being expanded (S302). If the change detecting section 144 detects an image data reformation region changing script (such as a change function (or an animation object)) in the control script being currently processed (yes at S303), then the change detecting section 144 sets a change flag on the detected object to be changed (S304), which object to be changed may be one or more.

Next, the image data reformation region specifying section 145 generates the image data reformation region list based on the object to be changed, which the change detecting section 144 detected.

Firstly, the image data reformation region specifying section 145 scans the DOM tree of the control script, which is being expanded in the temporal storage section 18, thereby acquiring the objects in order (S305). If an object thus acquired is with the change flag (yes at S306), then the image data reformation region of the object to be changed is worked out and added to the image data reformation region list (S307). Here, if the region of the object is defined in a rectangular shape, then the region of the object is listed up as such. If the region of the object is defined in a non-rectangular shape, a rectangular shape circumscribing the object is worked out and listed up. The processes at S305 to S307 are repeated for all the objects on the DOM tree.

Then, the image data reformation region specifying section 145 scans each image data reformation region added to the image data reformation region list, and merges the image data reformation regions overlapping each other if any. Finally, the image data reformation region specifying section 145 then outputs the settled image data reformation region to the image data formation section 147 (S308).

Next, the image data formation section 147 writes in the temporal storage section 18 all the objects included in the settled image data reformation region thus specified. Thereby, the display data to be written in the frame buffer 19 is prepared.

Firstly, the image data formation section 147 scans the DOM tree expanded in the temporal storage section 18, thereby acquiring the objects in order (S309). Then, the image data formation section 147 determines whether the acquired object overlaps the settled image data reformation region even partly (S310). If it is determined that the object overlaps the settled image data reformation region (yes at S310), then the image data formation section 147 determines whether the acquired object is with the change flag and therefore is to be changed (S311).

If the image data formation section 147 determines that the object is to be changed (yes at S311), then according to the change script the various members of the control script executing section 41 carry out the changing process to the object to be changed (S312). Then, the changed object thus obtained by the changing process is written in the predetermined region of the temporal storage section 18 (S313).

On the other hand, if it is determined that the acquired object is not an object to be changed (No at S311), then the image data formation section 147 determines whether part or the whole of the object overlaps the settled image data reformation region (S314). Here, if it is determined that the whole acquired object overlaps the settled image data reformation region (No at S314), then the acquired object as such is written in the predetermined region of the temporal storage section 18 (S315). On the other hand, if it is determined that part of the acquired object overlaps the settled image data reformation region (yes at S314), the clipping section 146 works out the clipping region (portion of the settled image data reformation region which the object overlaps) (S316). Then, the image data formation section 147 writes the clipping region of the acquired object in the predetermined region of the temporal storage section 18 (S317). The processes at S309 to S317 are repeated for each object on the DOM tree.

Finally, the image data formation section 147 performs the image data reformation by rewriting the changed data of the settled image data reformation region in the settled image data reformation region of the frame buffer 19 from the temporal storage section 18 in which the changed data of the settled image data reformation region has been written (S318). In this way, the image data reformation in the settled image data reformation region is completed and then the new information after the change is displayed on the display section 15.

As described above, the image data reformation region designated by the image data reformation region definition script is defined, according to the contents of the display data, as an image data reformation region that does not need complicated process and is as small as the need permits. That is, the settled image data reformation region specified by the image data reformation region specifying section 145 according to the script does not include a complicate-shaped object partly. With this arrangement, it is possible to perform the image data reformation only in the region as small as the need permits, while avoiding clipping process for complicate-shaped objects. As a result, it is possible to carry out the image data reformation process efficiently.

Moreover, the designation of the image data reformation region is carried out by using the control script. With this, the television 1 can specify the image data reformation region most appropriate for the contents of the display data always. Thus, the television 1 can avoid load of the clipping process thereby being able to perform the image data reformation process always efficiently.

As described above, to designate the image data reformation region on the display screen in advance by using the control script is especially effective for a display screen having a large number of complicate-shaped display screen, and a display screen in which a large number of changing process will be done as events occur.

Referring to examples of display screens illustrated in FIGS. 38(*a*) to 38(*i*), a specific example of the image data reformation region is explained below in which is designated so that the image data reformation will be carried out in the region as small as the need permits while avoiding the clipping process of the complicate-shape. By specifying the settled image data reformation region according to the image data reformation regions (image data reformation region definition script) designated by FIG. 38(*i*), the television 1 can perform more efficient image data reformation process in which the load of clipping process is reduced, than by specifying the settled image data reformation region according to the image data reformation regions worked out for each object to be changed.

Figure 38:
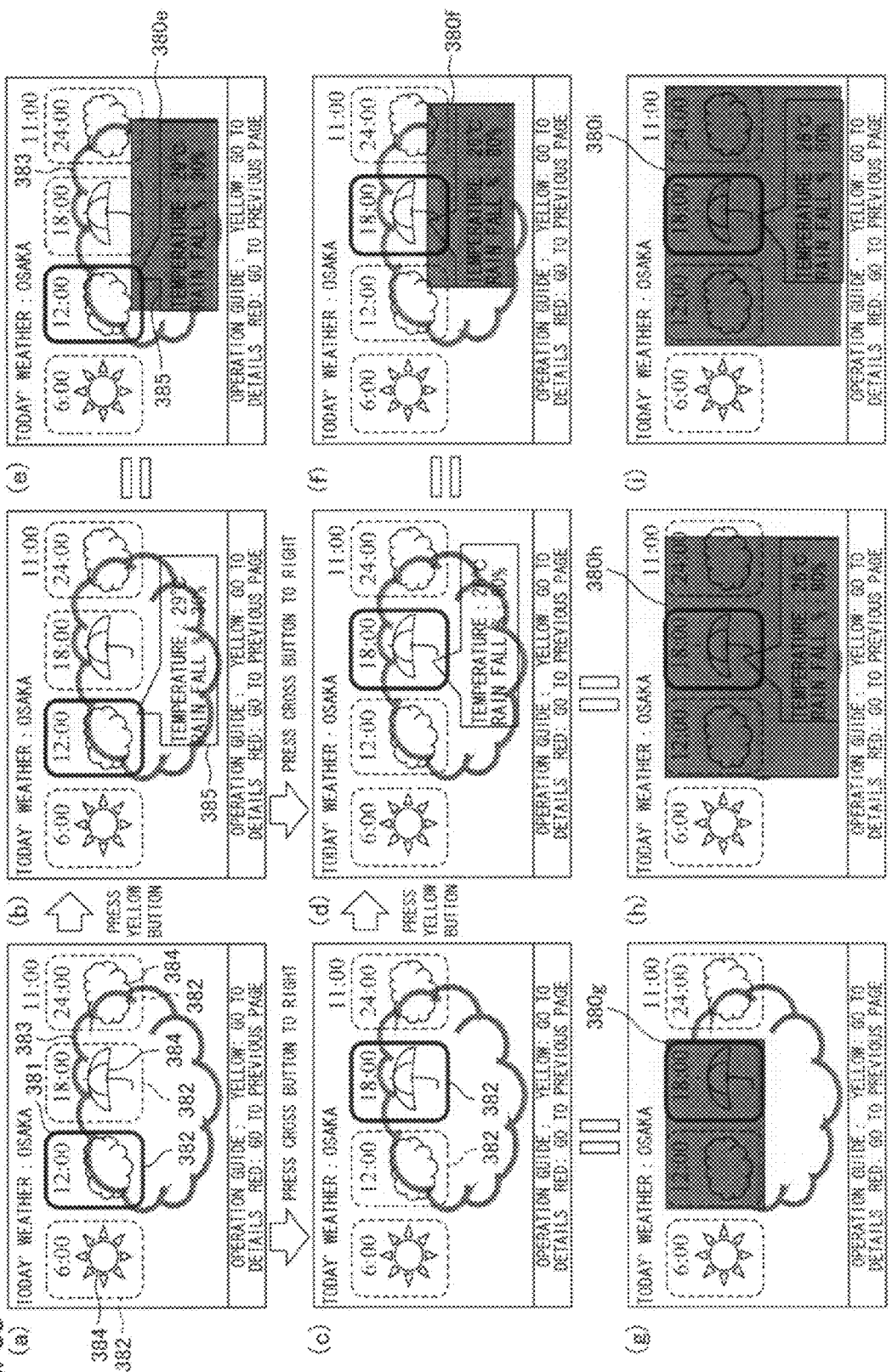

FIGS. 38 (a) to 38(d) are views illustrating specific examples of display screens displayed on the display section 15, the display screens having complicated objects. In FIGS. 38 (a) to 38(d), the arrows indicate the correspondences of the change occurred between the display screens of FIGS. 38 (a) to 38(d) and the events that initiates the changes.

FIGS. 38 (e) to 38(h) illustrate the settled image data reformation regions that will be specified for the changes of the display screens from (a)→(b), (c)→(d), (a)→(c), and (b)→(d). FIGS. 38 (e) to 38(h) illustrate the settled image data reformation regions that are specified without using the image data reformation region definition script, and are specified based on the image data reformation regions worked out for each object to be changed.

FIG. 38(i) is a settled image data reformation region specified by using an image data reformation region definition script.

FIG. 38(a) illustrates a display screen for displaying weathers (four weathers) at predetermined times of the day, and temperature and water fall forecasts at the times. A cursor 381 is placed on a weather forecast icon of nearest future from the time of displaying the initial screen, among four weather forecast icons 382 respectively showing the weather forecasts at the four times in the date. A background cloud (an object having a complicated shape) 383 is a design of the display screen and each screen have the background cloud 383 on the background of all the weather forecast information (all objects). Further, weather marks in the weather forecast icons 382 are also objects having complicated shapes, whose clipping process requires high load.

When the yellow button of the operational section 13 is pressed while the screen of FIG. 38(a) is being displayed, the display screen is changed to the one illustrated in FIG. 38(b) from that of FIG. 38(a). That is, a balloon 385 for detailed information of 12:00 is displayed. Accordingly, a region 380e is specified as a settled image data reformation region as illustrated in FIG. 38(e). The region 380e is a rectangular shape circumscribing the balloon 384.

When the cross button of the operational section 13 is pressed to right while the screen of FIG. 38(a) is being displayed, the display screen is changed to the one illustrated in FIG. 38(c) from that of FIG. 38(a). That is, the cursor 381 is moved from the weather forecast icon 382 of 12:00 to the weather forecast icon 382 of 18:00. Accordingly, a region 380g is specified as a settled image data reformation region as illustrated in FIG. 38(g). The region 380g is a rectangular shape circumscribing the two weather forecast icons 382.

Similarly, without the image data reformation region definition script, each settled image data reformation region (regions 380e to 380h) is specified as a rectangular shape circumscribing each object to be changed. Thus, in each display screen, the settled image data reformation region partly includes an object having a complicate shape such as the background cloud 383 and weather mark 384. As a result, the clipping process requiring high load should be performed.

With an image data reformation region definition script defining an image data reformation region as illustrated in FIG. 38(i), which contains the whole of the complicate-shaped object or does not include a certain complicate-shaped object at all and is as small as the need permits, the television 1 can specify a most suitable settled image data reformation region, like a region 380i, that does not include a complicate-shaped object partly.

As a result, it becomes possible to perform the image data reformation process efficiently, avoiding the clipping process.

Modification Example 3

Image Data Reformation Process for Picture Rotation

The above example discusses the television 1 that performs efficient image data reformation by avoiding the clipping process by using the control script for designating the image data reformation region that does not include part of the object having a complicated-shape.

The control script is not limited to the above example. It is possible to designate an image data reformation region by the control script in such a manner that an object in at a certain display position is to undergo the image data reformation process regardless of how the shape of the object is complicated or whether the object is to be changed.

More specifically, the situations in which the image data reformation region should be designated according to the display region of an object may be such a situation as follows.

Due to the restriction on the hardware, that is, the extreme restriction in the storage capacity of the temporal storage section 18, the change in the display screen would require that a region (hereinafter, referred to as an ARGB region) for storing data of the actual display screen to be outputted to the display section 15 be used to temporally store the data generated during the changing process.

In such a situation, the region (hereinafter, "used region") in the ARGB region which was used during the changing process should be cleared before the data of the display screen to be outputted to the display section 15 is written in the ARGB region.

However, it is insufficient to clear the used region. If an object has been positioned in the region previously to the changing, such an object should be targeted by the image data reformation and restored (even if the object is not to be changed). Thus, it is necessary to designate the image data reformation region so that the object "caught up" with the changing process (the object overlapping the used region used in the changing process) will be subjected to the image data reformation surely.

Referring to an example where the changing process (S312 in FIG. 37) is a photo rotation process (S115 in FIG. 10), a television 1 is descried below, which performs the image data reformation process according to such a control script that designates the image data reformation region according to the display region of the object and a region that will be used (or assumed to be going to be used) during the picture rotation process thereof.

[Problem for Rotating Picture]
(Configuration of Temporal Storage Section)

Figure 39:
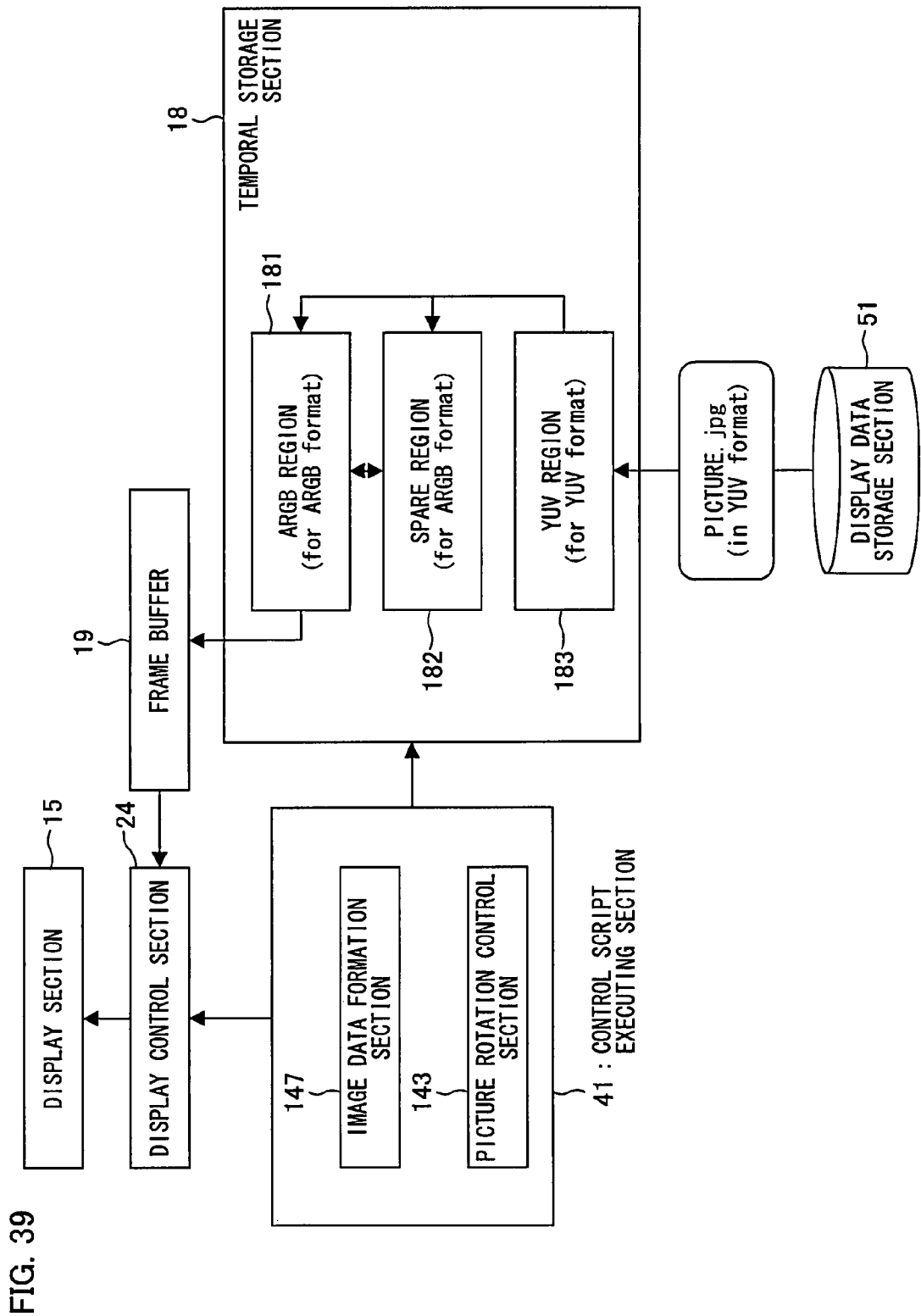
FIG. 39 is a block diagram illustrating main part of a structure of a temporal storage section of the television performing a picture rotating process.

FIG. 39 is a block diagram illustrating main part (especially the temporal storage section 18) of the configuration of the television 1 for performing the picture rotation process. As described in Embodiment 1, the rotation and display of the picture is carried out by the picture rotation control section 143 according to the control script. More specifically, the picture rotation, control section 143 performs this as follow. Using the temporal storage section 18 as a work area, the picture rotation control section 143 acquires from the display data storage section 51 the picture to be rotated, and rotates the acquired picture, sends the rotated picture to the frame buffer 19, and displays the rotated picture on the display section 15.

The temporal storage section 18 used as the working area by the picture rotation control section 143 includes an ARGB region 181, a spare region 182, and a YUV region 183. The three regions are fixed hardware-wise in the temporal storage section 18.

The YUV region 183 is a region for temporally storing a JPEG picture being received in the YUV format and stored in the display data storage section 51.

The ARGB region 181 and the spare region 182 are region for temporally storing a JPEG picture in the ARGB format, the JPEG picture being obtained by converting the JPEG picture stored in the YUV format in the YUV region 183 to the ARGB format.

The ARGB region 181 is a region for storing the data of the display screen to be actually outputted to the display section 15. The data of the display screen to be outputted to the frame buffer 19 is supplied from the ARGB region 181 but not from the other regions. The spare region 182 is a spare region that is used as a working area when the control script executing section 41 carries out a changing process, such as rotation, to the picture converted into the ARGB format.

YUV format is a format describing a color by three pieces of information, namely a luminance signal (Y), a difference (U) between the luminance signal and a blue component, and a different (V) between the luminance signal and a red component. The merit of the YUV format is that the data can be compressed by a high data compression rate without much image quality deterioration, because more data amount is allocated to the luminance information.

Thus, the picture is in the YUV format always, when it is provided from the display data generating apparatus 2 by being enclosed in the displayed data. Thus, it is necessary to convert the picture to the RGB format (ARGB format) in order to display the picture on the display section 15. Thus, by the control script executing section 41 expands the picture in the YUV region 183 and then converts the picture into the ARGB format. Then, the picture is expanded in the ARGB region 181 or the spare region 182. After that the picture is sent to the frame buffer 19.

(States of ARGB Region and Spare Region at Picture Rotation)

Descried below referring to FIG. 40 are states of the ARGB Region 181 and the spare region 182 in rotating the picture by the picture rotation control section 143, where an appropriate image data reformation region is not designated by the image data reformation region definition script included in the control script. Further, the technical program in performing such picture rotation is also discussed.

FIG. 40 (*a*) illustrates a state of the ARGB region 181 and the spare region 182 at the initial image data formation. The ARGB region 181 stores data of a display screen (circle object 190, a vertically-long picture 185, and a background) displayed on the display section 15 currently. In the spare region 182, nothing is stored. It would be possible that some data stored therein during another process still remain in the spare region 182.

If an instruction for rotating the vertically-long picture 185 by 90°, the picture rotation control section 143 will perform the picture rotation process. In order to perform the picture rotation process, the vertically-long picture 185 converted in the ARGB format is called and temporally stored in the ARGB region 181, as illustrated in FIG. 40(*b*). Next, as illustrated in FIG. 40(*c*), a horizontally-long picture 186 obtained by 90° rotation of the vertically-long picture 185 stored temporally is stored in the spare region 182 temporally. After that, as illustrated in FIG. 40(*d*), that region 188 of the ARGB region 181 which will be used (that is, which was temporally used in the rotation process) is cleared. Then, the picture rotation control section 143 specifies the image data reformation region, and performs the image data reformation for the display screen after the changing process (rotation).

Here, in case the image data reformation region definition script is not particularly designated, the television 1 follows the above-mentioned flow to specify, as the image data reformation region, the region of the object before the rotation (i.e., the vertically-long picture 185) and the region of the object after the rotation (i.e., the horizontally-long picture 186) in the picture, and to specify, as the settled image data reformation region (settled image data reformation region 184), a rectangular shape circumscribing the regions.

When the settled image data reformation region 184 is specified, the picture rotation control section 143 writes, in the ARGB region 181, the horizontally-long picture 186 that has been temporally stored in the spare region 182, as illustrated in FIG. 40(*e*). Then, the picture rotation control section 143 detects the circle object 190 that partially overlap the settled image data reformation region thus specified. As illustrated in FIG. 40(*f*), the clipping section 146 then clip a clipped region 187 of the circle object 190 as a region that should be subjected to the image data reformation, and writes the clipped region 187 in the ARGB region 181. The data of the display screen thus stored in the ARGB region 181 is outputted to the frame buffer 19 and then displayed on the display section 15.

As descried above, in case where the image data reformation region is not designated, by using the image data reformation region definition script, that the image data reformation region includes the circle object 190, the picture rotation process is performed so incorrectly that the left-hand portion of the circle object 190 is displayed without being restored, even if the horizontally-long picture 186 and the circle object 190 should be displayed as illustrated in 40(*h*).

To solve the problem, it is necessary to change the control script to be supplied to the television 1. More specifically, the image data reformation region definition script designates the image data reformation region so that the image data reformation region includes the whole of all the objects overlapping the region that is predicted to be used by a certain process, like the used region 188 as illustrated in FIG. 40(*d*).

In the present embodiment, the called picture is written from the top to the bottom from the left hand side. Thus, the used region 188 can be specified by the coordinates of the origin (X, Y)=(0,0) and the size of the picture, and a control script that specifies the region 189 as the image data reformation region is supplied to the television 1.

FIG. 41 is a view illustrating an example of the control script that designates the image data reformation region taking into the consideration the circle object 190 and the region 189 that is to be used in the picture rotation process. An image data reformation region definition script 112*c* is a script for designating the region 189 as the image data reformation region, and an image data reformation region changing script 113*c* is a script for causing the change detecting section 144 to recognize that the image data reformation region thus designated is an object to be changed.

[Flow of Picture Rotation Process]

Figure 42:
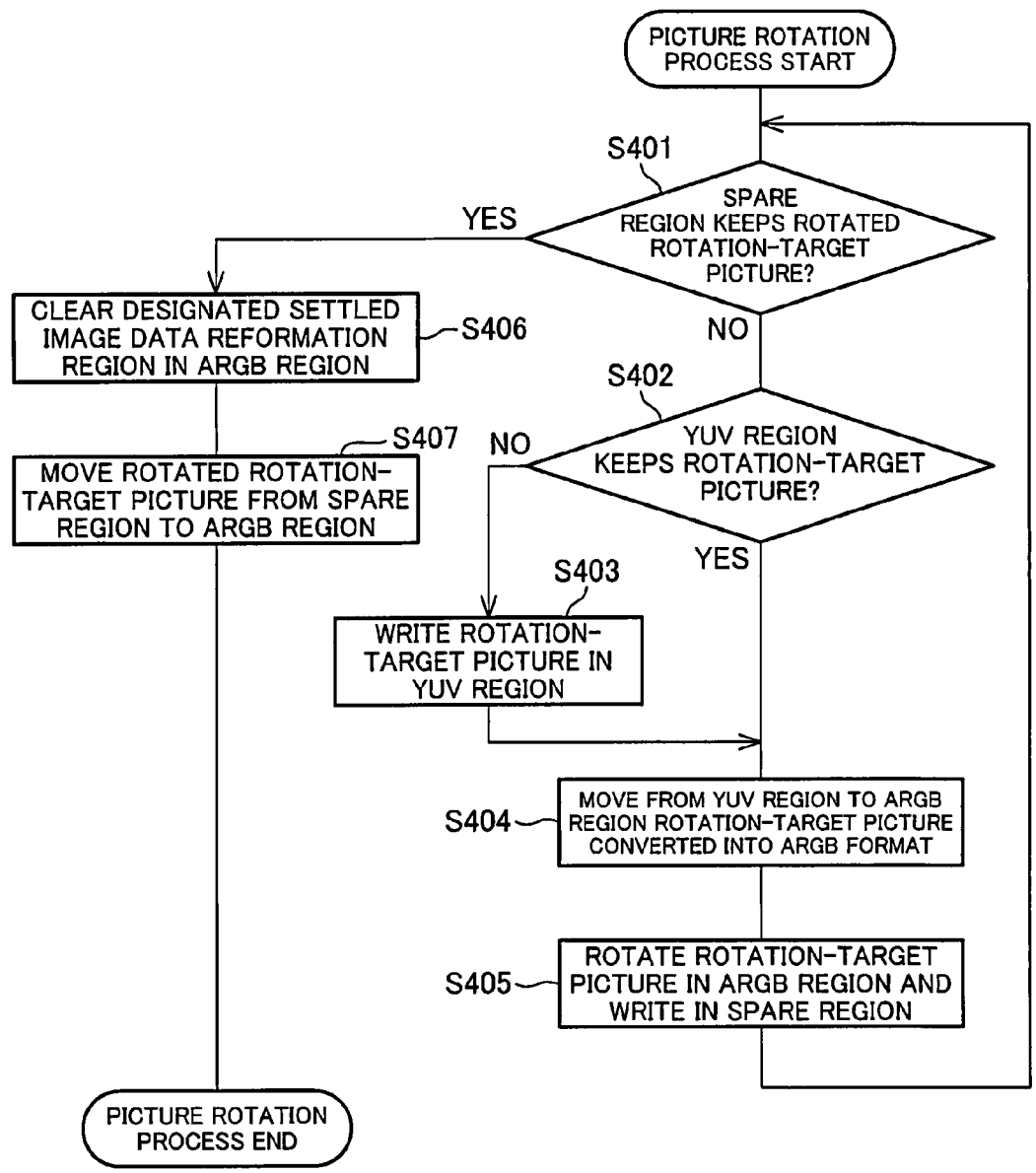
FIG. 42 is a flow chart illustrating a flow of a picture rotation process performed by the picture rotation control section of the television.

FIG. 42 is a flow chart illustrating the flow of the picture rotation process performed by the picture rotation control section 143 as the changing process at S312 of FIG. 37. Assume that the region 189 of FIG. 40(*i*) is specified as the settled image data reformation region by the image data reformation region specifying section 145 at S308 in FIG. 37. Moreover, the object determined, at S311 of FIG. 37, as the object to be changed is referred to as a picture to be rotated (a rotation-target picture), hereinafter.

The picture rotation control section 143 determines whether data of the rotated picture (post-rotation data of the picture to be rotated) is stored in the spare region in advance (S401). If not (no at S401), the picture rotation control section 143 determines whether the picture to be rotated is stored in the YUV region 183 (S402). If the picture rotation control section 143 determines that the YUV-formatted picture to be rotated is stored in the YUV region 183 (yes at S402), the picture rotation control section 143 converts the format of the stored picture to be rotated from the YUV format to the ARGB format, and then expands the ARGB-formatted picture in the ARGB region 181 (S404). On the other hand, if the picture rotation control section 143 determines that the YUV-formatted picture to be rotated is not stored in the YUV region 183 (no at S402), the picture rotation control section 143 writes, in the YUV region 183, the picture to be rotated, which is stored in the display data storage section 51 (S403), and then performs the step of S404.

Next, the picture rotation control section 143 writes the rotated picture in the spare region 182, the rotated picture being obtained by rotating, as much as specified by the control script, the object to be rotated, which is stored in the ARGB region 181 (S405). Then, the step goes back to the determination at S401.

At S401, if it is determined that the data of the rotated picture is stored in the spare region 182 (yes), the picture rotation control section 143 clear, in the ARGB region 181, the settled image data reformation region specified by the image data reformation region specifying section 145 (S406).

Finally, the picture rotation control section 143 writes in the ARGB region 181 the rotated picture temporally stored in the spare region 182 (S407), and ends the picture rotation process.

After that, as discussed referring to FIG. 37, if there is another object (the circle object 190 in the example illustrated in FIG. 40 (*a*) to (*i*)), which is other than the picture to be rotated but is included in the settled image data reformation region, the another object is written in the ARGB region 181. Then, the settled image data reformation region thus updated in the ARGB region 181 is outputted to the frame buffer 19.

As described above, even in case the temporal storage region (ARGB region 181) for storing the data of the display screen should be used during the changing process, it may be arranged that the most suitable control script that designates such an image data reformation region that wholly includes the used region predicted to be used by the changing process and the object overlapping the used region is generated according to the contents of the display data and provided to the television 1.

Referring to the image data reformation region designated by the control script, the television 1 can specify the object that needs the image data reformation, regardless of whether or not the object is the object to be changed, and can perform the image data reformation for the object that needs the image data reformation.

With this, it is possible to realize a television 1 that can perform the changing process to digital image data of a large data size and display the changed digital image data, even if the storage capacity of the temporal storage section 18 is extremely limited.

Albeit the above explanation assumes that the format of the picture is JPEG, the format displayable on the television 1 is not limited to JPEG, and the television 1 may display a picture and image in various format such as bit map, PNG, etc. Moreover, if the rotation process is not applicable to some formats, the picture rotation control section 143 may be arranged such that it determines which format the picture to be rotated has, and performs the picture rotation process only for the picture of the format that allows the rotation process.

Modification Example 4

Image Data Reformation Process of Preloading

The above discusses an example where part of the display screen is designated as a region to be subjected to the image date reformation according to the content of the display data (the region to be used by the changing process or the object "caught up" with the changing process). However, the image data reformation region definition script for designating the image data region is not limited to this and an image data reformation region definition script for designating the full screen as the image data formation region may be provided to the television 1.

As described above, the television 1 acquires the display data (first display data) and expands the first control script in the DOM tree, the first control script being included in the first display data. Then, the television 1 writes the data in the temporal storage section 18 (preload). When displaying the first data initially, there is no previously written data. Thus, the full screen is written without considering the image data reformation data.

After this, if a change is to be made to the first display screen, the image data reformation is carried out in the settled image data reformation region, which is a difference between the previous written data and new written data, with the configuration and the method described above.

However, even when another display screen, that is, a second display screen different from the above is displayed according to a second control script of the second display data, the DOM tree of the first control script is still stored in the temporal storage section 18 in the television 1.

In such a situation, a case where the preloaded first display data is displayed and then the second display data is displayed, and the first display data is displayed again, it would be determined that there is no image data reformation region. This would happen if the first script of the display data does not include a changing script (animation object of changing function), which the change detecting section 144 detects. Or even if such a changing script is included in the first control script, only part of the screen would be specified as the image data reformation region.

As described above, if it is determined that there is no image data reformation region or that only part of the screen is the image data reformation region, the shift from the second display screen to the first display screen cannot be performed correctly (the shift from the second display screen to the first display screen does not occur or only part of the display screen is changed to the first display screen) even though the event of shifting back from the second display screen to the first display screen is detected.

In such a case, it is necessary to designate the full screen as the image data reformation region, so that the full screen is shifted from the second display screen to the first display screen.

Thus, to process the display data of a display screen that is different from a display screen that has been displayed so far, each control script to be provided to the television 1 includes an image data region definition script that specifies the full screen as the image data reformation region.

With this, the television 1 arranged such that, if the event processing section 11 detects an input of a signal that instructs to shift back from the currently-displayed second display screen to the previously-displayed first display screen, the control script executing section 41 specifies the full screen as the settled image data reformation region according to the first control script for displaying the first display screen, and then performs the image data reformation in the full screen by writing the first display screen. With this, it becomes possible to perform the screen shifting correctly even if the screen shifting is to shift to a previous display screen from another current display screen.

As described above, an image data reformation region as intended by the display data producer (display data generating apparatus 2) can be designated by providing a control script to the television 1, the control script describing an image data reformation control script according to the contents of the display data. By describing in the control script, it is possible to designate the region to be updated always or not to designate the region not to be updated always.

For an animation object that the change detecting section 144 detects as an object to be changed, the control script may be written such that the television 1 can specify that the image data reformation region required by the movement of the object has a rectangular shape circumscribing the object.

Moreover, the shape of the image data reformation region is not limited to rectangular shapes. The shape of the image data reformation region may be any simple shape that does not need complicate clipping process. For example, the control script may include definition of an image data reformation region having a rectangular frame-like shape (rectangular shape without inside), circular shape, elliptical shape, or the like.

Embodiment 3

Embodiment 1 describes that the control script is generated according to the display data, the operation menu to be displayed is changed appropriately, and the photo application functions corresponding to the operation menu are provided to the television 1.

For example, each photo application function to be provided to the television 1 by the control script is described in the operation function definition script, such as the scripts 132a to 132d in FIG. 12. The operation function definition script describes when (definition of the event) and what (definition of the function to be executed) to do. As described in Embodiment 1, the photo application function of the television 1 can be flexibly changed by changing the control script in terms of the definition of the function as suitable for the contents of the display data.

As illustrated in FIG. 12, the definition of the function to be executed is associated with the event that triggers the execution of the function by the television 1. In most cases, these events are detected by the even processing section 11 detecting the pressing of various buttons of the operational section 13 by the user. For example, the script 132a describes:
if(evt.data=='y')
This indicates that the function of displaying or not displaying the operation menu, which is defined by the script 132a, is executed according to whether or not the yellow button of the operational section 13 ('y' indicates the signal that is inputted by the yellow button) is pressed. That is, the yellow button (event) and the function of displaying or not displaying the operation menu are associated with each other.

The present embodiment describes a case where the operation of the television 1 manipulated by the operational section 13 is controlled by appropriately setting a combination of buttons of the operational button (events) an the functions. This arrangement makes it possible to allot different functions to a button for different pieces of the display data, or to allot the same function to different buttons for different pieces of the display data.

In the display data generating apparatus 2 for generating the control script, a most appropriate combination of the button and the function is selected according to the contents of the display data when the control script is generated. That is, for displaying any display data on the television 1, the operation function definition script is generated considering user's convenience in manipulating. Thus, it is possible to maintain the user's convenience in manipulating the television 1.

Moreover, the display data generating apparatus 2 may change the combination of the buttons and the functions as requested by the television 1 and generate an operation function definition script with the combination of the buttons and functions thus changed. For example, the television 1 sends an instruction to the display data generating apparatus 2 to change the combination of the buttons and functions so that a function that has been executed by the yellow button will be executed by the enter button (the user may manipulate the television 1 to make the change). The display data generating apparatus 2 can generate an operation function definition script in which the function is associated with the enter button but not the yellow button, following the instruction.

FIG. 43 is a view illustrating one example of the operation function definition script. A script 431 defines an event "when the enter button (operational section 13) is pressed. Here, 'k' denotes a signal that is inputted by the enter button.

Moreover, below the script 431, the operation function definition script defines the function to be executed by the control script executing section 41 of the television 1 in response to the pressing of the enter button. Here, by way of example, the function that the operation menu control section 142 displays the display screen of FIG. 11(*c*), that is, the function of displaying the sub operation menu 1106, when the pressing of the enter button is detected while the display screen of FIG. 11(*b*) is being displayed on the television 1.

Assume that the display data generating apparatus 2 provides the television 1 with an operation function definition script in which the script 431 is replaced with:
if(evt.data=='d')
In this case, the television 1 displays the sub operation menu 1106 when the cross button, instead of the enter button, is pressed to right. Here, 'd' denotes a signal that is entered by pressing the cross button to right.

As described above, it is possible to control the television 1 so that the same function is performed by an input of different buttons by changing the combination of the button and function, that is, changing the definition of the event in the operation function definition script.

The television 1 can display another display screen from the currently-displayed display screen (perform screen shifting) in response to pressing of a button. In a state shifting definition script, shift-direction information that specifies a display screen to which the currently-displayed display screen is to be shifted in response to occurrence of an event. In the state shift definition script may change the combination of the button and the shift-direction information as below, for example.

FIGS. 44(*a*) and 44(*b*) illustrating shifts of the display screen in response to pressing the enter button.

As illustrated in FIG. 44(*a*), the television 1 acquires and displays a slide show display screen 440b (whose initial screen is a title screen of the album), when it detects pressing of the enter button while the previously-viewed album screen 440*a* is being displayed. An operation guide screen 1103 of the previously-viewed album screen 440*a* may display an explanation to tell that pressing of the enter button shifts the display screen to the slide show display screen 440*b* (title screen).

In this case, the state shift definition script associates the enter button with the shift-direction information for shifting to the slide show display screen 440*b*.

As illustrated in FIG. 44(*b*), the television 1 acquires and displays the thumbnail display screen 440*c* when the enter button is pressed while the previously-viewed album screen 440*a* is being displayed. In this case, the operation guide screen 1103 may display an explanation to tell that pressing of the enter button shifts the display screen to a thumbnail montage display screen 440*c*, unlike in FIG. 44(*a*).

In this case, unlike in FIG. 44(*a*), the state shift definition script associates the enter button with the shift-direction information for shifting to the thumbnail montage display screen 440*c*.

With this, it is possible to change the display screen to which the television 1 will shift in response to pressing of the same button.

Furthermore, the state shift definition script may be written to change, depending on a certain condition, the display screen to which the television 1 will shift. Let us explain this referring to the examples illustrated in FIGS. 44(*a*) and 44(*b*). By using a state shift definition script describing the condition, it is possible to realize a television 1, for example, which determines whether to shift to a slide show display screen 440*b* of an album or a thumbnail montage screen 440*c* of the album depending on the number of the pictures in the album selected by pressing the enter button on the previously-viewed album screen 440*a*.

FIG. 45 is a view illustrating a specific example of the state shift definition script that describes the condition. It is assumed that the state shift definition script is associated with the enter button. The state shift definition script illustrated in FIG. 45 describes necessary information for the control script executing section 41 of the television 1 to determine the condition, and determine which display screen the television 1 will shift depending on the condition, in order to shift to the display screen.

The script 451 defines how to obtain the information (here, the number of the selected album). As instructed by the script 451, the control script executing section 41 acquires the information on the number of pictures in the selected album from a certain file (top.svg). In the present embodiment, the file is so created as to show a value of "10" when the number of the pictures in the album is 10 or less, and to show a value of "11" when the number of the pictures in the album is 11 or more. The file may be written in the same control script in which the state shift definition script is written. The file is identified by the name of top.svg. More specifically, the display data generating apparatus 2 looks up the album information table illustrated in FIG. 20, and generates the file including the value "10," or "11" therein, depending on the number of the picture in the requested album.

The script 452 defines how to determine the information of determination (here, the information on the number of the picture, which information is acquired from the file). Following the script 452, the control script executing section 41 determines whether the information on the number of picture is "10" or "11".

The script 453 defines determination condition. In the example illustrated in FIG. 45, names of the scripts ("cpm_title", "cpm_thumbnail"), which define the functions to be executed by the control script executing section 41 depending on whether the information on the number of the picture is "10" or "11".

The script 454 defines the function to be executed by the control script executing section 41 depending on the determination condition. That is, (1) if the information on the number of the picture is "10" (ten pictures or less), the control script executing section 41 acquires and displays the slide show display screen 440*b* as instructed by the script "cpm_title", and (2) if the information on the number of the picture is "11" (eleven pictures or more), the control script executing section 41 acquires and displays the thumbnail montage display screen 440*c* as instructed by the script "cpm_thumbnail".

By defining the conditions and the functions to be performed in the conditions in the state shift definition script, it is possible to control the television 1 to select an appropriate operation from among plural operations according to a predetermined condition, and execute the selected operation.

As descried above, by using the control script, it is possible to easily change the association between the various operational buttons of the operational section 13 and the functions of the television 1 to which the buttons are allotted.

Embodiment 4

By using the control script, it is possible to control the following functions executed by the television 1.

(1) Control of Display Data Acquiring Function

The television 1 transmits to the display data generating apparatus 2 the display data request message that requests a desired display data, and acquires the requested display data from the display data generating apparatus 2.

The display data acquiring function of the television 1 can be controlled by the display data generating apparatus 2 writing the control script to define when and which display data is to be acquired.

For example, assume that the second display screen of the second display data should be displayed after the first display data of the first display data. Here, if the control script of the first display data describes to acquire the second display data, the television 1 can perform the display of the first display screen of the first display data and the acquisition of the second display data according to the control script.

A certain time is required for the television 1 to request the display data generating apparatus 2 for display data via the communication network and acquire the requested display data therefrom. Therefore, it is not possible to quickly response to the user's instruction by such a configuration that the acquisition of the display data to display is started when the user instruction to display the display data is received. Thus, such a configuration is not convenient for the user.

This can be improved such that if the display screen (display data) to be displayed next is predictable, the television 1 acquires the second display data (to be displayed next) in advance while the first display data is being processed. With this configuration, it is possible to immediately display the next display screen based on the display data that is acquired in advance and stored in the television 1. This attains a higher response time of the display data display process, thereby maintaining the user's convenience.

(2) Control of Display Data Management Function

The television 1 manages in the display data storage section 51 the display data acquired from the display data generating apparatus 2. More specifically, the display data is stored in the display data storage section 51 or the display data determined to be unnecessary is deleted from the display data storage section 51 in response to the events detected by the event processing section 11.

With a control script defining how to manage the display data, it is possible to control the display data managing function of the display data storage section 51 of the television 1. For example, the control scripts may define that the acquired display data is stored in the display data storage section 51 undeletably. The control scripts may define that the display data will be deleted from the display data storage section 51 when the display data is processed (displayed) a certain number of times. Or, the control scripts may define that a certain display data stored in the display data storage section 51 is deleted.

As described above, the acquisition of the display data from the display data generating apparatus 2 requires a certain time. Thus, it is preferable to store frequently used (displayed) display data in the display data storage section 51.

To attain this, the display data generating apparatus 2 sends the display data frequently used in the television 1 to the television 1 together with a control script defining that the display data is stored undeletably in the display data storage section 51.

Following the control script, the television 1 can store the frequently used display data in the display data storage section 51 always. This reduces the amount of communication with the display data generating apparatus 2 thereby increasing the response speed of the display data display process.

The display data generating apparatus 2 may count the usage frequency of each display data for the television 1, and determine how to store the display data according to the usage frequency and generate the control script based on the determination. The television 1 transmits the display data usage information to the display data generating apparatus 2 every time the display data is used (displayed). The display data generating apparatus 2 can manage the usage frequency for each display data by accumulating the display data usage information sent from the television 1.

The configuration of the display data generating apparatus 2 for generating the control script according to the usage frequency is similar to that is described in Embodiment 1 (Modification Example 1—Change Order of Display of Operation Items). Thus, the explanation thereof is omitted here.

Embodiment 5

Modification Example 5

Addition of Visual and Audio Effect to Thumbnail Montage/Slide Show Display

In the network album system 100 of the present invention, the display data generating apparatus 2 can give the television 1 the following function to the television 1 by supplying a control script to the television 1. That is, functions of outputting a visual effect and an audio effect according to the contents (album or picture) of the display screen being displayed on the television 1 are added to the television 1.

The control script generating section 80 of the display data generating apparatus 2 may be arranged to generate the control script that further defines an operation of outputting an effect or sound in displaying a certain album (or picture or moving picture), thereby making a visual (and audio) effect in displaying the certain album. The effect is a visual effect that is added to an object (e.g., a picture of the album displayed by the slide show) when the object is displayed (or disappeared).

More specifically, the effect may be fade-in (fade-put) slide-in (slide-out), magnification, blinking, or the like. Moreover, the effect encompasses effects such as animation (such as moving around) added to an object (such as an animation character) other than the picture, zooming the animation character, panning or scrolling the display screen, etc.

In the present embodiment, for example, information the sound file and the effect is managed by using the album information table as illustrated in FIG. 20 such that the information of an sound file is managed per album and the information of the effect is managed per picture.

The column "sound file name" indicates the file name of the sound file associated with the album. The sound file is used to output a sound (music or sound effect) in performing the thumbnail montage display and the slide show display of the album on the television 1.

The column of "effect ID" indicates effect ID for identifying the effects associated with the pictures included in the album. The display data generating apparatus 2 writes in the control script the operation of television 1 regarding the effect, so that the television 1 executes the effect identified by the effect ID.

Figure 46:
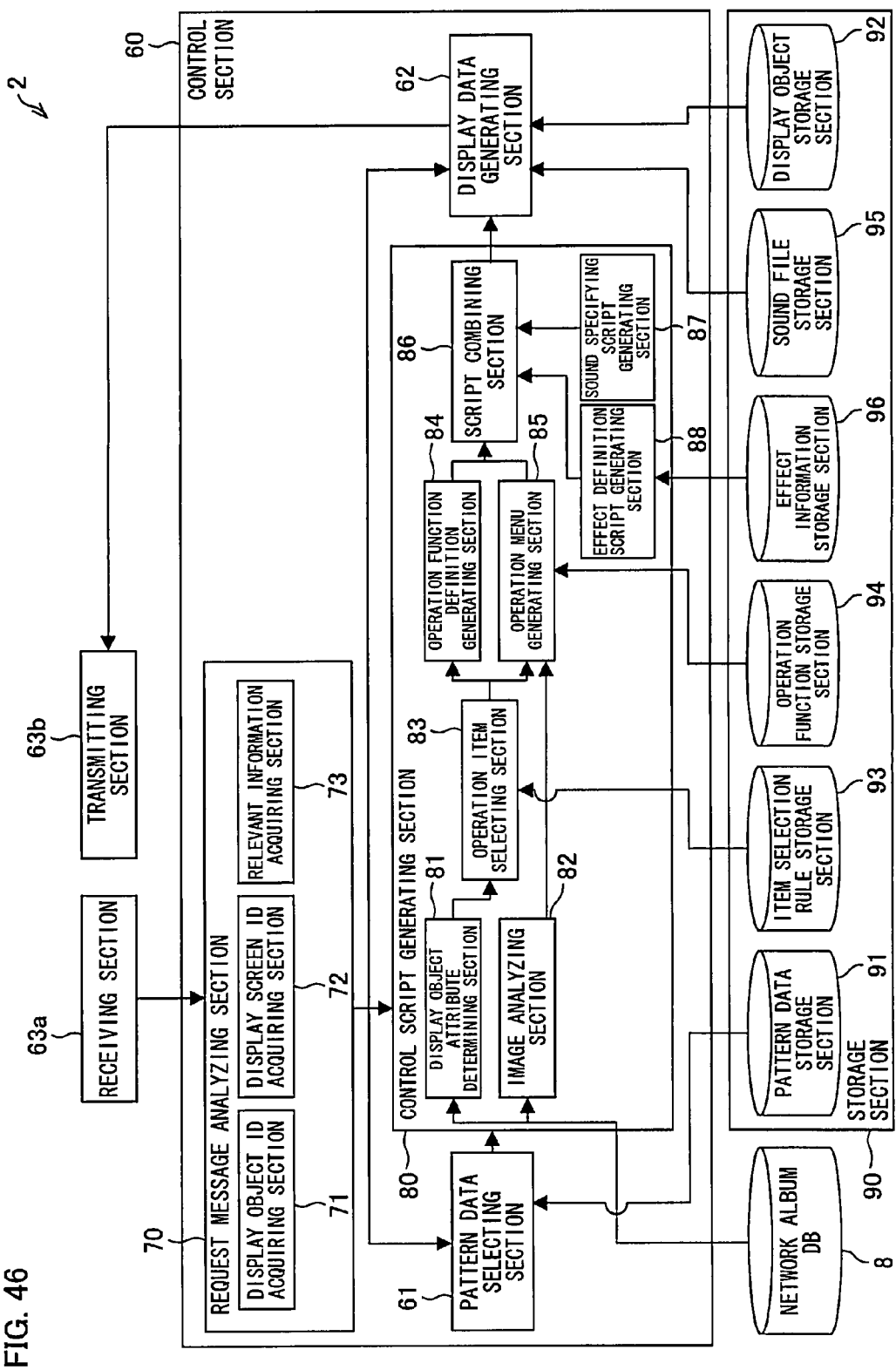
FIG. 46 is a block diagram illustrating main part of the display data generating apparatus for generating the display data to which a visual and an audio effect are added.

FIG. 46 is a block diagram illustrating main part of a configuration of the display data generating apparatus for generating display data to which the visual and audio effects are added. The display data generating apparatus of FIG. 46 is different from the display data generating apparatus of FIG. 18 in that a control script generating section 80 further includes a sound specifying script generating section (control script generating means) 87 and an effect definition generating section (control script generating means) 88, and that a storage section 90 further includes an sound file storage section (effect information storage section) 95 and an effect information storage section (effect information storage section) 96.

The sound specifying script generating section 87 has a function of generating a sound specifying script that includes link information of the sound file that is to be outputted along the display of the album. The effect definition script generating section 88 has a function of generating an effect definition script based on the effect definition information stored in the effect information storage section 96, the effect definition script being executable by the television 1.

The sound file storage section 95, has a function of storing the sound file. The sound file is stored a file format (e.g., midi format) processable by the television 1). The television 1 acquires the sound file from the display data generating apparatus 2, and outputs the acquired sound file to the audio output section 17 via the audio output control section 25 (FIG. 1).

As an alternative, the display data generating section 62 may include the sound file in the display data 7 and supply the display data including the sound file to the television 1.

The effect information storage section 96 has a function of storing the effect definition information that defines the effect (a visual effect). FIG. 47 is a view illustrating an example of the effect definition script stored in the effect information storage section 96.

In the example of FIG. 47, each effect is provided with 6 columns.

In column C21 "effect ID", the effect ID is shown. In column C22, a name (Attribute Name) of the effect is indicated. For example, effect name "Fill-opacity" is an effect for changing opacity of the object (here, picture).

The "dur" in column C23 indicates a time period in which the effect is applied (here, in the unit of seconds). For example, when "dur" is "3" sec., this means that the effect (for changing the opacity) is carried out over 3 sec.

The "from" in column C24 indicates an initial value of the object. More specifically, the "from" indicates the opacity of the picture before the effect is applied. When the "from" is "0.8", this means that the picture is displayed initially with the opacity of 0.8. As the opacity is smaller, the object is displayed more transparently.

The "to" in column C25 indicates a final value of the object. That is, the "to" indicates the opacity of the picture after the effect is applied for the time period indicated in the "dur". When the "to" is "0", this means that the opacity of the picture is changed to 0.

The "end" in column C26 indicates a key (button) to which a function of stopping the effect is allotted in the television 1. The value to the "end" designates one of the keys of the operational section 13 of the television as illustrated in FIG. 1. If the key of the operational section 13 which is specified by the "end", the television 1 stops the execution of the effect.

For example, when the effect of effect ID "effect00" as illustrated in FIG. 47 is applied to the picture, the television 1 follows the contents of the effect definition script to carry out the slide show of the picture during which the opacity of the picture is changed from 0.8 to 0 over 3 seconds. If the button of "y" (yellow button) is pressed by the user's operation during the time period, the effect is stopped.

In FIG. 47, three kinds of effect definition scripts are exemplified. The present invention is not limited to these, and various kinds of effect definition scripts can be stored in the effect information storage section 96.

The television 1 carries out the above-mentioned operation according to the operation function definition script 132 written in the operation content definition script 113 (FIG. 3).

Next, the operation of the display data generating apparatus 2 for generating the control script to which visual and audio effects are added is described in more details. The following described the operation referring to an example in which, in response to the request from the television 1, the display data generating apparatus 2 generates the display data 7 for the slide show display. Note that the present invention is not limited to this, and the display data 7 to which visual and audio effects are added may be generated in other cases, such as the case of displaying the thumbnail montage.

Figure 48:
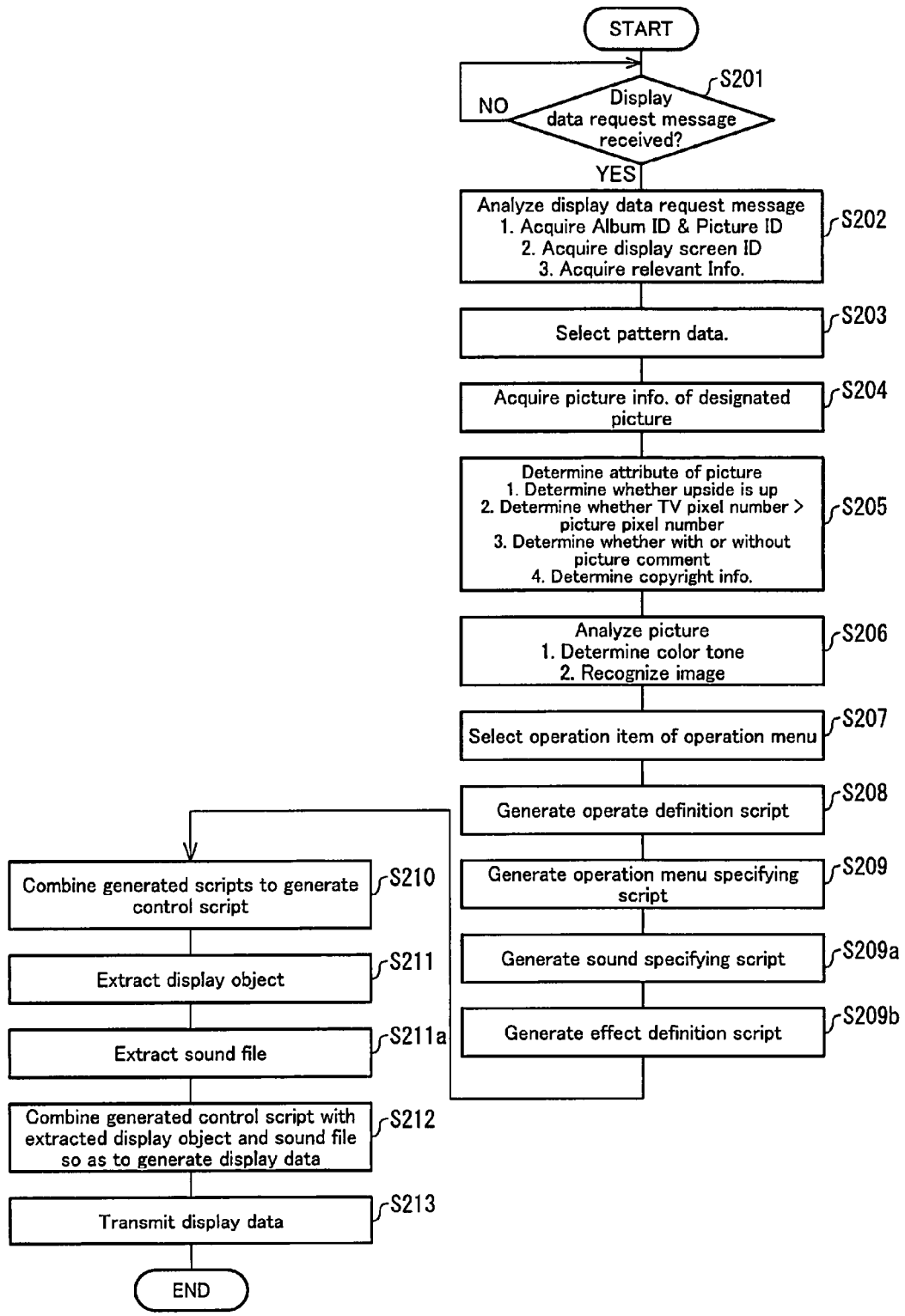
FIG. 48 is a flow chart illustrating a flow of the process for generating the display data, performed by a display data generating apparatus in still another embodiment of the present invention.

FIG. 48 is a flow chart illustrating a flow of the process for generating the display data of the display data generating apparatus 2 in the present embodiment. The flow of FIG. 48 is different from that of FIG. 27 in that, before the script combining section 86 combines the scripts at S210, the sound specifying script generating section 87 of the control script generating section 80 generates the sound specifying script and the effect definition script generating section 88 generates the effect definition script, and in that the display data generating section 62 extracts the sound file in addition of the display object at S211. Note that the processes at S201 to S213 are performed similarly to those in FIG. 27, except that the extracted sound file is also included in the display data. Thus, their explanation is omitted here.

Figure 49:
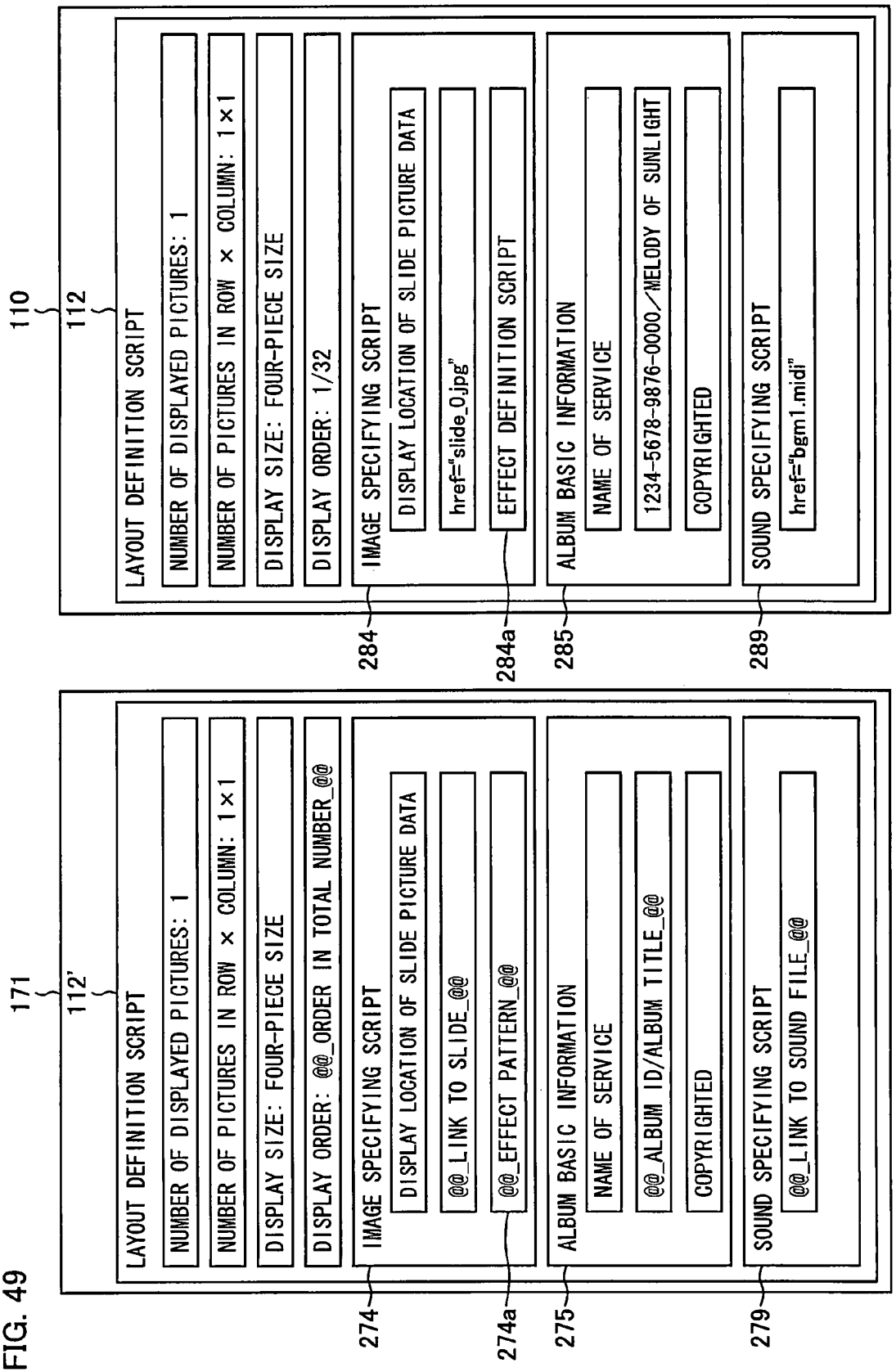
FIG. 49 is a view illustrating examples of layout definition scripts respectively contained in the pattern data and the control script in the still another embodiment of the present invention.

FIG. 49 is a view schematically illustrating an example of a layout definition script 112' and a layout definition script 112, which are respectively included in pattern data 171 stored in the pattern data storage section 91 and a control script 110 in the present embodiment.

In the present embodiment, the pattern data 171 is acquired from the pattern data storage section 91 by the pattern data selecting section 61 of the display data generating apparatus 2, and the layout definition script 112' in the pattern data 171 further includes an image specifying script 274, an album basic information 275, and a sound specifying script 279. Moreover, the image specifying script 274 includes, in association with the picture of the slide show, an effect pattern 274a, which is a template of an effect.

Note that, the image specifying script 274 (284) and the sound specifying script 279 (289) are specific examples of the display object specifying script 121, while the album basic information 275 (285) is a specific example of the attribute information specifying script 123.

After S209 (FIG. 48), the control script generating section 80 generates the sound specifying script 289 by embedding a sound file name (that is, link information of the sound file) in the sound specifying script 279 as illustrated in FIG. 49 (S209a). From the album information table stored in the network album DB 8, the sound file name to be embedded is extracted referring to the album ID (and picture ID) that has been acquired by the display object ID acquiring section 71. Assume that it is determined to perform the slide show display of the first picture in the album of album ID "01254782 25142584" in the example illustrated in FIG. 20. In this case, the control script generating section 80 extracts a sound file name "bgm1.midi" referring to the album ID, and embeds link information of the sound file in the sound specifying script 279. Following the sound specifying script 289 thus generated, the television 1 can acquire the sound file "bgm1.midi" from the display data generating apparatus 2 and reproduce the sound file "bgm1.midi" during the slide show display.

Next, the control script generating section 80 embeds the attribute information of the effect in the effect pattern 274a thereby generating the effect definition script 284a (S209b).

Figure 50:
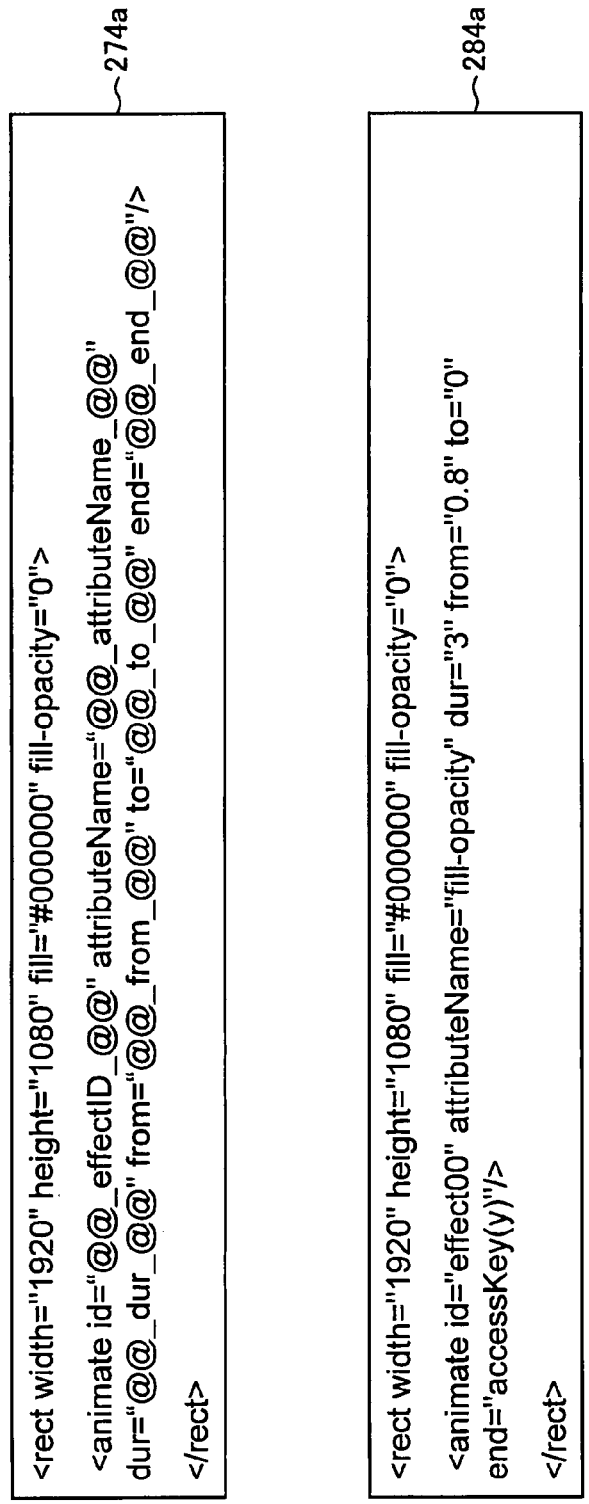
FIG. 50 is a view illustrating specific examples of the effect pattern 274a and the effect definition script 284a illustrated in FIG. 49.

FIG. 50 is a view illustrating specific examples of the effect pattern 274a and the effect definition script 284a illustrated in FIG. 49. The portions sandwiched by "@@_" and "_@@" correspond to the respective pieces of the attribute information of the effect (column C21 to C26) in the effect definition script table illustrated in FIG. 47. That is, the control script generating section 80 extracts six kinds of the attribute information from the respective columns, and embeds the attribute information in the part "@@_* *_@@", thereby to generate the effect definition script 284a.

Using the example illustrated in FIG. 20, these are explained below more specifically. Assume that it is determine to perform the slide show display of the first picture (picture ID=No. 1) of the album of album ID "01254782 25142584" based on the display data request message 6. Referring to the album ID and the picture ID, the control script generating section 80 finds the effect to add. In the above example, the album ID and the picture ID are associated with effect ID "effect00". Thus, the effect of effect ID "effect00" is designated to be added to the picture.

Next, referring to the effect ID thus identified, the control script generating section 80 extracts the attribute information of the effect from each column of the effect definition script table of the effect information storage section 96. The control script generating section 80 embeds each pieces of the extracted attribute information in the corresponding parts of the pattern data thereby generating the effect definition script 284a. In the effect definition script 284a of FIG. 50, it is described that a white square figure overlapping on the picture, which is the object to be displayed, is changed in its opacity from 0.8 to 0 over 3 sec. Further, the description allots the function of stopping the changing process to the yellow key (key(y)) of the operational section 13 of the television 1, so that the changing process will be stopped in response to the pressing of the yellow key.

Finally, the display data generating section 62 generates the display data 7 by combining (a) the control script 110 generated by the control script generating section 80, (b) the display object 111 (slide picture), and (c) other object (sound file, and/or the like).

In this way, the television 1, which acquired the display data 7, can presents to the user the thumbnail montage or the slide picture with audio and/or visual effect according to the control script 110 in which the sound specifying script 289 and/or effect definition script 284a is included. More specifically, if the slide show display data includes the effect definition script 284a at S11 of FIG. 5, the television 1 displays the picture as instructed in the effect definition script 284a.

In the present embodiment, the control script 110 may specify when the effect process starts. For instance, in the above example where the effect is added to the display/disappearance of the picture, the control script 110 describes that the effect process is triggered when the picture is switched (displayed/disappeared). As an alternative, in case of the thumbnail montage screen, to add such an effect that a thumbnail picture with a cursor is distinguished, e.g., zoomed up, the control script 110 may specify that the placing the cursor on the thumbnail picture triggers the effect process.

Moreover, as described above, it is possible to designate a target of the effect per object by describing the effect in the control script 110. With this arrangement, a region to which the effect process is added can be restricted to a region of the object, but not to the full screen. In this case, it is possible to reduce the load of the effect on the television 1 significantly, than a case the full screen is subjected to the effect process.

The slide show display data may be such that each piece of display data for each picture does not include a sound specifying script 289. For example, the control script 110 may be such that the display data for displaying the first picture includes the sound specifying script 289 and the sound specifying script 289 defines the sound to be reproduced in displaying the subsequent pictures as well.

Moreover, as described above, in the present embodiment, the display data generating apparatus 2 writes the effect definition script 284a to describe the operation of stopping the execution (effect process) of the effect in association with the event of pressing the yellow key. By this, the user can cause the stopping of the effect process at a desired timing by the key operation.

If the effect is process while the slide show display data is being processed, this put more work load on the television 1. This causes such a problem that response to the user's key operation is delayed resulting in poor operationally. This is because the effect process generally put a large work load on the CPU.

However, with the above-described arrangement, the television 1 stops the effect process and right after that displays the picture to be displayed. Thus, the effect process not desired by the user can be omitted so as to reduce the work load of the television 1, thereby attaining a high process efficiency of the television 1.

The event that triggers the stopping process is not limited to the pressing the yellow key. For example, the control script generating section 80 may write the script so that the stopping of the effect process is triggered by "calling a GUI screen of the operation menu".

Moreover, in case where the yellow key is allotted with the function of calling (displaying) the GUI screen of the operation menu, the "pressing of the yellow key" may be set as the condition to cause the stopping the effect process (end="accessKey(y)"). This is equivalent to such a description that associates the stopping of the effect process with the "calling the GUI screen of the operation menu".

If some key operations instruct to move forward to the next slide or backward the previous slide, the script may be written to move to a designated slide right after the effect is stopped.

Further, if the user does not wish the execution of an effect, which will add an extra work load on the television 1, it may be arranged such that a GUI screen showing an operation menu from which the user can select whether to add the effect. In this case, the script is so written that the effect process will not be performed on the television 1 when the user selects not to add the effect.

The control script 110 may be so written that, without calling the operation menu, a simple operation such as pressing a key on the operational section 13 of the television 1 can switch whether to add the effect.

FIG. 51 is a view illustrating a specific example of the control script 110 including the operation function definition script 132 that defines the operation of the television 1 such that, in response to the user's key operation, the television 1 switches whether to add the effect.

In the example illustrated in FIG. 51, control script 110 includes the effect definition script 284b, an operation function definition script 132e for controlling the execution of the effect definition script 284b, and an operation function definition script 132f that defines switching of the operation of the contents of the operation function definition script 132e in response to the user's operation.

The operation function definition script 132e defines that the effect defined in the effect definition script 284b is executed if an effect flag defined in the operation function definition script 132e is "1" at initialization of the process of the display data 7.

The operation function definition script 132f defines the operation of switching the effect flag in response to pressing a blue key (key(b)) of the operational section 13.

By following the control script 110 as such, the television 1 can switch whether to add the effect, in response to the pressing of the blue key by the user.

The description of the control script 110 is not limited to the example of FIG. 51, in which whether to add the effect is controlled by chaining the attribute "visibility" of the effect definition script 284b. For example, the television 1 may invalidate the effect, following a script that describes an operation of changing the value of the attribute "display" of the effect definition script 284b to "none". In this case, the television 1 can write the image data in the storages faster than the case where the writing is carried out for the whole SVG regarding the attribute visibility.

Moreover, the present invention is not limited to the example where a display image such as a picture is displayed with the effect or sound. Such an effect or sound may be added to a moving picture that is displayed by thumbnail montage display or the slide show display.

Moreover, the present invention is not limited to the above explanation, in which one effect process is defined for one object. It is possible to write the control script 110 to includes a plural kinds of effect definition scripts. In addition to allowing the user to select, from the menu, whether to validate or invalidate the effect, this arrangement allows the user to select an effect to added to the object from among the plural kinds of the effects as he desired.

For example, two animations (two effects) of an animation character are prepared respectively for boys and girls with spring as theme. The control script 110 is prepared to contain definitions of the two animations. Following the control script, the television 1 can add the animation selected from among the two animations by the user to the animation character (display object) in displaying the animation character.

Moreover, albeit the present embodiment is so configured that the display data generating apparatus 2 has the effect definition script table and the effect definition script is supplied the television 1 by being included in the display data 7 supplied thereto, the present invention is not limited to the present embodiment. A similar effect can be attained by arranging that the television 1 has the effect definition script table. In this arrangement, it is sufficient that the display table generating apparatus 2 writes a script that associates the effect ID with the pictures in order to indicate which effect is to be added to which picture.

Referring to the effect ID included in the display data 7, the television 1 looks up the effect definition script table stored in the television 1. Thereby, the television 1 can appropriately add an effect to a picture and show the picture to the user.

This makes it possible to realize a network album system which can provide an album content in various way so that each user can enjoy it in his own way to suit his taste.

Modification Example 6

Text Display Process When Effect is Validated

In case where the slide show display of the pictures of the album to which the effect is added in the way described above, the television 1 would perform a text display process in addition to the image data formation picture to which the effect process is added. The text display process is a process for displaying text data in such a manner that the text data overlaps the picture, the text data being included in the display data 7.

Figure 52:
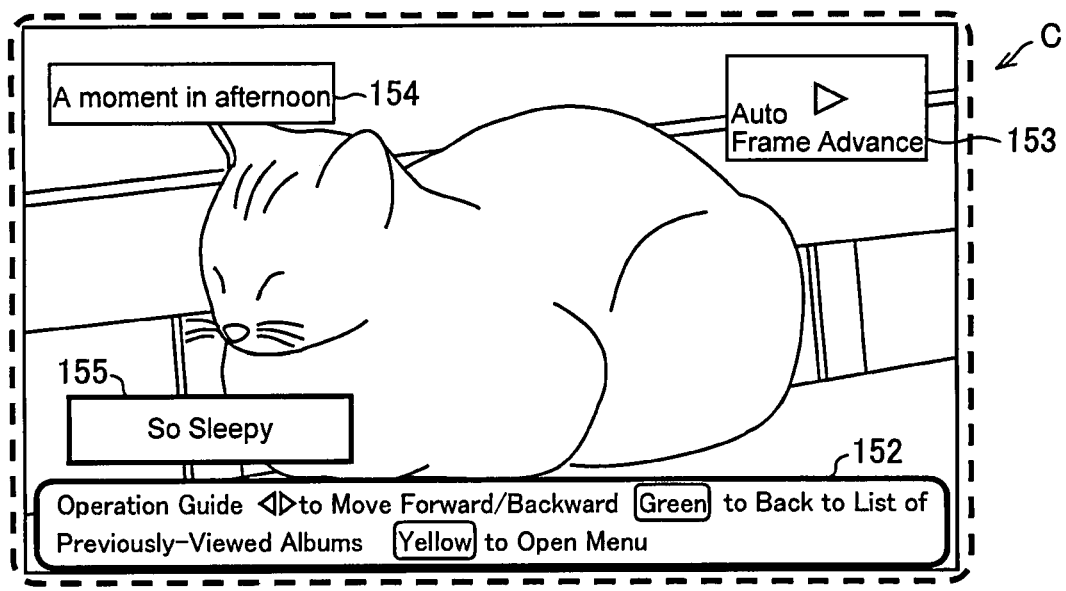
FIG. 52 is a view illustrating an example of the slide show display screen to be displayed on a display section of the television.

FIG. 52 illustrates an example of the slide show display screen that is displayed on the display section 15 of the television 1. As illustrated on FIG. 52, the slide show display screen is displayed in such a manner that operation information 152 for showing an operation guide of a remote controller, a reproduction state display 153 for showing reproduction state of the slide show, a picture title 154, and a comment 155, which is added to the picture are displayed in addition to the display of the picture. In the layout definition information of the display data 7, these texts are written as text data. These texts are displayed by processing the display data 7 by the television 1.

The text display process is a process that requires relatively high work load, like the effect process. In case where the television 1 performs a slide show display process in which an effect is validated, the television 1 should perform both the effect process and the text display process every time the image data formation of a slide is performed. In this case, the addition of the work load for the text display process would hinder smooth execution of the effect process added to the picture display, or result in poor response to the key operation from the remote controller (operation section 13). This would result in poor user's friendliness.

In the present embodiment, the slide show display process in which the effect is validated, the work load put on the television is divided, so as to let the television 1 operate smoothly.

[Control Script for Dividing Work Load]

In the present embodiment, execution timings of the processes of the television 1 are controlled by using a control script, so that the effect process and the text display process will not be performed concurrently by the television 1. More specifically, the control script is so written that, in case where the effect is validated, the text display process is started after the effect process is finished.

FIG. 53 is a view illustrating a specific example of the control script 110, which defines the operation of the television 1 such that the text display process is started after the effect process is ended.

In the example of FIG. 53, the control script 110 includes an operation function definition script 132*g*, the effect definition script 284*b*, and a display object specifying script 121*a*.

The display object specifying script 121*a* is a text specifying script for specifying the text data to be displayed.

In the operation function definition script 132*g*, a script for instructing the execution of the text display process, and a script for defining the execution timing of the text display process. More specifically, the operation function definition script 132*g* defines the operation of the television 1 such that the text specified by the display object specifying script 121*a* is displayed when the effect process of the effect definition script 284*b* is finished.

The script may define that the timing of finishing the effect process is completion of the effect process or interruption of the effect process by user's operation or other cause.

If the television 1 should perform both the effect process and the text display process according to the control script 110, the television 1 can deal with both the processes in such a manner that the television 1 executes the effect process and then the text display process. That is, this arrangement allows time division of the processes of large work loads. This avoids concentration of the work loads at one time, and makes it possible to execute the added effect process smoothly. Or, this can solve the problems such as poor responding to the key operation of the remote controller (operation section 13).

The present invention is not limited to the above-explanation which discusses the text display process as a high-load process that requires time division, by way of example. The display data generating apparatus 2 can write in the control script 110 any high-load process, which is preferably executed non-concurrently with the effect process. For example, the display data generating apparatus 2 may write the control script such that the execution of the effect process is stopped when the operation menu display process (which is explained in Embodiment 1) is started.

[Configuration of Display Data Generating Apparatus]

In the present embodiment, the display data generating apparatus 2 (FIG. 46) generates the display data 7 including the effect process, in response to the request from the television 1.

In this case, the display data generating apparatus 2 generates a control script 110 that defines the operation (and the timing of the operation) of the television 1 such that the process that should not be performed during the effect process is carried out after the effect process. For the high-load process that should not be carried out during the effect process, the pattern data storage section 91 stores pattern data in advance, which pattern data describes the timing of the high-load effect such that the high-load effect should not be carried out concurrently with an effect process. More specifically, the pattern data selecting section 61 can select, from the pattern data storage section 91, the pattern data including the script describing that the text display process is carried out after the effect process, and the script describing that the effect process being executed should be stopped when the operation menu display process is started. The control script generating section 80 generates the control script 110 by using the pattern data.

In this way, the television 1 can be controlled such that the high-load process such as the text display process, the operation menu display process, etc., and the effect process are executed at the different timings. By this, the user can operate the television 1 smoothly by avoiding the concentration of the work load on the television 1 at one time.

As an alternative, a list storing the association between the high-load process and its start and end timings is registered in the storage section 90 in advance. To generate a control script including the process registered on the list, the control script generating section 80 generates the control script referring to the list so that the process should be executed (or stopped) at the timing associated with the process.

The display data generating apparatus 2 can generate the control script of the effect process according to the content of the received display data request message 6.

For example, when the display data request message 6 including the machine name and software version information as illustrated in FIG. 7 is received, the display data request message 6 is forwarded to the relevant information acquiring section 73.

The information regarding the machine type, software version and the function associated with them is stored in the storage section 90 in advance. Therefore, the display data generating apparatus 2 (pattern data selecting section 61/control script generating section 80) can find out the functions of the television 1, referring to the machine name and the software version information. More specifically, the display data generating apparatus 2 can find out whether the television 1 has the function of outputting the visual effect (effect process) and the audio effect (sound effect, music, etc.).

Only if it is found that the television 1 is of the type that can perform the effect process or the audio output during the slide show (or thumbnail montage) of the pictures of the network album, the control script generating section 80 generates the control script for performing the effect process and/or the audio output. As an alternative, if it is found that the television 1 is of the type that can perform the effect process or the audio output, the pattern data selecting section 61 selects the pattern data including the script for performing the effect process or the audio output.

On the other hand, if it is found that the television 1 is of a type that cannot perform the effect process or the audio output, the description regarding the effect process or the audio output is not necessary. Thus, the control script generating section 80 generates the control script for the slide show display (or thumbnail montage display) of the pictures without including such description.

In this way, the display data generating apparatus 2 generates the control script according the specification of the television 1 in such a manner that unnecessary description is omitted from the control script, and the control script is always most appropriate for the television 1 that requesting the display data, and the display data generating apparatus 2 can provides such a control script to the television 1.

Embodiment 6

Modification Example 7

Function of Television 1 for Changing Control Script

The embodiments discussed above describe the configurations of the network album systems 100 in which the control script generating section 80 of the display data generating apparatus 2, which acts as the server for providing the display data, and generates the control script based on the pattern data, and the television 1 operates according to the control script.

The network album system 100 of the present invention is not limited to the configuration. The television 1 as the client receiving the display data 7 may be configured such that the television 1 changes part of the control script provided from the display data generating apparatus 2, and operates according to the control script thus changed.

More specifically, the control script provided from the display data generating apparatus 2 includes an operation content definition script 113 that defines the operation of the television 1 such that the television 1 can change part of the control script or replace a value in the script with another value.

The display data execution processing section 40 of the television 1 can change part of the control script or replace a value in the script with another value, according to the operation content definition script 113, and referring to the information stored in the television 1 in advance.

In the operation content definition script 113 in the control script provided from the display data generating apparatus 2, a reference script is included. The reference script instructs how to refer to or acquire the information of the television 1, which is a client. Part of the control script 110 is replaced with or appropriately changed based on the information thus referred or acquired. According to the reference script, the display data execution processing section 40 of the television 1 acquires the designated information stored in itself, and forwards the acquired information to, for example, the layout definition script 112 as a variable value. As a result, the information acquired from the television 1 itself is embedded in the control script, thereby completing the control script that is to be actually executed (to be displayed) by the display data execution processing section 40.

With this, not only the display data 7 specified on the server side, but also the display data changed on the client side can be provided to the user. Thus, it is possible to provide the each apparatus and the user thereof on the client side with a service customized more specifically to the apparatus and/or the user. Thus, it is possible to structure a network album system 100 that can flexibly deal with needs of the users, which needs are variously different among the users.

In the following, the operation of the television 1 is described referring to an example where the previously-viewed album screen 440*a* illustrated in FIG. 44(*a*). According to the reference script, the television 1 changes part of the control script received from the display data generating apparatus 2, and displays the previously-viewed album screen according to the changed control script.

Application Example 1

To Change the Number of Previously-Viewed Albums to be Displayed

As illustrated in FIG. 6, the television 1 stores in the album ID storage section 53 the album ID of the albums that have been previously viewed by the user (here, three albums that have been viewed most lately are displayed). In requesting the display data generating apparatus 2 to provide the display data 7 for displaying the previously-viewed album screen, the television 1 sends the display data generating apparatus 2 the album ID stored in the album ID storage section 53 (by including the album ID in the display data request message 6).

Based on the display data request message 6, the display data generating apparatus 2 generates the display data 7 of the previously-viewed album screen for displaying information of the three albums that have been viewed most lately are displayed on the television 1. Then, the display data generating apparatus 2 provides the generated display data 7 to the television 1. The display data 7 includes a control script that defines a layout of the previously-viewed album screen, operation of the television 1 necessary for displaying the screen, etc.

In the present embodiment, the television 1 changes part of the control script if the television 1 receives the control script that includes the operation content definition script 113 having the reference script. According to the operation content definition script 113, the television 1 changes the part of the control script by using the data stored in the television 1 itself. FIG. 54 is a view illustrating a concrete example of the control script including the reference script. The reference script 160 instructs to acquire a value of the "number of previously-viewed albums" in the setting information and uses the value as the variable value "h_max". The television 1 acquires the information of the "number of previously-viewed albums" stored in a relevant information table as illustrated in FIG. 8.

In the example illustrated in FIG. 8, the television 1 detects that the number of previously-viewed albums is "two". Thus, the television 1 changes the control script such that only two previously-viewed albums are listed up on the display screen. More specifically, the attribute of the visibility in the previously-viewed album information is changed to "hidden".

Further, the television 1 may change the control script such that the function of selecting an album is invalid, the function being allotted to a number key for selecting an album from the previously-viewed album screen. That is, because only two previously-viewed albums are to be listed on the display screen here, the control script is changed such that only the numerical keys "1" and "2" are valid. In this way, the television 1 can change the control script of Embodiment 3 based on the number of the previously-viewed albums to be listed on the display screen, the control script defining the association of the buttons and the operations that should be operated when the buttons are pressed.

FIG. 55 is a view illustrating a specific example of the control script, part of which is changed after being received from the display data generating apparatus 2. A visibility attribute 161 surrounded by the broken-line frame is "visible" when it is supplied to the television 1 and before the change. After the television 1 changes the visibility attribute 161 to "hidden" according to the setting information "the number of previously-viewed albums" (="2").

Figure 56:
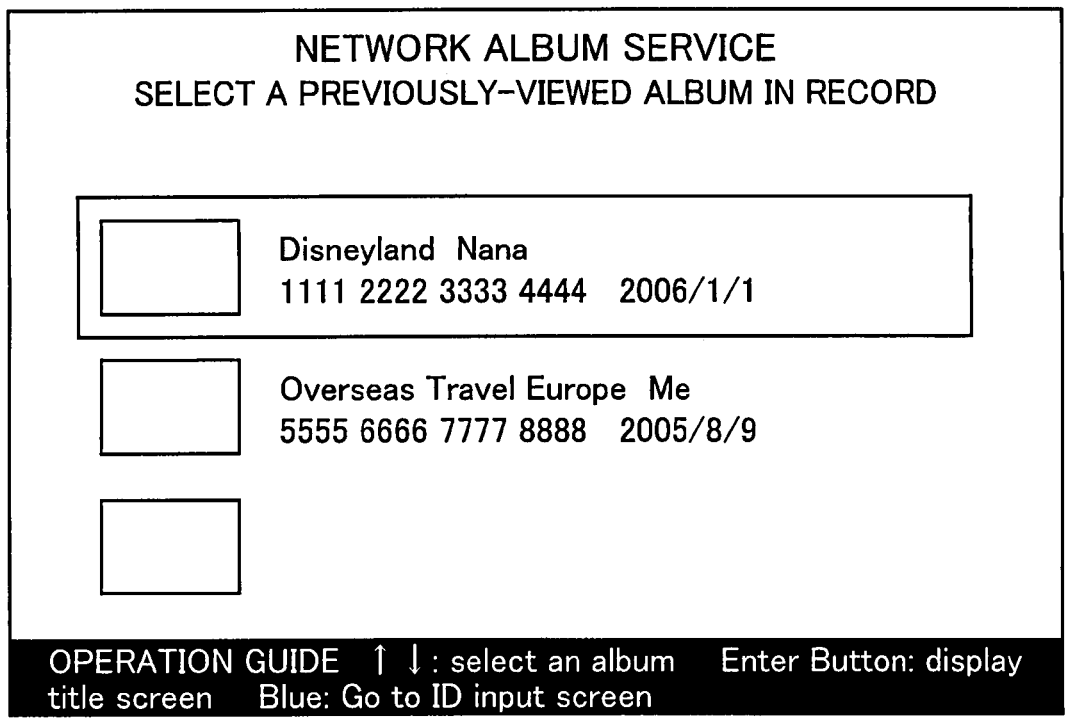
FIG. 56 is a view illustrating an example of a previously-viewed album screen display by the display data execution processing section according to the control script changed by the television.

According to the changed control script, the display data execution processing section 40 executes the display data 7 of the previously-viewed screen, thereby to output the previously-viewed screen on which only two number of previously-viewed albums are listed as described in the setting information (FIG. 56). Further, the control script is partly changed such that when the previously-viewed screen of FIG. 56 is being displayed, the numeral key "3" is invalid and thereby the third row cannot be selected.

As described above, the part of the control script for displaying the previously-viewed screen can be changed by the television 1 according to the setting information stored in the television 1, so as to change the number of the albums to be listed on the display screen from the number set in the control script as supplied from the display data generating apparatus 2.

Application Example 2

To Display Album All Time, which is Designated by User

In the present embodiment, the album ID storage section 53 of the television 1 can store the album ID of an album that is listed, regardless of when it was viewed, on the previously-viewed album screen always in addition of the album ID of the albums that have been viewed most lately. Here, it is set such that always-display setting of the album is valid. This setting may be stored in the relevant information table illustrated in FIG. 8. By this, the album that is always on the list instead of the third album regardless of when it is viewed is always on the previously-viewed album screen and the user can select such an album therefrom.

The television 1 receives the display data by which the previously-viewed albums are listed on the display screen in a descending order of how recently the albums were viewed. As illustrated in FIG. 57, the display data 7 includes the reference script 162 that instructs to refer to the album ID (stored in the television 1) of the album that is to be listed on the previously-viewed album screen always. Following the reference script 162, the television 1 acquires the album ID of the album (always-listed album) that is to be listed on the previously-viewed album screen always. If the setting for listing such an always-listed album on the previously-viewed album screen is validated, the television 1 changes part of the current control script of the previously-viewed album screen. More specifically, for example, the previously-viewed album information that will list the third previously-viewed album is replaced with the previously-viewed album information with that of the album that is to be listed on the previously-viewed album screen always.

FIG. 58 is a view illustrating a specific example of the control script in which the third previously-viewed album has not been replaced by the television 1, and a specific example of the control script in which the third previously-viewed album is replaced by the television 1.

As instructed by the reference script 162 as illustrated in FIG. 57, the television 1 acquires the album ID of the album that is to be listed on the previously-viewed album screen always. Then, as instructed by the following control script, the third previously-viewed album information 163a is replaced with the previously-viewed album 163b that is to be listed on the previously-viewed album screen always.

The display data execution processing section 40 executes the display process of the previously-viewed album screen according to the control script changed by the replacement. Thus, the previously-viewed album screen on which the information of the always-listed album is displayed instead in the third row in which the setting for listing such an always-listed album is validated.

As described above, the television 1 can change the display content by changing (replacing) part of the control script such that the album is listed on the previously-viewed album screen, the album being designated by the information on the always-listed album as an album to be listed always on the previously-viewed album screen.

There is no particular limitation as to which album is replaced with the always-listed album. The control script that is sent from the display data generating apparatus 2, i.e., that has not been changed (subjected to the replacement) may be written to specify which album is to be replaced with the always-listed album.

The present invention is not limited to the above explanation which describes the configuration in which the television 1 changes (replace) the part of the control script, discussing the previously-viewed album screen by way of example. The configuration in which the television 1 changes (replace) the part of the control script may be combined with those described in the above embodiments.

In each embodiment, part of the control script acquired from the display data generating apparatus 2 may be changed by the television 1 according to various information available from the television 1.

For example, in Embodiment 1, the television 1 receives the display data 7 for displaying the operation menu according to the display content. By applying the present embodiment to Embodiment 1, part of the control script included in the display data 7 can be changed by the television 1 according to various information of the television 1 (for example, the relevant information table of FIG. 8) that the television 1 acquires from itself. For example, if an operation menu item for defining an operation unsuitable with the specification of the television 1 is included, the television 1 can delete the operation menu item from the control script. By this, the television 1 can display operation menu items suitable with the specification information of the television 1.

The information stored in the television 1 and acquired by the television 1 from itself according to the reference script is not limited to the information exemplified above. The television 1 can acquire any information stored in the television 1 and forward it, as a variable, to the layout definition script 112. For example, the information may be: text data such as the album ID, album title, etc.; index image of the albums; or the like. In displaying the previously-viewed album screen, the part of the control script supplied from the display data generating apparatus 2 can be replaced with the title or the index image acquired from the television 1, so that a new previously-viewed album screen can be displayed.

Moreover, the control script for describing the effect or the sound, which is to be outputted together with the album (picture) may be changed by using the information stored in the television 1.

Application Example 3

To Output a Particular Visual and Audio Effect Always

In the present embodiment, an album information table illustrated in FIG. 20 is stored in the television 1 on the client side. That is, looking up the album information table stored in itself, the television 1 can specify the effect and sound that are associated with the album or the picture to be displayed. Here, it is not necessary that the album information table stored in the television 1 be identical with that stored in the network album DB 8, which is looked up by the display data generating apparatus 2 in generating the control script. For example, in the television 1, an effect or a sound, which is particularly liked by the user, is stored in association with a particular album (or picture). By this, the television 1 can appropriately select the effect or sound, which is particularly liked by the user, and output the effect or sound together with the album (picture).

From the display data generating apparatus 2, the television 1 receives the display data 7 that the television 1 requested. Here, it is assumed that the display data 7 is for displaying the slide show display screen, and contains a control script that defines an operation for outputting a picture and a sound/effect (first sound/effect) in association with the picture. Furthermore, the control script contains an operation content definition script 113 containing a reference script, and defining an operation by which the sound/effect to be outputted is replaced with the sound/effect managed in the television 1.

Following the reference script, the display data execution processing section 40 acquires, from the album information table stored in the television 1, the sound/effect (second sound/effect) associated with the picture to be displayed. Then, following the reference script, the display data execution processing section 40 replaces the first sound/effect with the second sound/effect.

By this, the display data execution processing section 40 can output the picture and the second sound/effect instead of the first sound/effect according to the control script in which the first sound/effect are replaced with the second sound/effect, the first sound/effect being designated by the display data generating apparatus 2 and the second sound/effect being registered in the television 1 as user's favorites.

As an alternative, the television 1 may be configured as follows: the television 1 stores an effect definition script table as illustrated in FIG. 47.

In the present embodiment, the control script supplied from the display data generating apparatus 2 describes the "effect ID" in association with the picture. The control script contains the reference script in the part of the description that defines the details of the operation regarding the effect.

Following the reference script and referring to the effect ID associated with the picture, the television 1 acquires necessary information from the effect definition script table stored in the television 1. Based on the information, the television 1 completes the definition of the details of the operation regarding the effect.

By this, the television 1 can be configured such that the television 1 always outputs the picture with the effect stored in the television 1.

The television 1 may be configured such that a particular effect is outputted regardless of what the effect ID defined in the control script is (or regardless of whether any effect ID is defined in the control script), or that the television 1 reproduce a picture every time with an effect randomly selected from among effects stored in the television 1.

As an alternative, the television 1 may be configured such that the television 1 stores the sound/effect (e.g., user's favorite sound/effect) in advance without storing the album information table and the effect definition script table.

In the present embodiment, the television 1 can replace, referring to the reference script, part of the control script such that a picture is outputted always with the sound/effect stored in the television 1 in advance, even if the control script supplied from the display data generating apparatus 2 contains a description that specifies the sound/effect. As an alternative, if the television 1 stores a plurality of the sound/effect, the television 1 may reproduce a picture every time with an effect randomly selected from among effects stored in the television 1.

With this configuration, the television 1 can always output the sound/effect registered in the television 1, regardless of which sound/effect is designated by the display data generating apparatus 2 as the sound/effect to be outputted. By this, it becomes possible to provide a service suitably with the user's taste according to the setting of the television 1 on the client side, which is set individually.

The present invention is not limited to the description of the embodiments above, but may be altered by a skilled person within the scope of the claims. An embodiment based on a proper combination of technical means disclosed in different embodiments is encompassed in the technical scope of the present invention.

The above explanation discusses the case where the television 1, which is an image display apparatus according to the present invention, displays an image based on the display data generated by the display data generating apparatus 2, which is an image data providing apparatus according to the present invention. However, the image display apparatus and image data providing apparatus according to the present invention are not limited to them.

As described above, the display data 7 may include various media data (video data, audio data, and text data) other than the image data. In the following, the display object 111 and the various media data (such as audio data) to be reproduced (but not by being displayed) are collectively referred to as reproduction object. Display data including such a reproduction object and a control script that defines an operation to deal with the reproduction object is referred to as a content.

The display data generating apparatus 2 may be constituted as a content providing apparatus for generating a content in response to a request from the television 1 and providing the content to the television 1, the content including the reproduction object (such as moving image data, audio data, etc.) and a control script that defines how a television 1 should operate to deal with the reproduction object. Such a content providing apparatus is also included within the technical scope of the present invention.

Moreover, the television 1 can be structured as a content producing apparatus which reproduces, following the control script included in the content, the reproduction object (such as moving data, audio data, or the like) included in the content and performs, following the control script, various processes to the reproduction object that is being displayed. The content reproducing apparatus is also included in the technical scope of the present invention.

Finally, each block of the television 1 and the display data generating apparatus 2, especially, the display data execution processing section 40 and the control script generating section 80 may be constituted by hardware logic or software logic by using a CPU as follows.

That is, each of the television 1 and the display data generating apparatus 2 includes: (i) a CPU (central processing unit) for executing instructions of a control program realizing various functions; (ii) a ROM (read only memory) storing the above programs; (iii) a RAM (random access memory) for expanding the program; (iv) a storage device (recording medium), such as a memory, storing the programs and various types of data; and the like. Therefore, the object of the present invention can be achieved by: (i) providing, in each of the television 1 and the display data generating apparatus 2 and, a recording medium which stores a computer-readable program code (executable program, intermediate code program, a source program) of the control program for controlling either of the television 1 and the display data generating apparatus 2 that are software for realizing the functions, and (ii) causing a computer (CPU, or MPU) of the television 1 or the display data generating apparatus 2 to read out and execute the program code stored in the recording medium.

Examples of the recording medium encompass: tapes such as a magnetic tape and a cassette tape; magnetic disks such as a Floppy® disk and a hard disk; disks such as a CD-ROM (compact disk read only memory), a magnetic optical disk (MO), a mini disk (MD), a digital video disk (DVD), and a CD-Recordable (CD-R); and the like. Further, the storage medium may be: a card such as an IC card (inclusive of a memory card) or an optical card; a semiconductor memory such as a mask ROM, an EPROM (electrically programmable read only memory), an EEPROM (electrically erasable programmable read only memory), or a flash ROM; or the like.

Further, each of the television 1 and the display data generating apparatus 2 may be so arranged as to be connectable to a communication network, and the program code may be supplied to the television 1 and the display data generating apparatus 2 via the network. The communication network is not particularly limited. Specific examples thereof encompass: the Internet, intranet, extranet, LAN (local area network), ISDN (integrated services digital network), VAN (value added network), CATV (cable TV) communication network, virtual private network, telephone network, mobile communication network, satellite communication network, and the like. Further, a transmission medium constituting the communication network is not particularly limited. Specific examples thereof are: (i) a wired channel using an IEEE1394, a USB (universal serial bus), a power-line communication, a cable TV line, a telephone line, an ADSL line, or the like; or (ii) a wireless channel using IrDA, infrared rays used for a remote controller, Bluetooth®, IEEE802.11, HDR (High Data Rate), a mobile phone network, a satellite connection, a terrestrial digital network, or the like. Note that the present invention can be realized by a form of a computer data signal (a series of data signals) embedded in a carrier wave realized by electronic transmission of the program code.

Additional Embodiment 1

Furthermore, in the image display apparatus as described above, the control script defines an operation item display function for displaying operation items so as to allow a user to select a second function from among those second functions which are executable by the image display apparatus; and the control script executing section 41 can perform the operation item display function according to the control script.

With this configuration, the control script executing section 41 performs the operation item display function according to the control script. The operation item display function is to display the operation items thereby allowing the user to select the second function from among the second functions executable by the image display apparatus.

With this, the displayed operation items let the user know which second functions are executable by the image display apparatus while the image is being displayed on the image display apparatus by the first function. Further, from the displayed operation items, the user can select the second function that the user wants the image display apparatus, which is displaying the image, to perform.

Further, the control script defines the second function in association with the operation item, so that the image display apparatus will perform the second function when the operation item associated with it is selected by the user; and the control script executing section 41 performs the second function that the control script associates with the operation item selected by the user.

With this configuration, when the operation item is selected by the user, the control script executing section 41 executes, referring to the control script, the second function associated with the operation item.

With this, the second function that the user wants the image display apparatus, which is displaying the image, to perform can be selected by the user from among the operation items displayed on the image display apparatus, and can be then executed by the image display apparatus.

The image display apparatus may be arranged such that the control script defines, as the second function, an image editing function applicable to the image to be displayed by the first function, the control script executing means displays an operation item(s) of the image editing function according to the control script, so as to allow the user to select an operation item from among the operation item(s), and applies, to the image displayed by the first function, an action of the image editing function, which is associated with the operation item selected by the user.

With this configuration, the operation items are displayed such that only the actions of the image editing function which are able to be applied to the images to be displayed on the image display apparatus so as to allow the user to select one from among the displayed operation items. When the user selects one of the actions of the image editing function from among the displayed operation items, the control script executing section 41 executes the action of the image editing function to the image that is being displayed by the first function.

With this, the image editing function that can be provided to the user by the image display apparatus can be changed dynamically as suitable for the displayed image by using the control script.

Furthermore, the image data providing apparatus may comprise: attribute information acquiring means (display object attribute determining section 81/image analyzing section 82) for acquiring attribute information of the requested image from an image information storage section that stores the attribute information therein, the control script generating means (control script generating section 80) generating the control script based on the acquired attribute information of the requested image.

With this configuration, the control script generating section 80 generates the control script referring to the attribute information of the requested image, the control script defining the second function.

With this, it is possible to efficiently provide the image display apparatus with the second function that is necessary for the requested image to be displayed on the image display apparatus, and is generated according to the attribute information of the requested image.

For example, the attribute information of the image may be determination result to determine whether the image is upside up correctly, information regarding whether the rotation process is necessary for the image, the number of pixels of the image, information regarding whether the image is attached with a comment from the owner of the image, copyright information regarding whether the image is copyrighted or not, etc. Note that the present invention is not limited to this.

Further, the image data providing apparatus may be so arranged that the display data request message contains relevant information of the image display apparatus; the image data providing apparatus includes relevant information acquiring means (relevant information acquiring section 73) for acquiring the relevant information from the display data request message, and the control script generating means (the control script generating section 80) generating the control script based on the relevant information acquired by the relevant information acquiring means.

With this configuration, the control script generating section 80 generates the control script referring to the relevant information of the image display apparatus, the control script defining the second function.

With this, the second function necessary for the requested image to be displayed on the image display apparatus can be provided to the image display apparatus, referring to the relevant information of the image display apparatus.

For example, the relevant information of the image display apparatus may be specification information of the image display operation of the image display apparatus that requests the image. Examples of the specification information encompass machine name, apparatus ID, screen size, screen pixel number, version information of the implemented software, etc. of the image display apparatus, and the like information. Moreover, the relevant information of the image display apparatus may be setting information set in the image display apparatus that requests the image. Examples of the setting information encompass information whether to display or not display the operation guide of the image display apparatus, information whether to repeat the reproduction of the slide show, the information on the frame rate of the slide show, etc. Further, the relevant information of the image display apparatus may be user information registered in the image display apparatus that requests the image. Examples of the user information encompass an age, address, etc. of the user. The relevant information is not limited to these pieces of information.

For example, the control script defining the second function may be generated according to both the attribute information of the image and the relevant information supplied from the image display apparatus, e.g., according to a result of comparison between the number of pixels of the image and the number of pixels of the screen of the image display apparatus.

Furthermore, the image data providing apparatus may be arranged to include: a display object attribute determining section 81 for acquiring attribute information of the requested image from the image information storage section where the attribute information is stored; a relevant information acquiring section 73 for acquiring relevant information of the image display apparatus from the display data request message that includes the relevant information; an operation item selecting section 83 (function determining means) for determining, from among functions available to be provided to the image display apparatus, the second function to be provided to the image display apparatus, the operation item selecting section 83 performing the determination based on at least one of the attribute information and relevant information, and the control script generating section 80 generating the control script that defines the second function determined by the operation item selecting section 83.

With this configuration, the display object attribute determining section 81 acquires attribute information of the requested image from the image information storage section where the attribute information is stored. A relevant information acquiring section 73 acquires the relevant information of the image display apparatus from the display data request message that includes the relevant information. The attribute information is information that indicates the attributes of the image, while the relevant information is information regarding matters relevant to the image display apparatus.

With this configuration, the function determining means (operation item selecting section 83) determines, from among functions available to be provided to the image display apparatus, the second function to be provided to the image display apparatus, the function determining means performing the determination based on at least one of the attribute information and relevant information. The control script generating means (control script generating section 80) generates the control script that defines the second function determined by the function determining means (operation item selecting section 83).

With this configuration, it is possible to efficiently provide the image display apparatus with only the necessary and customized second function based on the attribute information of the request image and/or the relevant information of the image display apparatus.

The operation item selecting section 83 may determine, as the second function, an image editing function applicable to the requested image to be displayed on the image display apparatus by the first function.

By this, it is possible to provide the image display apparatus with an image editing function applicable to the requested image that is requested by the display data request message received from the image display apparatus. With this, it is possible to change the image editing function of the image display apparatus dynamically according to the requested image.

For example, for an image that is upside down, the operation item selecting section 83 may set an image rotating function as the second function. For an image that the provider of the image does not authorize to edit, the operation item selecting section 83 may set that any action of the image editing function will not be executed.

It is preferable that the control script generating section 80 generate the control script that defines an operation item display function for displaying an operation item for allowing the user to select the second function that is determined by the operation item selecting section 83.

With this configuration, the control script generated by the control script generating section 80 defines the operation item display function, so that the image display apparatus can display the operation item corresponding to the second function determined by the operation item selecting section 83.

By this, the second functions that may be required for the request image to be displayed can be selected out based on the attribute information of the request image and/or the relevant information of the image display apparatus, and provided to the user as the executable functions from which the user selects.

In order to attain the object, a method according to the present invention is a method of controlling an image display system including an image data providing apparatus, and an image display apparatus for processing display data generated by the image data providing apparatus and displaying an image based on the processed display data, the method comprising: (1) the image display apparatus transmitting a display data request message to the image data providing apparatus, the display data request message requesting display data containing the image and the control script that defines at least a first function of displaying the image; (2) the image data providing apparatus acquiring, from the display data request message transmitted thereto from the image display apparatus, identification information for identifying the requested image; (3) the image data providing apparatus generating a control script that defines a first function for displaying the requested image designated by the identification information acquired in the step (2); (4) the image data providing apparatus adding, to the control script generated in the step (3), definition of an operation designated as a second function referring the image data request message, which second function the image display apparatus performs while the requested image is being displayed by the first function; (5) the image data providing apparatus generating display data containing the requested image and the control script generated via the steps (3) and (4), and transmitting the display data to the image display apparatus; (6) the image display apparatus performing the first function by executing a basic function program according to the control script received from the image data providing apparatus, the basic function program being called from the control script, the basic function program being stored in a basic function program storage section; and (7) the image display apparatus performing the second function by executing the basic function program according to the control script.

With this configuration and the method, the image data providing apparatus generate the control script according to the contents of the display data requested by the image display apparatus. The control script, which defines the second function, is included in the display data together with the requested image. The display data is provided to the image display apparatus. The image display apparatus, which acquires the image data from image data providing apparatus, executes the second function following the control script included in the display data.

With this, it is possible to structure an image display system in which the function of the image display apparatus (which is a computer-embedded apparatus) can be easily changed.

Additional Embodiment 2

Further, in addition to the above configuration, the image display apparatus may be arranged such that the control script defines a function in association with user's operation, so that the image display apparatus will perform the function when the image display apparatus accepts the user's operation; and the control script executing means (control script executing section 41) performs the function that the control script associates with the user's operation thus accepted.

With this arrangement, the control script executing section 41 can perform the function associated with the received operation by the control script, when the image display apparatus receives the user's operation.

By this, the image display apparatus can perform the function in response to the user's operation, referring to the description of the control script, the function being defined by the control script in advance.

Therefore, the association of the user's operation and the function is defined by the control script and can be easily changed. This makes it possible to easily make a change such as allocating different functions to the same user's operation, or allocating the same function to different user's operations.

Additional Embodiment 3

In order to attain the object, an image display apparatus according to the present invention is an image display apparatus for processing display data and displaying an object based on the processed display data, wherein: the display data contains the object and a control script that defines at least a first function of displaying the object; the image display apparatus comprises: basic function executing means (basic function executing section 42) for executing a basic function program called from the control script, the basic function program being stored in a basic function program storage section; and control script executing means (control script executing section 41) for controlling the basic function executing means according to the control script so as to perform the first function being defined by the control script and so as to perform a second function being defined by the control script as a function which the image display apparatus performs while the object is being displayed by the first function, the control script further defines an image data reformation region which is that region on a display screen of the image display apparatus in which image data should be reformed if the first or the second function is a function associated with a change for altering the display screen; and when the control script executing means performs the function associated with the change, the control script executing means controls the basic function executing means according to the control script so as to find out the image data reformation region and execute image data reformation in the image data reformation region.

With this arrangement, the image display apparatus acquires the display data that contains the object and a control script that defines at least a function of displaying the object. Then, the image display apparatus process the display data and displays the object based on the processed display data. More specifically, the control script executing section 41 controls the basic function executing section 42 according to the control script so as to perform the function (the first function for displaying the object) defined by the control script, thereby displaying the object. That is, one function (such as the first function) of the image display apparatus is realized by using one of or a combination of basic functions in combination according to the control script. The object is an object to be displayed on the image display apparatus and may be any object to be displayed, such as an image, a moving picture, a figure, a text, picture, illustration, or the like.

Further, in addition to the first function of displaying the object, the control script defines the second function as a function which the image display apparatus performs while the object is being displayed by the first function. The second function is also a function realized by using one of or a combination of basic functions in combination according to the control script.

The control script executing section 41 performs the second function by controlling the basic function executing section 42 according to the control script.

By this, not only the function of displaying the object but also various second function can be realized in the image display apparatus by using the control script.

Further, the control script defines the image data reformation region in addition to the first and second function. The image data reformation region is a region on the display screen in which image data should be reformed when it becomes necessary to change the display content as a result of the execution of the first or the second function. The one of the first and the second function which is associated with the change in the display content is referred to as a function associated with the change.

When the control script executing section 41 performs the function associated with the change, the control script executing section 41 controls the basic function executing section 42 according to the control script so as to find out the image data reformation region and execute image data reformation in the image data reformation region.

With this, by using the control script the display content in the image data reformation region defined in the control script can be changed in the image display apparatus when the first or the second function is executed.

By being included in the display data, the control script can be provided to the image display apparatus according to the contents to be displayed. Therefore, the image data reformation region can be defined arbitrarily and dynamically as required by the situation such as what kind of object is to be displayed, which kind of function is to be executed, etc. The image display apparatus can perform the image data reformation in the image data reformation region defined arbitrarily and dynamically.

Therefore, even after the image display apparatus is shipped to the market, it is possible to flexibly add or change the second function that is executed by the image display apparatus. Thus, it is possible to change the function of the image display apparatus without updating the basic function program stored in the basic function program storage section. Accordingly, it is possible to define the image data reformation region dynamically according to the situation, and cause the image display apparatus to perform the image data reformation in the image data reformation region thus defined.

Even if the basic function program storage section is realized by using a non-volatile storage device such as a ROM, so that the basic function program stored therein is not easy to rewrite, this configuration makes it possible to easily change the function of the image display apparatus. Thus, the image display apparatus of the present invention is effectively applicable especially to a computer-embedded apparatus.

Moreover, the ability of changing the function so easily makes it possible to avoid implementing such an unnecessary large number of functions in the apparatus intrinsically before shipping that will cover all possible needs. As a result, this reduces a work load of the development of the image display apparatus.

Furthermore, the control script defining the first function and the second function is included in the display data together with the image to be displayed on the image display apparatus, and is provided to the image display apparatus. This makes it possible to manage the control script in association with the image to be displayed. This makes it easy to manage the control script and the display object for both the sender for generating and sending the display data, and the receiver (image display apparatus) for receiving and processing the display data.

The control script is generated per display data (and the image included therein). Thus, the image display apparatus can efficiently and timely acquire only the second function necessary for the display data (object) to be processed. Moreover, if the function is a function associated with a change, the image display apparatus can acquire a control script that defines an appropriate image data reformation region.

Consequently, it is possible to efficiently develop the image display apparatus and change the function of the image display apparatus that has been shipped to the market.

The image display apparatus is preferably arranged such that: the control script defines the image data reformation region in such a manner that the image data reformation region includes a whole display region of the object or does not include the display region of the object at all.

In this configuration, when the image display apparatus specifies the image data reformation region according to the controls script, the image display apparatus specifies the image data reformation region in such a manner that the image data reformation region includes a whole display region of the object or does not include the display region of the object at all. That is, the image data reformation region will not include part of the object.

By this, it is possible to control the image display apparatus such that the image data reformation is carried out only for the object that is wholly included in the image data reformation region.

As described above, the configuration in which the image data reformation region in which the image data reformation is performed by the image display apparatus is designated arbitrarily by using the control script, the following remarkable effects can be attained.

For example, assume that the display screen includes object overlapping each other.

When the function associated with a change is executed while the object (object to be changed) is being displayed, a region including the whole object to be changed (e.g., a region circumscribing the object to be changed) is specified as the image data reformation region. However, if another object is included in the image data reformation region even partly, the image data reformation rewriting only the object to be changed, which is included in the image data reformation region would not correctly reform the image data. It is necessary to perform image data reformation for all the objects included in the image data reformation region.

Here, if part of the other object is included in the image data reformation region, the image data reformation requires a process for specifying the clipping region, which is a part included in the image data reformation region. Such a process to work out the clipping region is referred to as clipping process. The clipping process puts a larger load on the image display apparatus as the object has a more complicate shape. Therefore, the image data reformation region is preferably defined to include the whole of the object or not to include the object at all. Moreover, to reduce the load of the image data reformation region, it is preferable to keep the image data reformation region as small as the need permits.

Here, by using the control script, it is possible to designate the image data reformation region as small as the need permits and not to include part of an object (especially an object that has a complicate shape that would increase the load of the clipping process), depending on the content of the display data.

Therefore, by performing the image data reformation according to the control script, the image display apparatus can specify the image data reformation region as small as the need permits, avoiding the clipping process. Thereby, the image data reformation can be done efficiently.

As an alternative, the control script may define that the full display screen of the image display apparatus is the image data reformation region.

With this configuration, the image display apparatus can specify the full display screen as the image data reformation region according to the control script when the image display apparatus carries out the function associated with the change.

By this, the image data reformation is carried out in the full display screen intentionally, so as to switch the display screens correctly.

The above-explained is merely a non-limiting example of how to designate the image data reformation region by the control script. For example, an image display apparatus having a small work storage region may designate the image data reformation in such a manner that a predetermined display region will be subjected to the image data reformation, so that the switching of the display screen can be done always smoothly. As an alternative, the image display apparatus may be arranged such that the image data reformation region is so specified that a particulate object is designated as an object whose image data is reformed always.

In order to attain the object, an image data providing apparatus according to the present invention is an image data providing apparatus for generating display data for displaying an object by an image display apparatus, comprising: control script generating means (control script generating section 80) for generating a control script that defines at least a first function of displaying the object; display data generating means (display data generating section 62) for generating display data including the object and the control script generated by the control script generating means, the control script further defining (a) a second function, which the image display apparatus performs while the object is being displayed by the first function, and (b) an image data reformation region which is that region on a display screen of the image display apparatus in which image data should be reformed by the image display apparatus if the first or the second function is a function associated with a change for altering the display screen.

In this configuration, the control script generating section 80 generates the control script that defines the image data reformation region in addition to the first and second function. The image data reformation region is a region on the display screen in which image data should be reformed when it becomes necessary to change the display content as a result of the execution of the first or the second function.

Therefore, even after the image display apparatus is shipped to the market, it is possible to flexibly add or change the second function that is executed by the image display apparatus. Thus, it is possible to change the function of the image display apparatus without updating the basic function program stored in the basic function program storage section. Accordingly, it is possible to define the image data reformation region dynamically according to the situation, and cause the image display apparatus to perform the image data reformation in the image data reformation region thus defined.

The image data providing apparatus is preferably arranged such that: the control script defines the image data reformation region in such a manner that the image data reformation region includes a whole display region of the object or does not include the display region of the object at all.

By this, it is possible to control the image display apparatus to perform the image data reformation process efficiently in the image data reformation region as small as the need permits, while avoiding a high-load clipping process.

As an alternative, the image data providing apparatus may be arranged such that the control script may define that the full display screen of the image display apparatus is the image data reformation region.

By this, the image data reformation is carried out in the full display screen intentionally, so as to switch the display screens correctly.

In order to attain the object, an image display system of the present invention is an image display system including: an image display apparatus as described above; and an image data providing apparatus as described above, the image data generating apparatus generating display data containing an object requested by the image display apparatus, and the control script, the control script executing section 41 of the image display apparatus operates according to the control script included in the display data.

In order to attain the object, a method according to the present invention is a method of controlling an image display system including an image data providing apparatus, and an image display apparatus for processing display data generated by the image data providing apparatus and displaying an object based on the processed display data, the method comprising the steps of: the image display apparatus requesting the image data providing apparatus for the display data including the object and a control script that defines at least a first function of displaying the object; the image data providing apparatus generating a control script that defines the first function of displaying the object requested by the image display apparatus, and defines, as a second function, an operation of the image display apparatus to be performed while the object is being displayed by the first function; the image data providing apparatus defining an image data reformation region which is that region on a display screen of the display apparatus in which image data should be reformed by the image display apparatus if the first or the second function is a function associated with a change for altering the display screen, and adding the definition of the image data reformation region in the control script generated in the step of generating the control script; the image data providing apparatus transmitting to the image display apparatus the display data including the requested object and the control script generated via the step of generating the control script and the step of adding the definition of the image data reformation region; the image display apparatus executing a basic function program to perform the first function to display the requested object according to the control script received from the image data providing apparatus, the basic function program being stored in a basic function program storage section and called from the control script; the image display apparatus executing the basic function program to perform the second function according to the control script; the image display apparatus designating the image data reformation region by controlling the basic function executing section 42 according to the control script, if one of the first function to be performed in the step of performing the first function or the second function to be performed is a function associated with a change for altering the display screen; and the image display apparatus performing image data reformation in the image data reformation region designated in the step of designating the image data reformation region.

According to this method, the image display apparatus requests the image data providing apparatus for the display data including the object and the control script that defines at least the function of displaying the object. The image data providing apparatus generates the display data including the requested object according to the request. The image data providing apparatus generates the control script to be included in the display data, as follows.

Firstly, The image data providing apparatus generates a control script that defines a first function of displaying the object requested by the image display apparatus, and defines, as a second function, an operation of the image display apparatus to be performed while the object is being displayed by the first function. Next, the image data providing apparatus defines an image data reformation region which is that region on a display screen on the display apparatus in which image data should be reformed if the first or the second function is a function associated with a change for altering the display screen, and adds the definition of the image data reformation region in the control script.

The image display apparatus receives from the image data providing apparatus the display data including the control script thus generated. The control script executing section 41 operates according to the control script. More specifically, the control script executing section 41 performs the first and second functions and, if either function is the function associated with the change, finds out the image data reformation region and performs the image data reformation.

With this, by using the control script, it is possible to realize an image display system capable of (a) causing the image display apparatus to perform the first function of displaying the object, and various second functions, and (b) designating to the image display apparatus the region in which the image data reformation should be performed when the first or the second function is performed.

Therefore, even after the image display apparatus is shipped to the market, it is possible to flexibly add or change the second function that is executed by the image display apparatus. Thus, it is possible to change the function of the image display apparatus without updating the basic function program stored in the basic function program storage section. Accordingly, it is possible to define the image data reformation region dynamically according to the situation, and cause the image display apparatus to perform the image data reformation in the image data reformation region thus defined.

Additional Embodiment 4

In order to attain the object, an image display apparatus according to the present invention is an image display apparatus for processing externally acquired display data and displaying an image based on the processed display data, wherein: the display data contains the image and a control script that defines a first function of displaying the image, and a second function which the image display apparatus performs while the image is being displayed by the first function; the image display apparatus comprises: basic function executing means (basic function executing section 42) for executing a basic function program called from the control script, the basic function program being stored in a basic function program storage section; and control script executing means (control script executing section 41) for controlling the basic function executing means according to the control script so as to perform the first function and the second function, the first function and the second function being defined by the control script, the control script defines, as the second function, at least a visual effect outputting function for adding a visual effect to the image displayed by the first function, so that the image is displayed with movement; and according to the control script, the control script executing means displays the image and executes the visual effect outputting function to the image.

With this configuration, the image display apparatus acquires the display data containing the image and the control script that defines at least the function of displaying the image. By processing the display data, the image display apparatus displays the image. More specifically, by the control script executing section 41 controlling, according to the control script, the basic function executing section 42 for executing the basic function program called from the control script, the image display apparatus displays the image by executing the function (first function for displaying the image) defined in the control script. That is, one or more basic functions are combined according to the control script thereby to realize one function (such as the first function).

Furthermore, in addition to the first function for displaying the image, the control script defines, as the second function, an operation of the image display apparatus which is performed while the image is being displayed by the first function. The second function is a function of the image display apparatus and is realized by combining the basic functions.

The control script executing section 41 controls the basic function executing section 42 according to the control script, thereby to perform the second function.

By this, it is possible to realize various second functions in an image display apparatus by using the control script, in addition to the function for displaying the image.

More specifically, the control script defines, as the second function, the visual effect outputting function for adding the visual effect to the image displayed by the first function, so that the image is displayed with movement.

Thus, the control script executing section 41 performs the display of the image by the first function, and the visual effect outputting function to the image. Thus, the control script executing section 41 performs the display of the image with movement (i.e., dynamically).

As described above, the use of the control script makes it possible to provide the image display apparatus with the visual effect outputting function according to what is to be displayed, by including the visual effect outputting function in the display data. Thus, it is possible to cause the image display apparatus to perform the visual effect outputting function depending on what kind of image is to be displayed. The visual effect outputting function, which is a second function, makes it possible to provide the user with a more amusive content according to the display contents of the content.

Therefore, even after the image display apparatus is shipped to the market, it is possible to flexibly add or change the second function that is executed by the image display apparatus. Thus, it is possible to change the function of the image display apparatus without updating the basic function program stored in the basic function program storage section.

Even if the basic function program storage section is realized by using a non-volatile storage device such as a ROM, so that the basic function program stored therein is not easy to rewrite, this configuration makes it possible to easily change the function of the image display apparatus. Thus, the image display apparatus of the present invention is effectively applicable especially to a computer-embedded apparatus.

Moreover, the ability of changing the function so easily makes it possible to avoid implementing such an unnecessary large number of functions in the apparatus intrinsically before shipping that will cover all possible needs. As a result, this reduces a work load of the development of the image display apparatus.

Furthermore, the control script defining the first function and the second function is included in the display data together with the image to be displayed on the image display apparatus, and is provided to the image display apparatus. This makes it possible to manage the control script in association with the image to be displayed. This makes it easy to manage the control script and the display object for both the sender for generating and sending the display data, and the receiver (image display apparatus) for receiving and processing the display data.

The control script is generated per display data (and the image included therein). Thus, the image display apparatus can efficiently and timely acquire only the second function necessary for the display data (image) to be processed.

Consequently, it is possible to efficiently develop the image display apparatus and change the function of the image display apparatus that has been shipped to the market.

Furthermore, the image display apparatus is preferably arranged such that the control script defines (a) as the second function, an object display function for displaying an object in such a manner that the object overlaps the image displayed by the first function, and (b) timings of the second functions so that the image display apparatus will not execute the object display function while the visual effect outputting function is being executed; and the control script executing means (control script executing section 41) executes the second functions at the timings defined by the control script.

The control script may define (a) as the second function, the object display function. The object display function is a function for displaying an object in such a manner that the object overlaps the image displayed by the first function. Object may be any object to be displayed, such as an image, a moving picture, a figure, a text, picture, illustration, or the like.

According to the control script, the control script executing section 41 performs the visual effect outputting function and the object display function to the image displayed by the first function. Here, the control script defines the timings of the second functions so that the image display apparatus will not execute the object display function while the visual effect outputting function is being executed. Thus, the control script executing section 41 performs the visual effect outputting function and the object display function in such a manner that each effect is not performed concurrently.

If the visual effect outputting function and the object display function were concurrently performed, the image display apparatus should display the object in such a manner that the object overlaps on the image displayed with movement. Such a process for drawing a text or a figure on the animated image requires high work load. The consequent concentration of the work load on the image display apparatus will not allow the image display apparatus to perform each function smoothly.

The above-described configuration allows the control script executing section 41 to perform the visual effect outputting function and the object display function in such a manner that each effect is not performed concurrently. This avoids the concentration of the work load on the image display apparatus.

Specific examples of the object display function encompass text display function (function of displaying a comment or title of the picture (image), operation menu display function (function of displaying a list of operations, which the user can execute on the image), and the like.

The image display apparatus may be arranged such that the control script defines that a start of the object display function triggers an end of the visual effect outputting function; and according to the control script, the control script executing means (control script executing section 41) ends the execution of the visual effect outputting function when the control script executing means starts the object display function.

With this configuration, the control script executing section 41 stops the visual effect outputting function, which the control script executing section 41 is performing, according to the control script, if a command of starting the object display function is given interruptedly (for example, it is instructed to start the object display function by the user's operation) while the control script executing section 41 is performing visual effect outputting function.

With this configuration, it is possible to carry out the object display function after the visual effect outputting function is ended (interrupted). Thus, it is possible to avoid the concentration of work load on the image display apparatus.

The image display apparatus may be arranged such that the control script defines that an end of the visual effect outputting function triggers a start of the object display function; and according to the control script, the control script executing means starts the execution of the object display function when the control script executing means ends the visual effect outputting function.

With this configuration, the control script executing section 41 starts the object display function according to the control script after the visual effect outputting function is completed, if a command of starting the object display function is given interruptedly or the command of starting the object display function and a command of starting the visual effect outputting function are given concurrently (or substantially concurrently) while the control script executing section 41 is performing visual effect outputting function.

With this configuration, it is possible to carry out the object display function after the completion of the visual effect outputting function. Thus, it is possible to avoid the concentration of work load on the image display apparatus.

The control script may define, as the second function, an audio effect outputting function for outputting audio data that is associated with the image to be displayed by the first function. According to the control script, the control script executing section 41 may perform at least one of the visual effect outputting function and the audio effect outputting function associated with the image to be displayed by the first function.

By this, the image display apparatus can perform the display of the image by the first function and the visual effect outputting function, and the output of the audio data associated with the image. This makes it possible to provide the user with a content in a more enjoyable manner.

In order to attain the object, an image data providing apparatus according to the present invention is An image data providing apparatus for generating display data for displaying an object by an image display apparatus, wherein: the display data contains the image and a control script that defines a first function of displaying the image, and a second function which the image display apparatus performs while the image is being displayed by the first function; the image data providing apparatus comprises: identification information acquiring means (display object ID acquiring section 71) for acquiring identification information of the requested image from a display data requesting message, which has been transmitted thereto from the image display apparatus and requests the display data; control script generating means (control script generating section 80) for generating the control script that defines the first function of displaying the requested image identified by the identification information acquired by the identification information acquiring means, and, as the second function, a visual effect outputting function for adding a visual effect to the requested image, so that the requested image is displayed with movement; and display data generating means (display data generating section 62) for generating display data including the requested image and the control script generated by the control script generating means.

With this configuration, the image data providing apparatus generates the display data for displaying the requested image, according to the display data request message that is generated by the image display apparatus and requests the display data. The display data includes the requested image and the control script that defines at least the function of displaying the requested image. The display data includes the requested image and the control script that defines the first function of displaying the requested image, and the second function that is to be performed for the requested image. Here, as the second function, the visual effect outputting function is defined in the control script. The visual effect outputting function is a function for adding a visual effect to the requested image, so that the image is displayed with movement.

More specifically, the display object ID acquiring section 71 acquires the identification information of the requested image from the display data request message. The identification information specifies the requested image to be included in the display data.

Subsequently, the control script generating section 80 generates the control script that defines the first function for displaying the requested image. Further, the control script generating section 80 adds the following definition in the control script. That is, the control script contains the definition of the operation as the second function of the image display apparatus, which is carried out while the requested image is being displayed by the first function. The control script generating section 80 generates the control script that defines the second function (at least the visual effect outputting function) so as to be suitable for what is requested by the display data request message.

Finally, the display data generating section 62 generates the display data that includes the requested image and the control script generated by the control script generating section 80.

By this, the control script that defines the first and second functions can be generated to be suitable for the display data (image) requested by the image display apparatus. It is possible to provide the display data including such a control script, in response to the request from the image display apparatus.

The control script generating section 80 generates the control script that defines the second function in addition to the first function, where the first function is for displaying the requested image on the image display apparatus, and the second function is an operation of the image display apparatus, which is carried out while the requested image is being displayed. The second function is a function of the image display apparatus and is realized by combining basic functions of the image display apparatus.

By this, the control script generated according to the contents of the display data can be provided to the image display apparatus, whereby it is possible to provide the image display apparatus with various second functions in addition to the function of displaying the requested image. Here, at least the visual effect outputting function is defined as the second function. Thus, the image display apparatus can display the image with movement by adding the visual effect to the image displayed by the first function. This visual effect outputting function makes it possible to provide the user with a content in a more enjoyable manner according to the display contents of the content.

As described above, even after the image display apparatus is shipped to the market, this is possible to flexibly add or change the second function that is executed by the image display apparatus. Thus, it is possible to change the function of the image display apparatus without updating the basic function program stored in the basic function program storage section.

Even if the basic function program storage section is realized by using a non-volatile storage device such as a ROM, so that the basic function program stored therein is not easy to rewrite, this configuration makes it possible to easily change the function of the image display apparatus. Thus, the image display apparatus of the present invention is effectively applicable especially to a computer-embedded apparatus, which has the basic function executing section 42 of the image display apparatus, and is provided with the control script generated by the control script generating section 80.

Moreover, the ability of changing the function so easily makes it possible to avoid implementing such an unnecessary large number of functions in the apparatus intrinsically before shipping that will cover all possible needs. As a result, this reduces a work load of the development of the image display apparatus.

Furthermore, the control script defining the first function and the second function is included in the display data together with the image to be displayed on the image display apparatus, and is provided to the image display apparatus. This makes it possible to manage the control script in association with the image to be displayed. This makes it easy to manage the control script and the display object for both the sender for generating and sending the display data, and the receiver (image display apparatus) for receiving and processing the display data.

The control script is generated per display data (and the image included therein). Thus, the image display apparatus can efficiently and timely acquire only the second function necessary for the display data (image) to be processed.

Consequently, it is possible to efficiently develop the image display apparatus and change the function of the image display apparatus that has been shipped to the market.

It may be arranged such that visual effects applicable to images to be provided to the image display apparatus are stored in an effect information storage section in association with the images, and the control script generating section 80 finds out an effect associated with the requested image from the effect information storage section, and generate a control script that defines a visual effect outputting function for outputting the visual effect.

In this configuration, the control script generating section 80 finds out, from the effect information storage section, the visual effect applicable to the requested image requested by the display data request message, and defines the visual effect outputting function for adding visual effect to the requested image.

This configuration makes it possible to generate and provide the control script that allows the image display apparatus to execute the visual effect suitable for the image requested by the image display apparatus.

It is preferably arranged such that the display data request message include specification information that indicates a basic function of the image display apparatus, and the control script generating section 80 determine, according to the specification information, whether to include the definition of the visual effect outputting function in the control script.

With this configuration, the display data request message transmitted from the image display apparatus includes the specification information that indicates which basic function the image display apparatus has. Based on the specification information, the control script generating section 80 determines whether the image display apparatus has basic functions for executing the visual effect outputting function. Based on the determination, the control script generating section 80 decides whether to include the visual effect outputting function in the control script to be provided to the image display apparatus.

This makes it possible to provide the image display apparatus with a control script more suitable for the basic functions thereof.

More specifically, if it is determined that the image display apparatus is of a machine type capable of executing the visual effect outputting function, the control script generating section 80 then decides to include the definition of the visual effect outputting function in the control script to be provided to the image display apparatus. On the other hand, if it is determined that the image display apparatus is not of a machine type capable of executing the visual effect outputting function, the control script generating section 80 then decides not to include the definition of the visual effect outputting function in the control script to be provided to the image display apparatus.

It is just a waste to provide the definition of the second function to an image display apparatus that does not have basic functions for executing the second function. Thus, in such a case, the control script is generated not to have the definition of the second function. This reduces the data size of the control script and the work load in the transmission/reception process of the control script and the analysis process of the control script.

The image data providing apparatus may be arranged such that the control script defines (a) as the second function, an object display function for displaying an object in such a manner that the object overlaps the image displayed by the first function, and (b) timings of the second functions so that the image display apparatus will not execute the object display function while the visual effect outputting function is being executed.

In this configuration, the control script is generated by the control script generating section 80 such that the control script defines (a) as the second function, the object display function for displaying an object in such a manner that the object overlaps the image displayed by the first function, and (b) the timings of the second functions so that the image display apparatus will not execute the object display function while the visual effect outputting function is being executed.

This can cause the image display apparatus to perform the visual effect outputting function and the object display function in such a manner that each effect is not performed concurrently.

If the visual effect outputting function and the object display function were concurrently performed, the image display apparatus should display the object in such a manner that the object overlaps on the image displayed with movement. Such a process for drawing a text or a figure on the animated image requires high work load. The consequent concentration of the work load on the image display apparatus will not allow the image display apparatus to perform each function smoothly.

The use of the control script causes the control script to perform the visual effect outputting function and the object display function in such a manner that each effect is not performed concurrently. This avoids the concentration of the work load on the image display apparatus.

Some examples of the timings of the second functions are as follows:

The image data providing apparatus may be arranged such that the control script defines that a start of the object display function triggers an end of the visual effect outputting function.

The image data providing apparatus may be arranged such that the control script defines that an end of the visual effect outputting function triggers a start of the object display function.

In order to attain the object, an image display system according to the present invention is an image display system that includes the image display apparatus, and the image data providing apparatus, wherein the control script generating section 41 of the image display apparatus executes a visual effect outputting function for the requested image according to the control script include in the display data provided from the image data providing apparatus.

In order to attain the object, a method according to the present invention is a method of controlling an image display system including an image data providing apparatus, and an image display apparatus for processing display data generated by the image data providing apparatus and displaying an image based on the processed display data, the method comprising the steps of: the image display apparatus requesting the image data providing apparatus for the display data including the image and a control script that defines a first function of displaying the image and a second function which the image display apparatus performs while the image is being displayed by the first function; the image data providing apparatus generating a control script that defines the first function of displaying the requested image requested by the image display apparatus, and defines, as a second function, a visual effect outputting function for adding a visual effect to the requested image, so that the requested image is displayed with movement; the image data providing apparatus transmitting to the image display apparatus the display data including the requested image and the control script generated via the step of generating the control script; the image display apparatus executing one or more basic function programs to perform the first function to display the requested image according to the controls script received from the image data providing apparatus, the basic function program being stored in a basic function program storage section and called from the control script; and the image display apparatus executing the one or more basic function programs to perform the visual effect outputting function as the second function according to the controls script.

According to this method, the image display apparatus requests the image data providing apparatus for the display data including the image and the control script that defines at least the function of displaying the image. The image data providing apparatus generates the display data including the requested image according to the request. The image data providing apparatus generates the control script to be included in the display data, as follows.

Firstly, The image data providing apparatus generates a control script that defines a first function of displaying the image requested by the image display apparatus, and defines, as a second function, an operation of the image display apparatus to be performed while the image is being displayed by the first function. Here, as the second function, the visual effect outputting function is at least defined therein. The visual effect outputting function is a function for adding a visual effect to the requested image, so that the requested image is displayed with movement.

The image display apparatus receives from the image data providing apparatus the display data including the control script thus generated. The control script executing section 41 operates according to the control script. More specifically, the control script executing section 41 performs the first function and second function (at least visual effect outputting function). In this way, it is possible to display an image by the first function with an associated visual effect added thereto.

With this, by using the control script, it is possible to realize an image display system capable of (a) causing the image display apparatus to perform the first function of displaying the image, and various second functions, and (b) displaying the image with movement if the second function is the visual effect outputting function.

Therefore, even after the image display apparatus is shipped to the market, it is possible to flexibly add or change the second function that is executed by the image display apparatus. Thus, it is possible to change the function of the image display apparatus without updating the basic function program stored in the basic function program storage section. Because it is possible to display the image with a visual effect suitable for the image, it is possible to provide the user with a content in a more enjoyable manner.

The image display apparatus and image data providing apparatus may be realized by a computer. In this case, a control program of the image display apparatus, a control program of the image data providing apparatus, and a computer-readable recording medium storing either of them are included in the scope of the present invention, each program causing a computer to operate as these means thereby to realize at least one of the image display apparatus and the image data providing apparatus by the computer.

An image display apparatus of the present invention, which is provided with a control script transmitted from an image data providing apparatus together with an image, can perform, according to the control script, a function being defined by the controls script. Moreover, an image data providing apparatus of the present invention can generate the control script according to what is requested by the image display apparatus. Therefore, it is possible to apply these apparatuses to an image display system in which an image data providing apparatus provides an image display apparatus with an image that is requested by the image display apparatus. The image display apparatus of the present invention is preferably applicable to a computer-embedded type image display apparatus, whose program cannot be rewritten readily.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image display apparatus for processing externally acquired display data and displaying an image based on the processed display data, wherein the image display apparatus is a computer-embedded digital television, comprising:

a basic function program storage section intrinsically storing a plurality of basic function programs each of which executes one basic function, wherein the plurality of basic function programs are not changed by user operation on the digital television;

a display data receiving section receiving the display data from an external device via Internet, the display data containing the image and a control script that defines at least a first function of displaying the image, wherein the first function defines the layout of the image; and a processor operably performing as:

a basic function executing section for executing one or more of the plurality of basic function programs as called directly from the control script, the basic function programs being stored in the basic function program storage section; and a control script executing section for controlling the basic function executing section according to the control script so as to perform the first function being defined by the control script, wherein the control script execution section is not a part of an Internet browser;

the control script further defines a second function which the image display apparatus performs in response to an event that occurs in the image display apparatus while the image is being displayed by the first function, the control script executing section controls the basic function executing section according to the control script so as to execute the second function, the first function and the second function are defined by the control script as a combination of basic functions stored in the basic function program storage section, and the first and second functions are operationally redefinable as different combinations of the intrinsically stored basic functions, by changing the control script.

2. The image display apparatus as set forth in claim 1, wherein:

the control script defines an operation item display function for displaying one or more operation items so as to allow a user to select one or more second functions from among those second functions which are executable by the image display apparatus; and the control script executing section performs the operation item display function according to the control script.

3. The image display apparatus as set forth in claim 2, wherein:

the control script defines the second functions in association with the respective operation items, so that the image display apparatus will perform the second functions when the operation items associated with them are selected by the user; and the control script executing section performs, out of the second functions defined in the control script, a second function that the control script associates with an operation item selected by the user.

4. The image display apparatus as set forth in claim 3, wherein:
the control script defines, as the second function, an image editing function applicable to the image to be displayed by the first function,
the control script executing section displays an operation item(s) of the image editing function according to the control script, so as to allow the user to select an operation item from among operation item(s), and applies, to the image displayed by the first function, an action of the image editing function, which is associated with the operation item selected by the user.

5. An image display apparatus for processing display data and displaying an object based on the processed display data, wherein the image display apparatus is a computer-embedded digital television, comprising:
a basic function program storage section intrinsically storing a plurality of basic function programs each of which executes one basic function, wherein the plurality of basic function programs are not changed by user operation on the digital television;
a display data receiving section receiving the display data from an external device via Internet, the display data containing the object and a control script that defines at least a first function of displaying the object, wherein the first function defines the layout of the object; and
a processor operably performing as:
a basic function executing section for executing one or more of the plurality of basic function programs as called directly from the control script, the basic function program being stored in the basic function program storage section; and
a control script executing section for controlling the basic function executing section according to the control script so as to perform the first function being defined by the control script, and so as to perform a second function being defined by the control script as a function which the image display apparatus performs in response to an event that occurs in the image display apparatus while the object is being displayed by the first function, wherein
the control script execution section is not a part of an Internet browser;
the control script further defines an image data reformation region which is that region on a display screen of the image display apparatus in which image data should be reformed if the first or the second function is a function associated with a change for altering the display screen;
when the control script executing section performs the function associated with the change, the control script executing section controls the basic function executing section according to the control script so as to find out the image data reformation region and execute image data reformation in the image data reformation region,
the first function and the second function are defined by the control script as a combination of basic functions stored in the basic function program storage section, and
the first and second functions are operationally redefinable as different combinations of the intrinsically stored basic functions, by changing the control script.

6. The image display apparatus as set forth in claim 5, wherein:
the control script defines the image data reformation region in such a manner that the image data reformation region includes a whole display region of the object or does not include the display region of the object at all.

7. An image display apparatus for processing externally acquired display data and displaying an image based on the processed display data, wherein the image display apparatus is a computer-embedded digital television, comprising:
a basic function program storage section intrinsically storing a plurality of basic function programs each of which executes one basic function, wherein the plurality of basic function programs are not changed by user operation on the digital television;
a display data receiving section receiving the display data from an external device via Internet, the display data containing the image and a control script that defines a first function for defining a layout for displaying the image, and a second function which the image display apparatus performs in response to an event that occurs in the image display apparatus while the image is being displayed by the first function; and
a processor operably performing as:
a basic function executing section for executing one or more of the plurality of basic function programs as called directly from the control script, the basic function program being stored in the basic function program storage section; and
a control script executing section for controlling the basic function executing section according to the control script so as to perform the first function and the second function, the first function and the second function being defined by the control script, wherein
the control script execution section is not a part of an Internet browser;
the control script defines, as the second function, at least visual effect outputting function for adding a visual effect to the image displayed by the first function; according to the control script, the control script executing section displays the image and executes the visual effect outputting function to the image,
the first function and the second function are defined by the control script as a combination of basic functions stored in the basic function program storage section, and
the first and second functions are operationally redefinable as different combinations of the intrinsically stored basic functions, by changing the control script.

8. The image display apparatus as set forth in claim 7, wherein:
the control script further defines (a) as another second function, an object display function for displaying an object in such a manner that the object overlaps the image displayed by the first function, and (b) timings of the second functions so that the image display apparatus will not execute the object display function while the visual effect outputting function is being executed; and
the control script executing section executes the second functions at the timings defined by the control script.

9. The image display apparatus as set forth in claim 8, wherein:
the control script defines that a start of the object display function triggers an end of the visual effect outputting function; and according to the control script, the control script executing section ends the execution of the visual effect outputting function when the control script executing section starts the object display function.

10. The image display apparatus as set forth in claim 8, wherein:
the control script defines that an end of the visual effect outputting function triggers a start of the object display function; and
according to the control script, the control script executing section starts the execution of the object display function when the control script executing section ends the visual effect outputting function.

11. An image data providing apparatus for generating display data for displaying an image by an image display apparatus, wherein the image display apparatus is a computer-embedded digital television, comprising:
a processor operably performing as:
an identification information acquiring section for acquiring, from a display data request message, identification information for identifying a requested image, the display data request message requesting the display data and having been transmitted thereto via Internet by the image display apparatus;
a control script generating section for generating, according to the display data request message, a control script that defines a first function for defining a layout for displaying the requested image designated by the identification information acquired by the identification information acquiring section, and further defines a second function which the image display apparatus performs in response to an event that occurs in the image display apparatus while the requested image is being displayed by the first function; and
a display data generating section for generating display data containing the requested image and the control script generated by the control script generating section,
the control script defining the first function and the second function as a combination of basic functions of the image display apparatus,
the first and second functions being operationally redefinable as different combinations of the intrinsically stored basic functions, by changing the control script, and
the basic functions being performed in such a manner that basic function programs intrinsically stored in a basic function program storage section of the image display apparatus are called directly according to the control script and executed by the image display apparatus, wherein
the control script is not executed by an Internet browser, and
the plurality of basic function programs are not changed by user operation on the digital television.

12. The image data providing apparatus as set forth in claim 11, comprising:
an attribute information acquiring section for acquiring attribute information of the requested image from an image information storage section that stores the attribute information therein,
the control script generating section generating the control script based on the acquired attribute information of the requested image.

13. The image data providing apparatus as set forth in claim 11, wherein:
the display data request message contains relevant information of the image display apparatus;

the image data providing apparatus comprises a relevant information acquiring section for acquiring the relevant information from the display data request message, and
the control script generating section generating the control script based on the relevant information acquired by the relevant information acquiring section.

14. An image data providing apparatus for generating display data for displaying an object by an image display apparatus, wherein the image display apparatus is a computer-embedded digital television, comprising:
a processor operably performing as:
a control script generating section for generating a control script that defines at least a first function of displaying the object, wherein the first function defines the layout of the object;
a display data generating section for generating display data including the object and the control script generated by the control script generating section,
the control script further defining (a) a second function, which the image display apparatus performs in response to an event that occurs in the image display apparatus while the object is being displayed by the first function, and (b) an image data reformation region which is that region on a display screen of the image display apparatus in which image data should be reformed by the image display apparatus if the first or the second function is a function associated with a change for altering the display screen,
the control script defining the first function and the second function as a combination of basic functions of the image display apparatus,
the first and second functions being operationally redefinable as different combinations of the intrinsically stored basic functions, by changing the control script, and
the basic functions being performed in such a manner that basic function programs intrinsically stored in a basic function program storage section of the image display apparatus are called directly according to the control script and executed by the image display apparatus,
wherein the control script is not executed by an Internet browser, and
the plurality of basic function programs are not changed by user operation on the digital television.

15. The image data providing apparatus as set forth in claim 14, wherein:
the control script defines the image data reformation region in such a manner that the image data reformation region includes a whole display region of the object or does not include the display region of the object at all.

16. An image data providing apparatus for generating display data for displaying an object by an image display apparatus, wherein the image display apparatus is a computer-embedded digital television, comprising:
a processor operably performing as:
an identification information acquiring section for acquiring identification information of the requested image from a display data requesting message, which has been transmitted thereto via Internet from the image display apparatus and requests the display data;
a control script generating section for generating the control script that defines the first function for defining a layout for displaying the requested image identified by the identification information acquired by the identification information acquiring section, and that further defines, as the second function which the image display apparatus performs in response to an event that occurs in the image display apparatus while the requested image is being displayed by the first function, a visual effect outputting function for adding a visual effect to the requested image; and a display data generating section for generating display data including the requested image and the control script generated by the control script generating section, the control script defining the first function and the second function as a combination of basic functions of the image display apparatus, the first and second functions being operationally redefinable as different combinations of the intrinsically stored basic functions, by changing the control script, and the basic functions being performed in such a manner that basic function programs intrinsically stored in a basic function program storage section of the image display apparatus are called directly according to the control script and executed by the image display apparatus, wherein the control script is not executed by an Internet browser, and the plurality of basic function programs are not changed by user operation on the digital television.

17. The image data providing apparatus as set forth in claim 16, wherein:

the control script further defines (a) as another second function, an object display function for displaying an object in such a manner that the object overlaps the image displayed by the first function, and (b) timings of the second functions so that the image display apparatus will not execute the object display function while the visual effect outputting function is being executed.

18. The image data providing apparatus as set forth in claim 17, wherein:

the control script defines that a start of the object display function triggers an end of the visual effect outputting function.

19. The image data providing apparatus as set forth in claim 17, wherein:

the control script defines that an end of the visual effect outputting function triggers a start of the object display function.

20. An image display system including an image data providing apparatus for generating display data for displaying an image by an image display apparatus, and the image display apparatus for processing display data acquired from the image data providing apparatus and displaying an image based on the processed display data, wherein:

the image display apparatus is a computer-embedded digital television;

the image data providing apparatus comprises:

an identification information acquiring section for acquiring identification information of the requested image from a display data requesting message, which has been transmitted thereto via Internet from the image display apparatus and requests the display data;

a control script generating section for generating, according to the display data request message, a control script that defines a first function for defining a layout for displaying the requested image designated by the identification information acquired by the identification information acquiring section, and further defines a second function which the image display apparatus performs in response to an event that occurs in the image display apparatus while the requested image is being displayed by the first function; and a display data generating section for generating display data including the requested image and the control script generated by the control script generating section;

the control script defining the first function and the second function as a combination of basic functions of the image display apparatus, and the image display apparatus comprises:

a basic function program storage section intrinsically storing a plurality of basic function programs each of which executes one basic function, wherein the plurality of basic function programs are not changed by user operation on the digital television;

a display data receiving section receiving via Internet the display data from the image data providing apparatus, the display data containing the requested image and the control script, the display data being generated by the display data generating section;

a basic function executing section for executing one or more of the plurality of basic function programs as called directly from the control script, the basic function programs being stored in the basic function program storage section; and a control script executing section for controlling the basic function executing section according to the control script so as to perform the first function being defined by the control script so as to define a layout to display the requested image, and so as to perform a second function being defined by the control script, the control script being included in the display data received from the image data providing apparatus, the first function and the second function being performed by combining and executing some of the plurality of basic function programs; wherein the control script execution section is not a part of an Internet browser, and the first and second functions are operationally redefinable as different combinations of the intrinsically stored basic functions, by changing the control script.

21. An image display system including an image data providing apparatus for generating display data for displaying an object by an image display apparatus, and the image display apparatus for processing display data acquired from the image data providing apparatus and displaying an object based on the processed display data, wherein:

the image display apparatus is a computer-embedded digital television;

the image data providing apparatus comprises:

a control script generating section for generating a control script that defines (a) a first function for defining a layout for displaying the object, (b) a second function which the image display apparatus performs in response to an event that occurs in image display apparatus while the object is being displayed by the first function, and (c) an image data reformation region which is that region on a display screen of the image display apparatus in which image data should be reformed by the image display apparatus if the first or the second function is a function associated with a change for altering the display screen; and a display data generating section for generating display data including the object and the control script generated by the control script generating section;

the control script defining the first function and the second function as a combination of basic functions of the image display apparatus, and the image display apparatus comprises:

a basic function program storage section intrinsically storing a plurality of basic function programs each of which executes one basic function, wherein the plurality of basic function programs are not changed by user operation on the digital television;

a display data receiving section receiving via Internet the display data from the image data providing apparatus, the display data containing the object and the control script, the display data being generated by the display data generating section;

a basic function executing section for executing one or more of the plurality of basic function programs as called directly from the control script, the basic function programs being stored in the basic function program storage section; and a control script executing section for controlling the basic function executing section according to the control script so as to perform the first function and the second function being defined by the control script, the control script being included in the display data received from the image data providing apparatus, the first function and the second function being performed by combining and executing some of the plurality of basic function programs, wherein the control script execution section is not a part of an Internet browser;

the control script executing section executing in the image data reformation region in the image data reformation if the first or the second function is the function associated with the change, and the first and second functions being operationally redefinable as different combinations of the intrinsically stored basic functions, by changing the control script.

22. An image display system including an image data providing apparatus for generating display data for displaying an image by an image display apparatus, and the image display apparatus for processing data acquired from the image data providing apparatus and displaying an image based on the processed display data, wherein the image display apparatus is a computer-embedded digital television, and wherein:

the image data providing apparatus comprises:

an identification information acquiring section for acquiring identification information of the requested image from a display data requesting message, which has been transmitted thereto via Internet from the image display apparatus and requests the display data;

a control script generating section for generating a control script that defines the first function for defining a layout for displaying the requested image identified by the identification information acquired by the identification information acquiring section, and further defines, as the second function which the image display apparatus performs in response to an event that occurs in the image display apparatus while the requested image is being displayed by the first function, at least a visual effect outputting function for adding a visual effect to the requested image;

a display data generating section for generating display data including the requested image and the control script generated by the control script generating section, the control script defining the first function and the second function as a combination of basic functions of the image display apparatus, and the image display apparatus comprises:

a basic function program storage section intrinsically storing a plurality of basic function programs each of which executes one basic function, wherein the plurality of basic function programs are not changed by user operation on the digital television;

a display data receiving section receiving via Internet the display data from the image data providing apparatus, the display data containing the requested image and the control script, the display data being generated by the display data generating section;

a basic function executing section for executing one or more of the plurality of basic function programs as called directly from the control script, the basic function programs being stored in the basic function program storage section; and a control script executing section for controlling the basic function executing section according to the control script so as to perform (a) the first function to display the requested image included in the display data, and (b) the visual effect outputting function to the requested image, the control script being included in the display data received from the image data providing apparatus, the first function and the visual effect outputting function being performed by combining and executing some of the plurality of basic function programs; wherein the control script execution section is not a part of an Internet browser, and the first and second functions are operationally redefinable as different combinations of the intrinsically stored basic functions, by changing the control script.

* * * * *